(12) United States Patent
Zhou et al.

(10) Patent No.: US 12,200,247 B2
(45) Date of Patent: Jan. 14, 2025

(54) METHOD FOR TRANSMITTING VIDEO PICTURE, DEVICE FOR SENDING VIDEO PICTURE, AND VIDEO CALL METHOD AND DEVICE

(71) Applicant: HUAWEI TECHNOLOGIES CO., LTD., Guangdong (CN)

(72) Inventors: Xusheng Zhou, Hangzhou (CN); Yufeng Lu, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 421 days.

(21) Appl. No.: 17/698,405

(22) Filed: Mar. 18, 2022

(65) Prior Publication Data

US 2022/0210469 A1 Jun. 30, 2022

Related U.S. Application Data

(63) Continuation of application No. PCT/CN2020/116541, filed on Sep. 21, 2020.

(30) Foreign Application Priority Data

Sep. 19, 2019 (CN) .......................... 201910888693.5

(51) Int. Cl.
*H04N 19/58* (2014.01)
*H04N 7/14* (2006.01)
(Continued)

(52) U.S. Cl.
CPC ............. *H04N 19/58* (2014.11); *H04N 7/141* (2013.01); *H04N 19/159* (2014.11); *H04N 19/184* (2014.11)

(58) Field of Classification Search
CPC .... H04N 19/58; H04N 19/159; H04N 19/184; H04N 7/141
See application file for complete search history.

(56) References Cited

U.S. PATENT DOCUMENTS

2006/0083298 A1 4/2006 Wang et al.
2011/0249729 A1 10/2011 Zhou et al.
(Continued)

FOREIGN PATENT DOCUMENTS

CN 101924924 A 12/2010
CN 102045557 A 5/2011
(Continued)

OTHER PUBLICATIONS

Extended European Search Report in European Appln No. 20866583.6, dated Nov. 23, 2022, 10 pages.
Wang et al., "Error resilient video coding using flexible reference frames", Proc. SPIE 5960, Visual Communications and Image Processing 2005, Jun. 24, 2005, 12 pages.
(Continued)

*Primary Examiner* — Rowina J Cattungal
(74) *Attorney, Agent, or Firm* — Fish & Richardson P.C.

(57) ABSTRACT

Embodiments of this disclosure provide a method for transmitting a video picture, a device for sending a video picture, and a video call method and device, where the video picture includes a plurality of video frames. According to the method for transmitting a video picture, the plurality of video frames are encoded to obtain an encoded bitstream, where the bitstream includes at least information indicating inter-frame reference relationships. In this application, each of N frames preceding to a current frame references a forward long-term reference (LTR) frame that has a shortest temporal distance to each of the preceding N frames, and the forward LTR frame is an encoded video frame marked by a transmit end device as an LTR frame.

20 Claims, 22 Drawing Sheets

(51) Int. Cl.
    *H04N 19/159*     (2014.01)
    *H04N 19/184*     (2014.01)

(56) References Cited

U.S. PATENT DOCUMENTS

| | | | |
|---|---|---|---|
| 2018/0014010 A1* | 1/2018 | Dai | H04N 19/59 |
| 2019/0045217 A1 | 2/2019 | Gokhale et al. | |

FOREIGN PATENT DOCUMENTS

| | | | | |
|---|---|---|---|---|
| CN | 103024374 A | | 4/2013 | |
| CN | 103167283 A | | 6/2013 | |
| CN | 104584549 A | | 4/2015 | |
| CN | 105794207 A | | 7/2016 | |
| CN | 106817585 A | | 6/2017 | |
| CN | 106937168 A | | 7/2017 | |
| CN | 107734332 A | | 2/2018 | |
| CN | 107948654 A | | 4/2018 | |
| CN | 112995685 A | * | 6/2021 | H04N 21/2187 |
| CN | 114465993 A | * | 5/2022 | H04L 65/60 |
| CN | 114567799 A | * | 5/2022 | H04N 21/2343 |
| JP | 2018019195 A | | 2/2018 | |

OTHER PUBLICATIONS

Fouladi et al., "Salsify: Low-Latency Network Video through Tighter Integration between a Video Codec and a Transport Protocol," Proceedings of the 15th USENIX Symposium on Networked Systems Design and Implementation (NSDI-'18), Apr. 2018, 17 pages.

ITU-T H.263 (Jan. 2005), "Series H: Audiovisual and Multimedia Systems, Infrastructure of audiovisual services—Coding of moving video—Video coding for low bit rate communication," Jan. 2005, 226 pages.

ITU-T H.264 (Jun. 2019), "Series H: Audiovisual and Multimedia Systems, Infrastructure of audiovisual services—Coding of moving video—Advanced video coding for generic audiovisual services," Jun. 2019, 836 pages.

Office Action issued in Chinese Application No. 201910888693.5 on Apr. 26, 2022, 4 pages.

Office Action issued in Chinese Application No. 201910888693.5 on Jul. 27, 2021, 19 pages (with English translation).

PCT International Search Report and Written Opinion issued in International Application No. PCT/CN2020/116541 on Dec. 23, 2020, 15 pages (with English translation).

* cited by examiner

METHOD FOR TRANSMITTING VIDEO PICTURE, DEVICE FOR SENDING VIDEO PICTURE, AND VIDEO CALL METHOD AND DEVICE

CROSS-REFERENCE TO RELATED APPLICATIONS

This application is a continuation of International Application No. PCT/CN2020/116541, filed on Sep. 21, 2020, which claims priority to Chinese Patent Application No. 201910888693.5, filed on Sep. 19, 2019. The disclosures of the aforementioned applications are hereby incorporated by reference in their entireties.

TECHNICAL FIELD

This application relates to the field of communications technologies, and in particular, to a method for transmitting a video picture, a device for sending a video picture, and a video call method and device.

BACKGROUND

As 5G further develops, people have increasingly strong demands for video interaction, and video calling, as a basic interaction service, has also grown rapidly in recent years. Currently, as a basic capability, the video calling has been embedded in all-scenario smart terminals such as vehicle-mounted terminals, smart screens, drones, kids watches, smart speakers, and telemedicine, and lays a foundation for all-scenario interconnection in a future intelligent society.

Although network coverage is becoming increasingly wider, an actual network situation is complex and changeable, and a high burst packet loss rate and/or network congestion may appear in scenarios such as weak signals in a coverage area, wall-penetration of a home wireless fidelity (Wi-Fi for short) network, and forcible use of public Wi-Fi by a plurality of users. Consequently, incomplete video data is received, and frame freezing is caused.

In the related conventional technology, when data is incomplete due to the high burst packet loss rate, a transmit end re-encodes an I frame to restore a smooth video picture. However, this causes significant frame freezing, and seriously affects experience of smoothness of a high-definition video call.

Video encoding and decoding and transmission control are core technologies for video calls and play key roles to video call quality and smoothness. However, in the related conventional technology, encoding and decoding and transmission control of a video call are performed by two subsystems, and a reference relationship between video frames is relatively stable. As a result, video smoothness and video definition cannot be balanced, and experience is poor.

SUMMARY

This application provides a method for transmitting a video picture, a device for sending a video picture, and a video call method and device, and this application further provides a method for displaying a video picture and a device for receiving a video picture, to achieve a good balance between picture quality and picture smoothness.

According to a first aspect, this application provides a method for transmitting a video picture, where the video picture includes a plurality of video frames, and the method includes:

encoding the plurality of video frames to obtain an encoded bitstream, where the bitstream includes at least information indicating inter-frame reference relationships; the bitstream may further include encoded data, for example, residual data between a current frame and a reference frame; and the information indicating the inter-frame reference relationships may be placed in a slice header; and sending the encoded bitstream, where the information indicating the inter-frame reference relationships includes information about an inter-frame reference relationship of the current frame and information about inter-frame reference relationships of N frames preceding to the current frame.

The information about the inter-frame reference relationship of the current frame indicates that the current frame references a target forward long-term reference LTR frame that has a shortest temporal distance to the current frame. The target forward LTR frame is a forward LTR frame for which a transmit end device receives an acknowledgment message from a receive end device. Specifically, the target forward LTR frame may be an encoded video frame that is marked by the transmit end device as an LTR frame and for which the acknowledgment message sent by the receive end device is received, and the acknowledgment message corresponds to the target forward LTR frame. In this application, the transmit end device is a local end, for example, may also be referred to as an encoding-side device, and the receive end device is a peer end or a remote end, for example, may also be referred to as a decoding-side device.

The information about the inter-frame reference relationships of the N frames preceding to the current frame indicates that each of the preceding N frames references a forward LTR frame that has a shortest temporal distance to each of the preceding N frames, and the forward LTR frame is an encoded video frame marked by the transmit end device as an LTR frame. In this application, the forward LTR frame is stored in a DPB.

It should be noted that there may be another frame between the N frames preceding to the current frame and the current frame, or there may be temporal neighbor relationships between the N frames preceding to the current frame and the current frame. For the former case, the another frame may have an inter-frame reference relationship the same as those of the preceding N frames, or have another inter-frame reference relationship.

In other words, all of a plurality of frames between the current frame and the forward LTR frame (for example, A) that has the shortest temporal distance may reference a same LTR frame (for example, A), or some of the plurality of frames may reference a same LTR frame (for example, A).

According to the method for transmitting a video picture, the plurality of video frames are encoded to obtain the encoded bitstream. The bitstream includes at least the information indicating the inter-frame reference relationships. The information indicating the inter-frame reference relationships includes the information about the inter-frame reference relationships of the N frames preceding to the current frame. The information about the inter-frame reference relationships of the N frames preceding to the current frame indicates that each of the N frames preceding to the current frame references the forward LTR frame that has the shortest temporal distance to each of the preceding N frames. The forward LTR frame is the encoded video frame marked by the transmit end device as the LTR frame. In other words, in this embodiment, when marking an LTR frame, the transmit end device does not need to wait for feedback from the receive end device, and therefore can mark a plurality of LTR frames in one RTT. This can greatly shorten an inter-frame reference distance, and improve coding quality of the video picture.

In a possible implementation, the information indicating the inter-frame reference relationships further includes information about inter-frame reference relationships of M frames following the current frame, the information about the inter-frame reference relationships of the M frames following the current frame indicates that each of the following M frames references a previous frame of each of the following M frames, where N and M are positive integers. For example, specific values of N and M may depend on a network.

It should be noted that there may be another frame between the M frames following the current frame and the current frame, or there may be temporal neighbor relationships between the M frames following the current frame and the current frame. For the former case, the another frame may have an inter-frame reference relationship the same as those of the following M frames, or have another inter-frame reference relationship.

In a poor network and high latency scenario, when an interval between LTR frames is excessively long, if each of all frames subsequent to an LTR frame references a forward LTR frame that has a shortest temporal distance to each of all the frames, an inter-frame reference distance is bound to be excessively long, and coding quality is significantly degraded. In this case, the transmit end device determines that the current frame references the target forward LTR frame that has the shortest temporal distance to the current frame, and determines that each of the M frames following the current frame references the previous frame of each of the following M frames, so that the inter-frame reference distance can be shortened, and the coding quality in the poor network environment can be improved. This implements adaptive selection of a reference relationship. For example, a full-reference relationship and a frame-by-frame reference relationship are flexibly combined. This avoids, to some extent, referencing a reference frame that has a long temporal distance to the current frame, greatly alleviates a video frame freezing phenomenon and a problem of a blurry picture that are caused by packet loss, and implements a good balance between picture quality and picture smoothness.

In a possible implementation, the information indicating the inter-frame reference relationships further includes information about inter-frame reference relationships of M frames following the current frame, and the information about the inter-frame reference relationships of the M frames following the current frame indicates that each of the following M frames references a forward LTR frame that has a shortest temporal distance to each of the following M frames, where N and M are positive integers. For example, specific values of N and M may depend on a network.

It should be noted that there may be another frame between the M frames following the current frame and the current frame, or there may be temporal neighbor relationships between the M frames following the current frame and the current frame. For the former case, the another frame may have an inter-frame reference relationship the same as those of the following M frames, or have another inter-frame reference relationship.

In a possible implementation, the transmit end device determines a value of N based on coding quality of n frames preceding to the current frame, where n<N. In a specific implementation, the transmit end device may determine the value of N based on the coding quality of the n frames preceding to the current frame, a motion scene for the video picture, and network status information fed back by the receive end device. The network status information may include one or more of a network packet loss rate, an available network bandwidth, and a network round-trip time RTT.

In a possible implementation, the transmit end device determines a value of N based on a result of comparing the coding quality of the n frames preceding to the current frame with a coding quality threshold.

In a possible implementation, the transmit end device determines a value of M based on a quantity of video frames included per unit time. In a specific implementation, the transmit end device may determine the value of M based on the quantity of video frames included per unit time and the motion scene for the video picture. The unit time may be set based on system performance and/or an implementation requirement in a specific implementation. For example, the unit time may be 1 second.

In a possible implementation, an LTR frame marking interval D has a function relationship with N and M. For example, the function relationship may be D=N+(M+1).

The LTR frame marking interval is an interval of a quantity of frames at which an LTR frame is marked, that is, an interval of a quantity of frames from a previous marked LTR frame to a current marked LTR frame. For example, if the LTR frame marking interval is 4, after the current frame is marked as an LTR frame, there is an interval of four frames, that is, the $5^{th}$ frame after the current frame is marked as an LTR frame.

In a possible implementation, the information indicating the inter-frame reference relationships further includes information about inter-frame reference relationships of L frames, where L=(M1+1)+(M2+1)+ . . . +(Mn+1), the L frames temporally follow the M frames, the information about the inter-frame reference relationships of the L frames indicates that the first frame in the (Mn+1) frames references a target forward LTR frame that has a shortest temporal distance to the first frame, and indicates that each frame after the first frame in the (Mn+1) frames references a previous frame of each frame after the first frame, L is a positive integer, and n is a positive integer greater than or equal to 1.

Values of M1, M2, . . . , and Mn may be the same or different, and specific values may be determined based on an actual application scenario.

In a poor network and high latency scenario, when an interval between LTR frames is excessively long, if each of all frames subsequent to an LTR frame references a forward LTR frame that has a shortest temporal distance to each of all the frames, an inter-frame reference distance is bound to be excessively long, and coding quality is significantly degraded. In this case, when encoding the L frames following the M frames, the transmit end device may determine that the first frame in the (Mn+1) frames references the target forward LTR frame that has the shortest temporal distance to the first frame, and determine that each frame after the first frame in the (Mn+1) frames references the previous frame of each frame after the first frame, so that the inter-frame reference distance can be shortened, and the coding quality in the poor network environment can be improved. This implements adaptive selection of a reference relationship. For example, a full-reference relationship and a frame-by-frame reference relationship are flexibly combined. This avoids, to some extent, referencing a reference frame that has a long temporal distance to the current frame, greatly alleviates a video frame freezing phenomenon and a problem of a blurry picture that are caused by packet loss, and implements a good balance between picture quality and picture smoothness.

In a possible implementation, an LTR frame marking interval D has a function relationship with N and L. For example, the function relationship may be D=N+L, where L=(M1+1)+(M2+1)+ . . . +(Mn+1). In a possible implementation, the transmit end device determines the LTR frame marking interval D based on network status information fed back by the receive end device, where the network status information includes one or more of a network packet loss rate, an available network bandwidth, and a network round-trip time RTT.

In a possible implementation, the LTR frame marking interval D is used by the transmit end device to mark an LTR frame.

The transmit end device marks the LTR frame based on the LTR frame marking interval, and therefore can mark a plurality of LTR frames in one RTT. In addition, in this application, the LTR frame marking interval is not set as a fixed value, but dynamically changes. A same interval or different intervals may be used, which is specifically determined based on an actual application scenario. This can greatly shorten an inter-frame reference distance, and improve coding quality of the video picture. In addition, in this embodiment, the transmit end device may dynamically determine the LTR frame marking interval based on information such as a network status. This can handle a poor network scenario such as burst packet loss, a high packet loss rate, or congestion on a live network in a timely manner, implement a balance between smoothness and definition, and achieve optimal video call experience.

According to a second aspect, this application provides a method for transmitting a video picture, where the video picture includes a plurality of video frames, and the method includes: determining whether a current frame is marked as a long-term reference LTR frame; and if the current frame is not marked as the LTR frame, encoding the unmarked current frame, where the encoding process includes: encoding at least information indicating an inter-frame reference relationship of the current frame into a bitstream, where the information indicating the inter-frame reference relationship of the current frame indicates that the current frame references a forward LTR frame that has a shortest temporal distance to the current frame, and the forward LTR frame is an encoded video frame marked by a transmit end device as an LTR frame; or if the current frame is marked as the LTR frame, encoding the marked current frame, where the encoding process includes: encoding information indicating an inter-frame reference relationship of the current frame into a bitstream, where the information indicating the inter-frame reference relationship of the current frame indicates that the current frame references a target forward LTR frame that has a shortest temporal distance to the current frame; the target forward LTR frame is a forward LTR frame for which a transmit end device receives an acknowledgment message from a receive end device, and specifically, the target forward LTR frame is an encoded video frame that is marked by the transmit end device as an LTR frame and for which the acknowledgment message sent by the receive end device is received; the acknowledgment message corresponds to the target forward LTR frame; and in this application, the transmit end device is a local end, for example, may also be referred to as an encoding-side device, and the receive end device is a peer end or a remote end, for example, may also be referred to as a decoding-side device; and sending an encoded bitstream.

According to the method for transmitting a video picture, when the unmarked current frame is encoded, the forward LTR frame that has the shortest temporal distance to the unmarked current frame is referenced, where the forward LTR frame is the encoded video frame marked by the transmit end device as the LTR frame. In other words, in this embodiment, when marking an LTR frame, the transmit end device does not need to wait for feedback from the receive end device, and therefore can mark a plurality of LTR frames in one RTT. This can shorten an inter-frame reference distance, and improve coding quality of the video picture.

In a possible implementation, the determining whether a current frame is marked as a long-term reference LTR frame includes: determining, based on an LTR frame marking interval, whether the current frame is marked as the LTR frame.

In a possible implementation, the determining, based on an LTR frame marking interval, whether the current frame is marked as the LTR frame includes: obtaining an interval of a quantity of frames between the current frame and the forward LTR frame that has the shortest temporal distance to the current frame; and marking the current frame as the LTR frame if the interval of the quantity of frames is equal to the LTR frame marking interval; or skipping marking the current frame as the LTR frame if the interval of the quantity of frames is not equal to the LTR frame marking interval.

In a possible implementation, the method further includes: determining the LTR frame marking interval based on network status information fed back by the receive end device, where the network status information includes one or more of a network packet loss rate, an available network bandwidth, and a network round-trip time RTT.

In a possible implementation, the information indicating the inter-frame reference relationship of the current frame indicates that the current frame references the forward LTR frame that has the shortest temporal distance to the current frame, the forward LTR frame is the encoded video frame marked by the transmit end device as the LTR frame, the current frame is not marked as an LTR frame, and coding quality of the current frame is higher than or equal to a coding quality threshold; or the information indicating the inter-frame reference relationship of the current frame indicates that the current frame references the forward LTR frame that has the shortest temporal distance to the current frame, the forward LTR frame is the encoded video frame marked by the transmit end device as the LTR frame, the current frame is not marked as the LTR frame, and coding quality of the current frame is lower than a coding quality threshold.

If the current frame is not marked as the LTR frame, when encoding the current frame, the transmit end device references the forward LTR frame that has the shortest temporal distance to the current frame; and after encoding the current frame, the transmit end device obtains the coding quality of the current frame, and compares the coding quality of the current frame with the coding quality threshold. If the coding quality of the current frame is lower than the coding quality threshold, when encoding a next frame of the current frame, the transmit end device references a target forward LTR frame that has a shortest temporal distance to the next frame, to improve coding quality of the next frame of the current frame.

In a possible implementation, the method further includes: encoding (M+1) frames following the current frame, where the encoding process includes: encoding information indicating inter-frame reference relationships of the (M+1) frames following the current frame into the bitstream, where the information indicating the inter-frame reference relationships of the following (M+1) frames indicates that the first frame in the following (M+1) frames references a target forward LTR frame that has a shortest temporal distance to the first frame, and indicate that each frame after the first frame in the following (M+1) frames references a previous frame of each frame after the first frame, where M is a positive integer; and the current frame is not marked as the LTR frame, and the coding quality of the current frame is lower than the coding quality threshold.

In a possible implementation, the method further includes: encoding a next frame of the current frame, where the encoding process includes: encoding information indicating an inter-frame reference relationship of the next frame of the current frame into the bitstream, where the information indicating the inter-frame reference relationship of the next frame indicates that the next frame references a target forward LTR frame that has a shortest temporal distance to the next frame, the current frame is not marked as the LTR frame, and the coding quality of the current frame is lower than the coding quality threshold.

In a possible implementation, the method further includes:
  encoding (M+1) frames following the current frame, where the encoding process includes: encoding information indicating inter-frame reference relationships of the (M+1) frames following the current frame into the bitstream, where the information indicating the inter-frame reference relationships of the following (M+1) frames indicates that the first frame in the following (M+1) frames references a target forward LTR frame that has a shortest temporal distance to the first frame, and indicate that each frame after the first frame in the following (M+1) frames references a previous frame of each frame after the first frame, where M is a positive integer; and the current frame is not marked as the LTR frame, and the coding quality of the current frame is lower than the coding quality threshold.

In a poor network and high latency scenario, when an interval between LTR frames is excessively long, if each of all frames subsequent to an LTR frame references a forward LTR frame that has a shortest temporal distance to each of all the frames, an inter-frame reference distance is bound to be excessively long, and coding quality is significantly degraded. In this case, when encoding the (M+1) frames following the current frame, the transmit end device may determine that the first frame in the following (M+1) frames references the target forward LTR frame that has the shortest temporal distance to the first frame, and determine that each frame after the first frame in the following (M+1) frames references the previous frame of each frame after the first frame, so that the inter-frame reference distance can be shortened, and the coding quality in the poor network environment can be improved. This implements adaptive selection of a reference relationship. For example, a full-reference relationship and a frame-by-frame reference relationship are flexibly combined. This avoids, to some extent, referencing a reference frame that has a long temporal distance to the current frame, greatly alleviates a video frame freezing phenomenon and a problem of a blurry picture that are caused by packet loss, and implements a good balance between picture quality and picture smoothness.

In a possible implementation, the transmit end device determines a value of M based on a quantity of video frames included per unit time. In a specific implementation, the transmit end device may determine the value of M based on the quantity of video frames included per unit time and the motion scene for the video picture. The unit time may be set based on system performance and/or an implementation requirement in a specific implementation. For example, the unit time may be 1 second.

According to a third aspect, this application provides a video call method, where the method is applied to an electronic device having a display and a picture collector. The display may include a display of an in-vehicle computer (a mobile data center (Mobile Data Center)). The picture collector may be a camera, an in-vehicle sensor, or the like. The electronic device may be a device such as a mobile terminal (a mobile phone), a smart screen, a drone, or an intelligent and connected vehicle (ICV for short), a smart/intelligent car, or a vehicle-mounted device.

The electronic device may include: establishing a video call connection between a first user and a second user in response to a first operation of the first user for requesting a video call with the second user, where the video call connection herein represents a video call connection between an electronic device used by the first user and an electronic device used by the second user; collecting, by using the picture collector, a video picture of an environment including the first user, where the video picture includes a plurality of video frames, and the environment herein may be an internal environment and/or an external environment in which the first user is located, for example, an environment inside a vehicle and/or an ambient environment that is sensed during driving and in which intelligent detection of an obstacle is performed; encoding the plurality of video frames to obtain an encoded bitstream, where the bitstream includes at least information indicating inter-frame reference relationships; and sending the encoded bitstream, where the information indicating the inter-frame reference relationships includes information about an inter-frame reference relationship of a current frame and information about inter-frame reference relationships of N frames preceding to the current frame.

The information about the inter-frame reference relationship of the current frame indicates that the current frame references a target forward long-term reference LTR frame that has a shortest temporal distance to the current frame. A transmit end device is the electronic device used by the first user, and a receive end device is the electronic device used by the second user.

The information about the inter-frame reference relationships of the N frames preceding to the current frame indicates that each of the preceding N frames references a forward LTR frame that has a shortest temporal distance to each of the preceding N frames.

It should be noted that there may be another frame between the N frames preceding to the current frame and the current frame, or there may be temporal neighbor relationships between the N frames preceding to the current frame and the current frame. For the former case, the another frame may have an inter-frame reference relationship the same as those of the preceding N frames, or have another inter-frame reference relationship.

In other words, all of a plurality of frames between the current frame and the forward LTR frame (for example, A)

that has the shortest temporal distance may reference a same LTR frame (for example, A), or some of the plurality of frames may reference a same LTR frame (for example, A).

According to the video call method, after the video call connection between the first user and the second user is established in response to the first operation of the first user for requesting the video call with the second user, the video picture of the environment including the first user is collected by using the picture collector, and then the plurality of video frames included in the video picture are encoded to obtain the encoded bitstream. The bitstream includes at least the information indicating the inter-frame reference relationships. The information indicating the inter-frame reference relationships includes the information about the inter-frame reference relationships of the N frames preceding to the current frame. The information about the inter-frame reference relationships of the N frames preceding to the current frame indicates that each of the N frames preceding to the current frame references the forward LTR frame that has the shortest temporal distance to the each of the N frames. The forward LTR frame is an encoded video frame marked by the transmit end device as an LTR frame. In other words, in this embodiment, when marking an LTR frame, the transmit end device does not need to wait for feedback from the receive end device, and therefore can mark a plurality of LTR frames in one RTT. This can greatly shorten an inter-frame reference distance, and improve coding quality of the video picture.

In a possible implementation, the information indicating the inter-frame reference relationships further includes information about inter-frame reference relationships of M frames following the current frame, and the information about the inter-frame reference relationships of the M frames following the current frame indicates that each of the following M frames references a previous frame of each of the following M frames, where N and M are positive integers. For example, specific values of N and M may depend on a network.

It should be noted that there may be another frame between the M frames following the current frame and the current frame, or there may be temporal neighbor relationships between the M frames following the current frame and the current frame. For the former case, the another frame may have an inter-frame reference relationship the same as those of the following M frames, or have another inter-frame reference relationship.

In a poor network and high latency scenario, when an interval between LTR frames is excessively long, if each of all frames subsequent to an LTR frame references a forward LTR frame that has a shortest temporal distance to each of all the frames, an inter-frame reference distance is bound to be excessively long, and coding quality is significantly degraded. In this case, the transmit end device determines that the current frame references the target forward LTR frame that has the shortest temporal distance to the current frame, and determines that each of the M frames following the current frame references the previous frame of each of the M frames, so that the inter-frame reference distance can be shortened, and the coding quality in the poor network environment can be improved. This implements adaptive selection of a reference relationship. For example, a full-reference relationship and a frame-by-frame reference relationship are flexibly combined. This avoids, to some extent, referencing a reference frame that has a long temporal distance to the current frame, greatly alleviates a video frame freezing phenomenon and a problem of a blurry picture that are caused by packet loss, and implements a good balance between picture quality and picture smoothness.

In a possible implementation, the information indicating the inter-frame reference relationships further includes information about inter-frame reference relationships of M frames following the current frame, and the information about the inter-frame reference relationships of the M frames following the current frame indicates that each of the following M frames references a forward LTR frame that has a shortest temporal distance to each of the following M frames, where N and M are positive integers. For example, specific values of N and M may depend on a network.

It should be noted that there may be another frame between the M frames following the current frame and the current frame, or there may be temporal neighbor relationships between the M frames following the current frame and the current frame. For the former case, the another frame may have an inter-frame reference relationship the same as those of the following M frames, or have another inter-frame reference relationship.

In a possible implementation, the transmit end device determines a value of N based on coding quality of n frames preceding to the current frame, where n<N. In a specific implementation, the transmit end device may determine the value of N based on the coding quality of the n frames preceding to the current frame, a motion scene for the video picture, and network status information fed back by the receive end device. The network status information may include one or more of a network packet loss rate, an available network bandwidth, and a network round-trip time RTT.

In a possible implementation, the transmit end device determines a value of N based on a result of comparing the coding quality of the n frames preceding to the current frame with a coding quality threshold.

In a possible implementation, the transmit end device determines a value of M based on a quantity of video frames included per unit time. In a specific implementation, the transmit end device may determine the value of M based on the quantity of video frames included per unit time and the motion scene for the video picture. The unit time may be set based on system performance and/or an implementation requirement in a specific implementation. For example, the unit time may be 1 second.

In a possible implementation, an LTR frame marking interval D has a function relationship with N and M. For example, the function relationship may be D=N+(M+1).

In a possible implementation, the information indicating the inter-frame reference relationships further includes information about inter-frame reference relationships of L frames, where L=(M1+1)+(M2+1)+ . . . +(Mn+1), the L frames temporally follow the M frames, the information about the inter-frame reference relationships of the L frames indicates that the first frame in the (Mn+1) frames references a target forward LTR frame that has a shortest temporal distance to the first frame, and indicates that each frame after the first frame in the (Mn+1) frames references a previous frame of each frame after the first frame, L is a positive integer, and n is a positive integer greater than or equal to 1.

Values of M1, M2, . . . , and Mn may be the same or different, and specific values may be determined based on an actual application scenario.

In a poor network and high latency scenario, when an interval between LTR frames is excessively long, if each of all frames subsequent to an LTR frame references a forward LTR frame that has a shortest temporal distance to each of all the frames, an inter-frame reference distance is bound to be excessively long, and coding quality is significantly degraded. In this case, when encoding the L frames following the M frames, the transmit end device may determine that the first frame in the (Mn+1) frames references the target forward LTR frame that has the shortest temporal distance to the first frame, and determine that each frame after the first frame in the (Mn+1) frames references the previous frame of each frame after the first frame, so that the inter-frame reference distance can be shortened, and the coding quality in the poor network environment can be improved. This implements adaptive selection of a reference relationship. For example, a full-reference relationship and a frame-by-frame reference relationship are flexibly combined. This avoids, to some extent, referencing a reference frame that has a long temporal distance to the current frame, greatly alleviates a video frame freezing phenomenon and a problem of a blurry picture that are caused by packet loss, and implements a good balance between picture quality and picture smoothness.

In a possible implementation, an LTR frame marking interval D has a function relationship with N and L. For example, the function relationship may be D=N+L, where L=(M1+1)+(M2+1)+ . . . +(Mn+1).

In a possible implementation, the LTR frame marking interval D is used by the transmit end device to mark an LTR frame.

The transmit end device marks the LTR frame based on the LTR frame marking interval, and therefore can mark a plurality of LTR frames in one RTT. In addition, in this application, the LTR frame marking interval is not set as a fixed value, but dynamically changes. A same interval or different intervals may be used, which is specifically determined based on an actual application scenario. This can greatly shorten an inter-frame reference distance, and improve coding quality of the video picture. In addition, in this embodiment, the transmit end device may dynamically determine the LTR frame marking interval based on information such as a network status. This can handle a poor network scenario such as burst packet loss, a high packet loss rate, or congestion on a live network in a timely manner, implement a balance between smoothness and definition, and achieve optimal video call experience.

According to a fourth aspect, this application provides a method for displaying a video picture, where the video picture includes a plurality of video frames, and the method includes:

parsing a bitstream to obtain information indicating inter-frame reference relationships, where the information indicating the inter-frame reference relationships includes information about an inter-frame reference relationship of a current frame and information about inter-frame reference relationships of N frames preceding to the current frame;

the information about the inter-frame reference relationship of the current frame indicates that the current frame references a target forward long-term reference LTR frame that has a shortest temporal distance to the current frame; and the information about the inter-frame reference relationships of the N frames preceding to the current frame indicates that each of the preceding N frames references a forward LTR frame that has a shortest temporal distance to each of the preceding N frames;

reconstructing the plurality of video frames, where the reconstructing the plurality of video frames includes:

reconstructing a current video frame based on a reference frame of the current frame; and displaying the video picture.

It should be noted that there may be another frame between the N frames preceding to the current frame and the current frame, or there may be temporal neighbor relationships between the N frames preceding to the current frame and the current frame. For the former case, the another frame may have an inter-frame reference relationship the same as those of the preceding N frames, or have another inter-frame reference relationship.

In other words, all of a plurality of frames between the current frame and the forward LTR frame (for example, A) that has the shortest temporal distance may reference a same LTR frame (for example, A), or some of the plurality of frames may reference a same LTR frame (for example, A).

According to the method for displaying a video picture, after the bitstream is parsed, the information indicating the inter-frame reference relationships may be obtained. The information indicating the inter-frame reference relationships includes the information about the inter-frame reference relationships of the N frames preceding to the current frame. The information about the inter-frame reference relationships of the N frames preceding to the current frame indicates that each of the preceding N frames references the forward LTR frame that has the shortest temporal distance to each of the preceding N frames. The forward LTR frame is an encoded video frame marked by a transmit end device as an LTR frame. In other words, in this embodiment, when marking an LTR frame, the transmit end device does not need to wait for feedback from a receive end device, and therefore can mark a plurality of LTR frames in one RTT. This can greatly shorten an inter-frame reference distance, and improve coding quality of the video picture.

In a possible implementation, the information indicating the inter-frame reference relationships further includes information about inter-frame reference relationships of M frames following the current frame, and the information about the inter-frame reference relationships of the M frames following the current frame indicates that each of the following M frames references a previous frame of each of the following M frames, where N and M are positive integers. For example, specific values of N and M may depend on a network.

It should be noted that there may be another frame between the M frames following the current frame and the current frame, or there may be temporal neighbor relationships between the M frames following the current frame and the current frame. For the former case, the another frame may have an inter-frame reference relationship the same as those of the following M frames, or have another inter-frame reference relationship.

In a poor network and high latency scenario, when an interval between LTR frames is excessively long, if each of all frames subsequent to an LTR frame references a forward LTR frame that has a shortest temporal distance to each of all the frames, an inter-frame reference distance is bound to be excessively long, and coding quality is significantly degraded. In this case, the transmit end device determines that the current frame references the target forward LTR frame that has the shortest temporal distance to the current frame, and determines that each of the M frames following the current frame references the previous frame of each of the M frames, so that the inter-frame reference distance can be shortened, and the coding quality in the poor network environment can be improved. This implements adaptive selection of a reference relationship. For example, a full-reference relationship and a frame-by-frame reference relationship are flexibly combined. This avoids, to some extent, referencing a reference frame that has a long temporal distance to the current frame, greatly alleviates a video frame freezing phenomenon and a problem of a blurry picture that are caused by packet loss, and implements a good balance between picture quality and picture smoothness.

In a possible implementation, the information indicating the inter-frame reference relationships further includes information about inter-frame reference relationships of M frames following the current frame, and the information about the inter-frame reference relationships of the M frames following the current frame indicates that each of the following M frames references a forward LTR frame that has a shortest temporal distance to each of the following M frames, where N and M are positive integers. For example, specific values of N and M may depend on a network.

It should be noted that there may be another frame between the M frames following the current frame and the current frame, or there may be temporal neighbor relationships between the M frames following the current frame and the current frame. For the former case, the another frame may have an inter-frame reference relationship the same as those of the following M frames, or have another inter-frame reference relationship.

According to a fifth aspect, this application provides a device for sending a video picture, where the video picture includes a plurality of video frames, and the device includes:

an encoding module, configured to encode the plurality of video frames to obtain an encoded bitstream, where the bitstream includes at least information indicating inter-frame reference relationships; the bitstream may further include encoded data, for example, residual data between a current frame and a reference frame; and the information indicating the inter-frame reference relationships may be placed in a slice header; and a transmission module, configured to send the encoded bitstream, where the information indicating the inter-frame reference relationships includes information about an inter-frame reference relationship of the current frame and information about inter-frame reference relationships of N frames preceding to the current frame.

The information about the inter-frame reference relationship of the current frame indicates that the current frame references a target forward long-term reference LTR frame that has a shortest temporal distance to the current frame. The target forward LTR frame is a forward LTR frame for which a transmit end device receives an acknowledgment message from a receive end device. Specifically, the target forward LTR frame is an encoded video frame that is marked by the encoding module as an LTR frame and for which the acknowledgment message sent by the receive end device is received, and the acknowledgment message corresponds to the target forward LTR frame. In this application, the transmit end device is a local end, for example, may also be referred to as an encoding-side device, and the receive end device is a peer end or a remote end, for example, may also be referred to as a decoding-side device.

The information about the inter-frame reference relationships of the N frames preceding to the current frame indicates that each of the preceding N frames references a forward LTR frame that has a shortest temporal distance to each of the preceding N frames, and the forward LTR frame is an encoded video frame marked by the encoding module as an LTR frame. In this application, the forward LTR frame is stored in a DPB.

It should be noted that there may be another frame between the N frames preceding to the current frame and the current frame, or there may be temporal neighbor relationships between the N frames preceding to the current frame and the current frame. For the former case, the another frame may have an inter-frame reference relationship the same as those of the preceding N frames, or have another inter-frame reference relationship.

In other words, all of a plurality of frames between the current frame and the forward LTR frame (for example, A) that has the shortest temporal distance may reference a same LTR frame (for example, A), or some of the plurality of frames may reference a same LTR frame (for example, A).

According to the device for sending a video picture, the encoding module encodes the plurality of video frames to obtain the encoded bitstream. The bitstream includes at least the information indicating the inter-frame reference relationships. The information indicating the inter-frame reference relationships includes the information about the inter-frame reference relationships of the N frames preceding to the current frame. The information about the inter-frame reference relationships of the N frames preceding to the current frame indicates that each of the N frames preceding to the current frame references the forward LTR frame that has the shortest temporal distance to each of the N frames. The forward LTR frame is the encoded video frame marked by the transmit end device as the LTR frame. In other words, in this embodiment, when marking an LTR frame, the encoding module does not need to wait for feedback from the receive end device, and therefore can mark a plurality of LTR frames in one RTT. This can shorten an inter-frame reference distance, and improve coding quality of the video picture.

In a possible implementation, the information indicating the inter-frame reference relationships further includes information about inter-frame reference relationships of M frames following the current frame, and the information about the inter-frame reference relationships of the M frames following the current frame indicates that each of the following M frames references a previous frame of each of the following M frames, where N and M are positive integers. For example, specific values of N and M may depend on a network.

It should be noted that there may be another frame between the M frames following the current frame and the current frame, or there may be temporal neighbor relationships between the M frames following the current frame and the current frame. For the former case, the another frame may have an inter-frame reference relationship the same as those of the following M frames, or have another inter-frame reference relationship.

In a poor network and high latency scenario, when an interval between LTR frames is excessively long, if each of all frames subsequent to an LTR frame references a forward LTR frame that has a shortest temporal distance to each of all the frames, an inter-frame reference distance is bound to be excessively long, and coding quality is significantly degraded. In this case, the encoding module determines that the current frame references the target forward LTR frame that has the shortest temporal distance to the current frame, and determines that each of the M frames following the current frame references the previous frame of each of the M frames, so that the inter-frame reference distance can be shortened, and the coding quality in the poor network environment can be improved. This implements adaptive selection of a reference relationship. For example, a full-reference relationship and a frame-by-frame reference relationship are flexibly combined. This avoids, to some extent, referencing a reference frame that has a long temporal distance to the current frame, greatly alleviates a video frame freezing phenomenon and a problem of a blurry picture that are caused by packet loss, and implements a good balance between picture quality and picture smoothness.

In a possible implementation, the information indicating the inter-frame reference relationships further includes information about inter-frame reference relationships of M frames following the current frame, and the information about the inter-frame reference relationships of the M frames following the current frame indicates that each of the following M frames references a forward LTR frame that has a shortest temporal distance to each of the following M frames, where N and M are positive integers. For example, specific values of N and M may depend on a network.

It should be noted that there may be another frame between the M frames following the current frame and the current frame, or there may be temporal neighbor relationships between the M frames following the current frame and the current frame. For the former case, the another frame may have an inter-frame reference relationship the same as those of the following M frames, or have another inter-frame reference relationship.

In a possible implementation, the encoding module determines a value of N based on coding quality of n frames preceding to the current frame, where n<N. In a specific implementation, the encoding module may determine the value of N based on the coding quality of the n frames preceding to the current frame, a motion scene for the video picture, and network status information fed back by the receive end device. The network status information may include one or more of a network packet loss rate, an available network bandwidth, and a network round-trip time RTT.

In a possible implementation, the encoding module determines a value of N based on a result of comparing the coding quality of the n frames preceding to the current frame with a coding quality threshold.

In a possible implementation, the encoding module determines a value of M based on a quantity of video frames included per unit time. In a specific implementation, the encoding module may determine the value of M based on the quantity of video frames included per unit time and the motion scene for the video picture. The unit time may be set based on system performance and/or an implementation requirement in a specific implementation. For example, the unit time may be 1 second.

In a possible implementation, an LTR frame marking interval D has a function relationship with N and M. For example, the function relationship may be D=N+(M+1).

In a possible implementation, the information indicating the inter-frame reference relationships further includes information about inter-frame reference relationships of L frames, where L=(M1+1)+(M2+1)+ . . . +(Mn+1), the L frames temporally follow the M frames, the information about the inter-frame reference relationships of the L frames indicates that the first frame in the (Mn+1) frames references a target forward LTR frame that has a shortest temporal distance to the first frame, and indicates that each frame after the first frame in the (Mn+1) frames references a previous frame of each frame after the first frame, L is a positive integer, and n is a positive integer greater than or equal to 1.

Values of M1, M2, . . . , and Mn may be the same or different, and specific values may be determined based on an actual application scenario.

In a poor network and high latency scenario, when an interval between LTR frames is excessively long, if each of all frames subsequent to an LTR frame references a forward LTR frame that has a shortest temporal distance to each of all the frames, an inter-frame reference distance is bound to be excessively long, and coding quality is significantly degraded. In this case, when encoding the L frames following the M frames, the encoding module may determine that the first frame in the (Mn+1) frames references the target forward LTR frame that has the shortest temporal distance to the first frame, and determine that each frame after the first frame in the (Mn+1) frames references the previous frame of each frame after the first frame, so that the inter-frame reference distance can be shortened, and the coding quality in the poor network environment can be improved. This implements adaptive selection of a reference relationship. For example, a full-reference relationship and a frame-by-frame reference relationship are flexibly combined. This avoids, to some extent, referencing a reference frame that has a long temporal distance to the current frame, greatly alleviates a video frame freezing phenomenon and a problem of a blurry picture that are caused by packet loss, and implements a good balance between picture quality and picture smoothness.

In a possible implementation, an LTR frame marking interval D has a function relationship with N and L. For example, the function relationship may be D=N+L, where L=(M1+1)+(M2+1)+ . . . +(Mn+1).

In a possible implementation, the encoding module determines the LTR frame marking interval D based on network status information fed back by the receive end device, where the network status information includes one or more of a network packet loss rate, an available network bandwidth, and a network round-trip time RTT.

In a possible implementation, the LTR frame marking interval D is used by the encoding module to mark an LTR frame.

The encoding module marks the LTR frame based on the LTR frame marking interval, and therefore can mark a plurality of LTR frames in one RTT. In addition, in this application, the LTR frame marking interval is not set as a fixed value, but dynamically changes. A same interval or different intervals may be used, which is specifically determined based on an actual application scenario. This can greatly shorten an inter-frame reference distance, and improve coding quality of the video picture. In addition, in this embodiment, the transmit end device may dynamically determine the LTR frame marking interval based on information such as a network status. This can handle a poor network scenario such as burst packet loss, a high packet loss rate, or congestion on a live network in a timely manner, implement a balance between smoothness and definition, and achieve optimal video call experience.

According to a sixth aspect, this application provides a device for sending a video picture, where the video picture includes a plurality of video frames, and the device includes:

a determining module, configured to determine whether a current frame is marked as a long-term reference LTR frame;

an encoding module, configured to: when the current frame is not marked as the LTR frame, encode the unmarked current frame, where the encoding process includes: encoding at least information indicating an inter-frame reference relationship of the current frame into a bitstream, where the information indicating the inter-frame reference relationship of the current frame indicates that the current frame references a forward LTR frame that has a shortest temporal distance to the current frame; or when the current frame is marked as the LTR frame, encode the marked current frame, where the encoding process includes: encoding information indicating an inter-frame reference relationship of the current frame into a bitstream, where the information indicating the inter-frame reference relationship of the current frame indicates that the current frame references a target forward LTR frame that has a shortest temporal distance to the current frame; the target forward LTR frame is a forward LTR frame for which the encoding module receives an acknowledgment message from a receive end device, and specifically, the target forward LTR frame is an encoded video frame that is marked by the encoding module as an LTR frame and for which the acknowledgment message sent by the receive end device is received; the acknowledgment message corresponds to the target forward LTR frame; and in this application, a transmit end device is a local end, for example, may also be referred to as an encoding-side device, and the receive end device is a peer end or a remote end, for example, may also be referred to as a decoding-side device; and a transmission module, configured to send an encoded bitstream.

According to the device for sending a video picture, when encoding the unmarked current frame, the encoding module references the forward LTR frame that has the shortest temporal distance to the unmarked current frame, where the forward LTR frame is the encoded video frame marked by the encoding module as the LTR frame. In other words, in this embodiment, when marking an LTR frame, the encoding module does not need to wait for feedback from the receive end device, and therefore can mark a plurality of LTR frames in one RTT. This can greatly shorten an inter-frame reference distance, and improve coding quality of the video picture.

In a possible implementation, the determining module is specifically configured to determine, based on an LTR frame marking interval, whether the current frame is marked as the LTR frame.

In a possible implementation, the determining module includes:

an obtaining submodule, configured to obtain an interval of a quantity of frames between the current frame and the forward LTR frame that has the shortest temporal distance to the current frame; and a marking submodule, configured to: mark the current frame as the LTR frame when the interval of the quantity of frames is equal to the LTR frame marking interval; or skip marking the current frame as the LTR frame when the interval of the quantity of frames is not equal to the LTR frame marking interval.

In a possible implementation, the determining module is further configured to determine the LTR frame marking interval based on network status information fed back by the receive end device, where the network status information includes one or more of a network packet loss rate, an available network bandwidth, and a network round-trip time RTT.

In a possible implementation, the information indicating the inter-frame reference relationship of the current frame indicates that the current frame references the forward LTR frame that has the shortest temporal distance to the current frame, the forward LTR frame is the encoded video frame marked by the transmit end device as the LTR frame, the current frame is not marked as the LTR frame, and coding quality of the current frame is higher than or equal to a coding quality threshold; or the information indicating the inter-frame reference relationship of the current frame indicates that the current frame references the forward LTR frame that has the shortest temporal distance to the current frame, the forward LTR frame is the encoded video frame marked by the transmit end device as the LTR frame, the current frame is not marked as an LTR frame, and coding quality of the current frame is lower than a coding quality threshold.

If the current frame is not marked as the LTR frame, when encoding the current frame, the encoding module references the forward LTR frame that has the shortest temporal distance to the current frame; and after encoding the current frame, the encoding module obtains the coding quality of the current frame, and compares the coding quality of the current frame with the coding quality threshold. If the coding quality of the current frame is lower than the coding quality threshold, when coding a next frame of the current frame, the coding module references a target forward LTR frame that has a shortest temporal distance to the next frame, to improve coding quality of the next frame of the current frame.

In a possible implementation, the encoding module is further configured to encode (M+1) frames following the current frame, where the encoding process includes: encoding information indicating inter-frame reference relationships of the (M+1) frames following the current frame into the bitstream, where the information indicating the inter-frame reference relationships of the following (M+1) frames indicates that the first frame in the following (M+1) frames references a target forward LTR frame that has a shortest temporal distance to the first frame, and indicate that each frame after the first frame in the following (M+1) frames references a previous frame of each frame after the first frame, where M is a positive integer; and the current frame is not marked as the LTR frame, and the coding quality of the current frame is lower than the coding quality threshold.

In a poor network and high latency scenario, when an interval between LTR frames is excessively long, if each of all frames subsequent to an LTR frame references an LTR frame that has a shortest temporal distance to each of all the frames, an inter-frame reference distance is bound to be excessively long, and coding quality is significantly degraded. In this case, when encoding the (M+1) frames following the current frame, the encoding module may determine that the first frame in the following (M+1) frames references the target forward LTR frame that has the shortest temporal distance to the first frame, and determine that each frame after the first frame in the following (M+1) frames references the previous frame of each frame after the first frame, so that the inter-frame reference distance can be shortened, and the coding quality in the poor network environment can be improved. This implements adaptive selection of a reference relationship. For example, a full-reference relationship and a frame-by-frame reference relationship are flexibly combined. This avoids, to some extent, referencing a reference frame that has a long temporal distance to the current frame, greatly alleviates a video frame freezing phenomenon and a problem of a blurry picture that are caused by packet loss, and implements a good balance between picture quality and picture smoothness.

In a possible implementation, the encoding module is further configured to encode a next frame of the current frame, where the encoding process includes: encoding information indicating an inter-frame reference relationship of the next frame of the current frame into the bitstream, where the information indicating the inter-frame reference relationship of the next frame indicates that the next frame references a target forward LTR frame that has a shortest temporal distance to the next frame, the current frame is not marked as the LTR frame, and the coding quality of the current frame is lower than the coding quality threshold.

In a possible implementation, the encoding module is configured to determine a value of M based on a quantity of video frames included per unit time. In a specific implementation, the encoding module may determine the value of M based on the quantity of video frames included per unit time and the motion scene for the video picture. The unit time may be set based on system performance and/or an implementation requirement in a specific implementation. For example, the unit time may be 1 second.

According to a seventh aspect, this application provides a video call device, where the video call device may be a video call device used by a first user, and the video call device may include a display, a picture collector, one or more processors, a memory, a plurality of applications, and one or more computer programs. The display may include a display of an in-vehicle computer (a mobile data center). The picture collector may be a camera, an in-vehicle sensor, or the like. The video call device may be a device such as a mobile terminal (a mobile phone), a smart screen, a drone, or an intelligent and connected vehicle (ICV for short), a smart/intelligent car, or a vehicle-mounted device.

The one or more computer programs are stored in the memory, and the one or more computer programs include instructions. When the instructions are executed by the device, the device is enabled to perform the steps: establishing a video call connection between the first user and a second user in response to a first operation of the first user for requesting a video call with the second user, where the video call connection herein represents a video call connection between an electronic device used by the first user and an electronic device used by the second user;

collecting, by using the picture collector, a video picture of an environment including the first user, where the video picture includes a plurality of video frames, and the environment herein may be an internal environment and/or an external environment in which the first user is located, for example, an environment inside a vehicle and/or an ambient environment that is sensed during driving and in which intelligent detection of an obstacle is performed;

encoding the plurality of video frames to obtain an encoded bitstream, where the bitstream includes at least information indicating inter-frame reference relationships; and sending the encoded bitstream, where the information indicating the inter-frame reference relationships includes information about an inter-frame reference relationship of a current frame and information about inter-frame reference relationships of N frames preceding to the current frame.

The information about the inter-frame reference relationship of the current frame indicates that the current frame references a target forward long-term reference LTR frame that has a shortest temporal distance to the current frame.

The information about the inter-frame reference relationships of the N frames preceding to the current frame indicates that each of the preceding N frames references a forward LTR frame that has a shortest temporal distance to each of the preceding N frames.

It should be noted that there may be another frame between the N frames preceding to the current frame and the current frame, or there may be temporal neighbor relationships between the N frames preceding to the current frame and the current frame. For the former case, the another frame may have an inter-frame reference relationship the same as those of the preceding N frames, or have another inter-frame reference relationship.

In other words, all of a plurality of frames between the current frame and the forward LTR frame (for example, A) that has the shortest temporal distance may reference a same LTR frame (for example, A), or some of the plurality of frames may reference a same LTR frame (for example, A).

According to the video call device, after the video call connection between the first user and the second user is established in response to the first operation of the first user for requesting the video call with the second user, the video picture of the environment including the first user is collected by using the picture collector, and then the plurality of video frames included in the video picture are encoded to obtain the encoded bitstream. The bitstream includes at least the information indicating the inter-frame reference relationships. The information indicating the inter-frame reference relationships includes the information about the inter-frame reference relationships of the N frames preceding to the current frame. The information about the inter-frame reference relationships of the N frames preceding to the current frame indicates that each of the N frames preceding to the current frame references the forward LTR frame that has the shortest temporal distance to each of the N frames. The forward LTR frame is an encoded video frame marked by a transmit end device as an LTR frame. In other words, in this embodiment, when marking an LTR frame, the transmit end device does not need to wait for feedback from a receive end device, and therefore can mark a plurality of LTR frames in one RTT. This can greatly shorten an inter-frame reference distance, and improve coding quality of the video picture.

In a possible implementation, the information indicating the inter-frame reference relationships further includes information about inter-frame reference relationships of M frames following the current frame, and the information about the inter-frame reference relationships of the M frames following the current frame indicates that each of the following M frames references a previous frame of each of the following M frames, where N and M are positive integers. For example, specific values of N and M may depend on a network.

It should be noted that there may be another frame between the M frames following the current frame and the current frame, or there may be temporal neighbor relationships between the M frames following the current frame and the current frame. For the former case, the another frame may have an inter-frame reference relationship the same as those of the following M frames, or have another inter-frame reference relationship.

In a poor network and high latency scenario, when an interval between LTR frames is excessively long, if each of all frames subsequent to an LTR frame references a forward LTR frame that has a shortest temporal distance to each of all the frames, an inter-frame reference distance is bound to be excessively long, and coding quality is significantly degraded. In this case, the transmit end device determines that the current frame references the target forward LTR frame that has the shortest temporal distance to the current frame, and determines that each of the M frames following the current frame references the previous frame of each of the M frames, so that the inter-frame reference distance can be shortened, and the coding quality in the poor network environment can be improved. This implements adaptive selection of a reference relationship. For example, a full-reference relationship and a frame-by-frame reference relationship are flexibly combined. This avoids, to some extent, referencing a reference frame that has a long temporal distance to the current frame, greatly alleviates a video frame freezing phenomenon and a problem of a blurry picture that are caused by packet loss, and implements a good balance between picture quality and picture smoothness.

In a possible implementation, the information indicating the inter-frame reference relationships further includes information about inter-frame reference relationships of M frames following the current frame, and the information about the inter-frame reference relationships of the M frames following the current frame indicates that each of the following M frames references a forward LTR frame that has a shortest temporal distance to each of the following M frames, where N and M are positive integers. For example, specific values of N and M may depend on a network.

It should be noted that there may be another frame between the M frames following the current frame and the current frame, or there may be temporal neighbor relationships between the M frames following the current frame and the current frame. For the former case, the another frame may have an inter-frame reference relationship the same as those of the following M frames, or have another inter-frame reference relationship.

In a possible implementation, when the instructions are executed by the device, the device is enabled to specifically perform the following steps:
determining a value of N based on coding quality of n frames preceding to the current frame, where n<N.

In a specific implementation, the transmit end device may determine the value of N based on the coding quality of the n frames preceding to the current frame, a motion scene for the video picture, and network status information fed back by the receive end device. The network status information may include one or more of a network packet loss rate, an available network bandwidth, and a network round-trip time RTT.

In a possible implementation, when the instructions are executed by the device, the device is enabled to specifically perform the following steps:
determining a value of M based on a quantity of video frames included per unit time.

In a specific implementation, the transmit end device may determine the value of M based on the quantity of video frames included per unit time and the motion scene for the video picture. The unit time may be set based on system performance and/or an implementation requirement in a specific implementation. For example, the unit time may be 1 second.

In a possible implementation, an LTR frame marking interval D has a function relationship with N and M. For example, the function relationship may be D=N+(M+1).

In a possible implementation, the information indicating the inter-frame reference relationships further includes information about inter-frame reference relationships of L frames, where L=(M1+1)+(M2+1)+ . . . +(Mn+1), the L frames temporally follow the M frames, the information about the inter-frame reference relationships of the L frames indicates that the first frame in the (Mn+1) frames references a target forward LTR frame that has a shortest temporal distance to the first frame, and indicates that each frame after the first frame in the (Mn+1) frames references a previous frame of each frame after the first frame, L is a positive integer, and n is a positive integer greater than or equal to 1.

Values of M1, M2, . . . , and Mn may be the same or different, and specific values may be determined based on an actual application scenario.

In a poor network and high latency scenario, when an interval between LTR frames is excessively long, if each of all frames subsequent to an LTR frame references a forward LTR frame that has a shortest temporal distance to each of all the frames, an inter-frame reference distance is bound to be excessively long, and coding quality is significantly degraded. In this case, when encoding the L frames following the M frames, the transmit end device may determine that the first frame in the (Mn+1) frames references the target forward LTR frame that has the shortest temporal distance to the first frame, and determine that each frame after the first frame in the (Mn+1) frames references the previous frame of each frame after the first frame, so that the inter-frame reference distance can be shortened, and the coding quality in the poor network environment can be improved. This implements adaptive selection of a reference relationship. For example, a full-reference relationship and a frame-by-frame reference relationship are flexibly combined. This avoids, to some extent, referencing a reference frame that has a long temporal distance to the current frame, greatly alleviates a video frame freezing phenomenon and a problem of a blurry picture that are caused by packet loss, and implements a good balance between picture quality and picture smoothness.

In a possible implementation, an LTR frame marking interval D has a function relationship with N and L. For example, the function relationship may be D=N+L, where L=(M1+1)+(M2+1)+ . . . +(Mn+1).

In a possible implementation, the LTR frame marking interval D is used by the transmit end device to mark an LTR frame.

The transmit end device marks the LTR frame based on the LTR frame marking interval, and therefore can mark a plurality of LTR frames in one RTT. This can greatly shorten an inter-frame reference distance, and improve coding quality of the video picture. In addition, in this application, the LTR frame marking interval is not set as a fixed value, but dynamically changes. A same interval or different intervals may be used, which is specifically determined based on an actual application scenario. This can greatly shorten an inter-frame reference distance, and improve coding quality of the video picture. In addition, in this embodiment, the transmit end device may dynamically determine the LTR frame marking interval based on information such as a network status. This can handle a poor network scenario such as burst packet loss, a high packet loss rate, or congestion on a live network in a timely manner, implement a balance between smoothness and definition, and achieve optimal video call experience.

According to an eighth aspect, this application provides a device for receiving a video picture, where the video picture includes a plurality of video frames, and the device includes:
a decoding module, configured to parse a bitstream to obtain information indicating inter-frame reference relationships, where the information indicating the inter-frame reference relationships includes information about an inter-frame reference relationship of a current frame and information about inter-frame reference relationships of N frames preceding to the current frame;

the information about the inter-frame reference relationship of the current frame indicates that the current frame references a target forward long-term reference LTR frame that has a shortest temporal distance to the current frame; and the information about the inter-frame reference relationships of the N frames preceding to the current frame indicates that each of the preceding N frames references a forward LTR frame that has a shortest temporal distance to each of the preceding N frames, where the decoding module is further configured to reconstruct the plurality of video frames, where the reconstructing the plurality of video frames includes: reconstructing a current video frame based on a reference frame of the current frame; and a display module, configured to display the video picture.

It should be noted that there may be another frame between the N frames preceding to the current frame and the current frame, or there may be temporal neighbor relationships between the N frames preceding to the current frame and the current frame. For the former case, the another frame may have an inter-frame reference relationship the same as those of the preceding N frames, or have another inter-frame reference relationship.

In other words, all of a plurality of frames between the current frame and the forward LTR frame (for example, A) that has the shortest temporal distance may reference a same LTR frame (for example, A), or some of the plurality of frames may reference a same LTR frame (for example, A).

According to the device for receiving a video picture, after parsing the bitstream, the decoding module may obtain the information indicating the inter-frame reference relationships. The information indicating the inter-frame reference relationships includes the information about the inter-frame reference relationships of the N frames preceding to the current frame. The information about the inter-frame reference relationships of the N frames preceding to the current frame indicates that each of the preceding N frames references the forward LTR frame that has the shortest temporal distance to each of the preceding N frames. The forward LTR frame is an encoded video frame marked by a transmit end device as an LTR frame. In other words, in this embodiment, when marking an LTR frame, the transmit end device does not need to wait for feedback from a receive end device, and therefore can mark a plurality of LTR frames in one RTT. This can greatly shorten an inter-frame reference distance, and improve coding quality of the video picture.

In a possible implementation, the information indicating the inter-frame reference relationships further includes information about inter-frame reference relationships of M frames following the current frame, and the information about the inter-frame reference relationships of the M frames following the current frame indicates that each of the following M frames references a previous frame of each of the following M frames, where N and M are positive integers. For example, specific values of N and M may depend on a network.

It should be noted that there may be another frame between the M frames following the current frame and the current frame, or there may be temporal neighbor relationships between the M frames following the current frame and the current frame. For the former case, the another frame may have an inter-frame reference relationship the same as those of the following M frames, or have another inter-frame reference relationship.

In a poor network and high latency scenario, when an interval between LTR frames is excessively long, if each of all frames subsequent to an LTR frame references a forward LTR frame that has a shortest temporal distance to each of all the frames, an inter-frame reference distance is bound to be excessively long, and coding quality is significantly degraded. In this case, the transmit end device determines that the current frame references the target forward LTR frame that has the shortest temporal distance to the current frame, and determines that each of the M frames following the current frame references the previous frame of each of the M frames, so that the inter-frame reference distance can be shortened, and the coding quality in the poor network environment can be improved. This implements adaptive selection of a reference relationship. For example, a full-reference relationship and a frame-by-frame reference relationship are flexibly combined. This avoids, to some extent, referencing a reference frame that has a long temporal distance to the current frame, greatly alleviates a video frame freezing phenomenon and a problem of a blurry picture that are caused by packet loss, and implements a good balance between picture quality and picture smoothness.

In a possible implementation, the information indicating the inter-frame reference relationships further includes information about inter-frame reference relationships of M frames following the current frame, and the information about the inter-frame reference relationships of the M frames following the current frame indicates that each of the following M frames references a forward LTR frame that has a shortest temporal distance to each of the following M frames, where N and M are positive integers. For example, specific values of N and M may depend on a network.

It should be noted that there may be another frame between the M frames following the current frame and the current frame, or there may be temporal neighbor relationships between the M frames following the current frame and the current frame. For the former case, the another frame may have an inter-frame reference relationship the same as those of the following M frames, or have another inter-frame reference relationship.

According to a ninth aspect, this application provides a device for encoding a video picture. The device includes a storage medium and a central processing unit. The storage medium may be a non-volatile storage medium, and the storage medium stores a computer-executable program. The central processing unit is connected to the non-volatile storage medium, and executes the computer-executable program to implement the method according to any one of the first aspect or the possible implementations of the first aspect.

According to a tenth aspect, this application provides a device for encoding a video picture. The device includes a storage medium and a central processing unit. The storage medium may be a non-volatile storage medium, and the storage medium stores a computer-executable program. The central processing unit is connected to the non-volatile storage medium, and executes the computer-executable program to implement the method according to any one of the second aspect or the possible implementations of the second aspect.

According to an eleventh aspect, this application provides a device for decoding a video picture. The device includes a storage medium and a central processing unit. The storage medium may be a non-volatile storage medium, and the storage medium stores a computer-executable program. The central processing unit is connected to the non-volatile storage medium, and executes the computer-executable program to implement the method according to the fourth aspect.

According to a twelfth aspect, an embodiment of this application provides a device decoding video data, where the device includes:
- a memory, configured to store video data in a form of a bitstream; and
- a video decoder, configured to: decode, from the bitstream, information indicating inter-frame reference relationships, where the information indicating the inter-frame reference relationships includes information about an inter-frame reference relationship of a current frame and information about inter-frame reference relationships of N frames preceding to the current frame;
- the information about the inter-frame reference relationship of the current frame indicates that the current frame references a target forward long-term reference LTR frame that has a shortest temporal distance to the current frame;
- the information about the inter-frame reference relationships of the N frames preceding to the current frame indicates that each of the preceding N frames references a forward LTR frame that has a shortest temporal distance to each of the preceding N frames; and
- reconstruct the plurality of video frames, where the reconstructing the plurality of video frames includes: reconstructing a current video frame based on a reference frame of the current frame.

According to a thirteenth aspect, an embodiment of this application provides a device for encoding video data, where the device includes:
- a memory, configured to store video data, where the video data includes one or more video frames; and
- a video encoder, configured to encode the plurality of video frames to obtain an encoded bitstream, where the bitstream includes at least information indicating inter-frame reference relationships; the bitstream may further include encoded data, for example, residual data between a current frame and a reference frame; and the information indicating the inter-frame reference relationships may be placed in a slice header (slice header); and
- send the encoded bitstream, where the information indicating the inter-frame reference relationships includes information about an inter-frame reference relationship of the current frame and information about inter-frame reference relationships of N frames preceding to the current frame.

The information about the inter-frame reference relationship of the current frame indicates that the current frame references a target forward long-term reference LTR frame that has a shortest temporal distance to the current frame. The target forward LTR frame is a forward LTR frame for which the device for encoding video data receives an acknowledgment message from a device for decoding video data. Specifically, the target forward LTR frame may be an encoded video frame that is marked by the device for encoding video data as an LTR frame and for which the acknowledgment message sent by the device for decoding video data is received, and the acknowledgment message corresponds to the target forward LTR frame.

The information about the inter-frame reference relationships of the N frames preceding to the current frame indicates that each of the preceding N frames references a forward LTR frame that has a shortest temporal distance to each of the preceding N frames, and the forward LTR frame is an encoded video frame marked by the device for encoding video data as an LTR frame. In this application, the forward LTR frame is stored in a DPB.

It should be understood that the technical solutions in the second aspect to the tenth aspect in this application are consistent with the technical solution in the first aspect in this application, and beneficial effects achieved in the aspects and corresponding feasible implementations are similar. Therefore, details are not described again.

According to a fourteenth aspect, this application provides a computer-readable storage medium. The computer-readable storage medium stores a computer program. When the computer program is run on a computer, the computer is enabled to perform the method according to the first aspect, the second aspect, the third aspect, or the fourth aspect.

According to a fifteenth aspect, this application provides a computer program. When the computer program is executed by a computer, the computer is enabled to perform the method according to the first aspect, the second aspect, the third aspect, or the fourth aspect.

In a possible design, all or some of the programs in the fifteenth aspect may be stored in a storage medium integrated with a processor, or some or all of the programs may be stored in a memory that is not integrated with a processor.

DESCRIPTION OF EMBODIMENTS

Terms used in implementations of this application are merely used to explain specific embodiments of this application, but are not intended to limit this application.

A method for transmitting a video picture provided in the embodiments of this application may be applied to various real-time audio and video interaction scenarios. For example, the method for transmitting a video picture provided in this application may be used in a scenario in which two users make a video call by using respective electronic devices, or in a scenario in which a plurality of users make a video conference call by using respective electronic devices.

Figure 1:
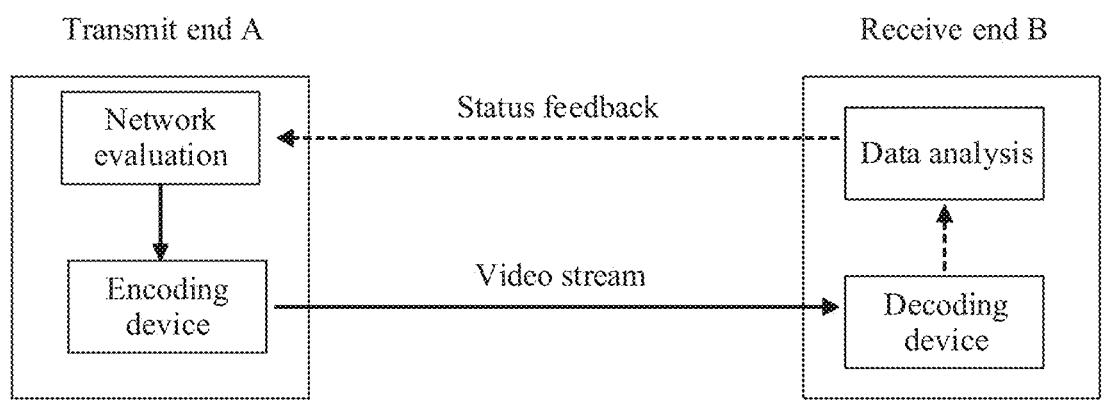
FIG. 1 is a schematic diagram of making a video call between two users by using respective electronic devices.

FIG. 1 is a schematic diagram of making a video call between two users by using respective electronic devices. As shown in FIG. 1, the two users may be a user A and a user B. When the user A sends a video stream to the user B, the electronic device used by the user A may be a transmit end A, and the electronic device used by the user B may be a receive end B. The transmit end A sends an encoded video stream to the receive end B, and the receive end B feeds back a receiving status of a video frame and network status information to the transmit end A in real time. The transmit end A evaluates a network status based on the information fed back by the receive end B, adjusts a video frame encoding parameter based on the receiving status of the video frame and the network status that are fed back by the receive end B, and sends an encoded video stream to the receive end B. Similarly, when the user B sends a video stream to the user A, the electronic device used by the user B may serve as a transmit end B, and the electronic device used by the user A may serve as a receive end A. In this case, a similar processing mechanism is used in a direction from the transmit end B to the receive end A. Details are not described again.

Figure 2:
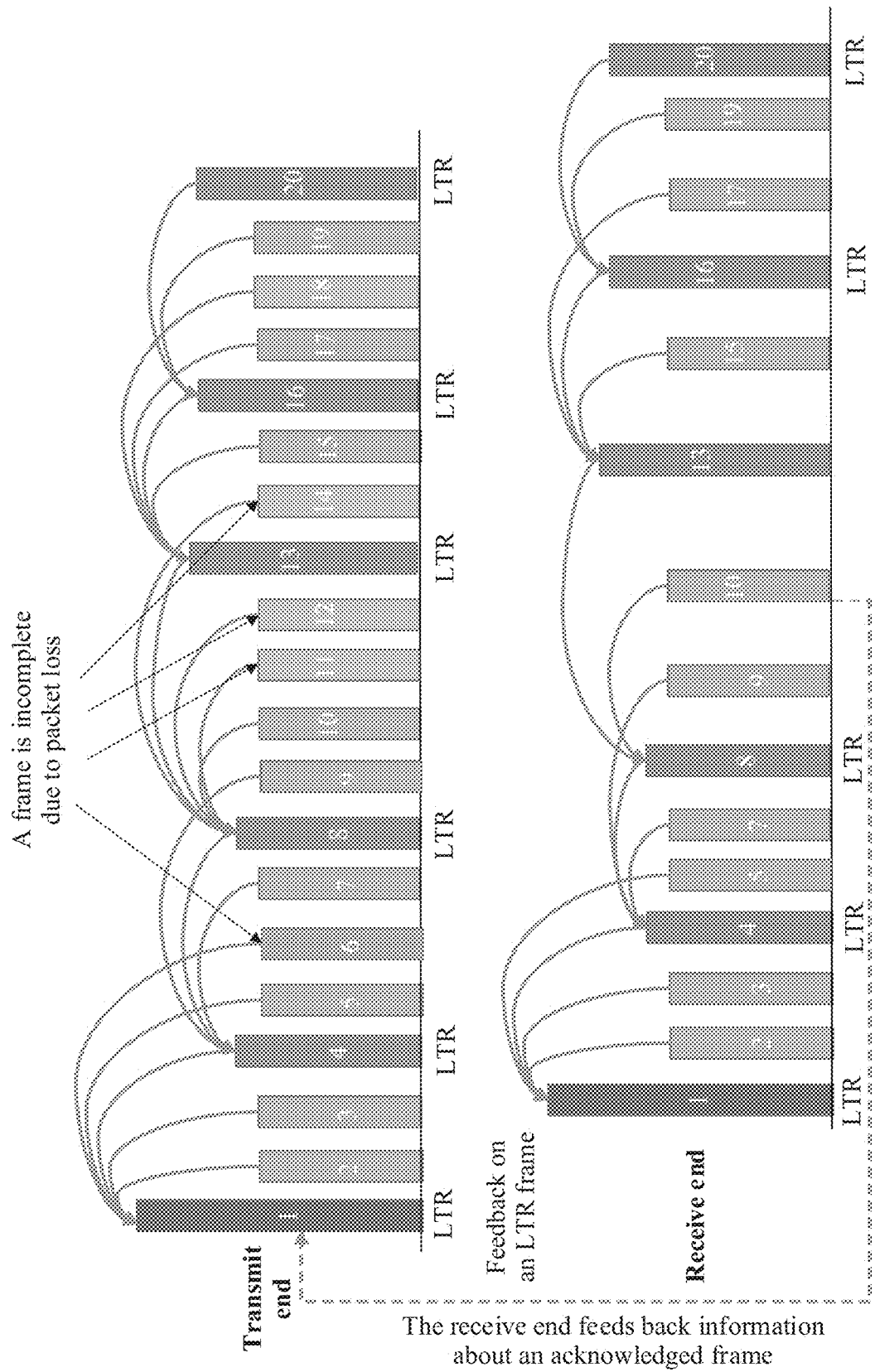
FIG. 2 is a diagram of a reference structure for encoding a video frame in the related conventional technology.

FIG. 2 is a diagram of a reference structure for encoding a video frame in the related conventional technology. For example, a transmit end A sends a video stream to a receive end B. The transmit end A selects information such as an appropriate I frame interval, an encoding bit rate, video resolution, and a frame rate based on a network status such as an available network bandwidth and/or network latency fed back by the receive end B. In a session process, the transmit end A may further set an inter-frame reference relationship for a current frame based on a receiving status of each frame fed back by the receive end B, and separately mark video frames in a decoded picture buffer (DPB for short) on an encoder side as a long-term reference (Long-Term Reference, LTR for short) frame, a non-reference frame, and a short-term reference frame. When encoding the current frame, the transmit end A uses an LTR frame acknowledged by the receive end B as a reference for encoding, to ensure good smoothness of a video picture. Herein, the LTR frame acknowledged by the receive end B means that the transmit end A receives an acknowledgment message sent by the receive end B, and the acknowledgment message indicates that the LTR frame can be normally decoded by the receive end B. As shown in FIG. 2, the receive end B feeds back, in real time, information about a decodable frame, and the transmit end A selects a video frame from the video frames buffered in the DPB, marks the selected video frame as an LTR frame, and encodes the current frame by using the newly marked LTR frame as a reference frame.

An advantage of such a reference relationship is as follows: An acknowledged LTR frame is used as a reference frame to encode a video frame to be received by the receive end B, and a received video frame can be decoded and displayed provided that the received video frame is complete. As shown in FIG. 2, video data of five frames, that is, frames 6, 11, 12, 14, and 18, are incomplete due to packet loss. In this case, the transmit end A does not need to re-encode an I frame to restore a picture on the receive end B; and the receive end B can normally decode the five frames and then send the frames to a display module of the receive end B for rendering and display, provided that the receive end B can normally and completely receive a subsequent video frame.

However, in the related conventional technology, it is clear that the reference structure for encoding a video frame has a problem, and latency and packet loss occur in a poor network environment. A reason is as follows: A reference frame used by the transmit end to encode a current video frame is a video frame that is received and acknowledged by the receive end before one network round-trip time (Round-Trip Time, RTT for short), a distance between the current video frame and the reference frame is closely related to latency (at least one RTT is required), and longer latency indicates a longer distance between the current video frame and the reference frame. As a result, picture quality is significantly affected.

For the problem in the related conventional technology that picture quality is significantly degraded, in this application, a reference structure for encoding a frame is redesigned, to handle a situation such as burst packet loss, a high packet loss rate, or congestion on a live network, implement a balance between smoothness and definition, and achieve optimal video call experience.

Figure 3:
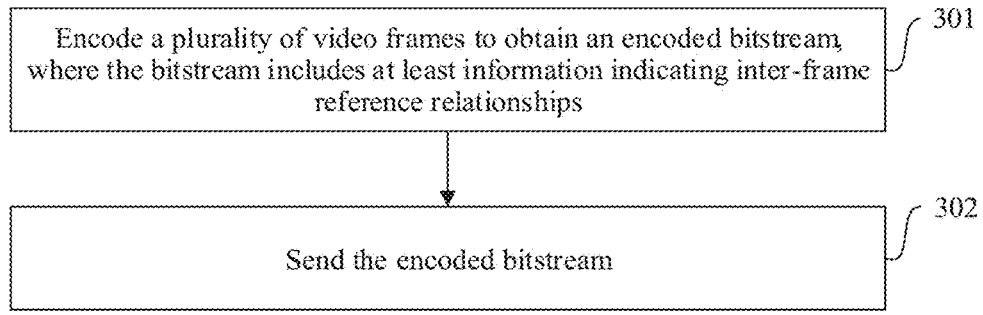
FIG. 3 is a flowchart of a method for transmitting a video picture according to an embodiment of this application.

FIG. 3 is a flowchart of a method for transmitting a video picture according to an embodiment of this application. In this embodiment, the video picture may include a plurality of video frames. As shown in FIG. 3, the method for transmitting a video picture may include the following steps.

Step 301: Encode the plurality of video frames to obtain an encoded bitstream, where the bitstream includes at least information indicating inter-frame reference relationships;

the bitstream may further include encoded data, for example, residual data between a current frame and a reference frame; and the information indicating the inter-frame reference relationships may be placed in a slice header.

Step 302: Send the encoded bitstream.

The information indicating the inter-frame reference relationships includes information about an inter-frame reference relationship of a current frame and information about inter-frame reference relationships of N frames preceding to the current frame.

The information about the inter-frame reference relationship of the current frame indicates that the current frame references a target forward LTR frame that has a shortest temporal distance to the current frame. The target forward LTR frame is a forward LTR frame for which a transmit end device receives an acknowledgment message from a receive end device. Specifically, the target forward LTR frame may be an encoded video frame that is marked by the transmit end device as an LTR frame and for which the acknowledgment message sent by the receive end device is received, and the acknowledgment message corresponds to the target forward LTR frame. In this embodiment, the transmit end device is a local end, for example, may also be referred to as an encoding-side device, and the receive end device is a peer end or a remote end, for example, may also be referred to as a decoding-side device. In an example, it should be noted that the "target forward LTR frame that has a shortest temporal distance to the current frame" in "the information about the inter-frame reference relationship of the current frame indicates that the current frame references a target forward LTR frame that has a shortest temporal distance to the current frame" and the "target forward LTR frame that has the shortest distance" mean that, for example, a difference A between a POC of the current frame and a POC of the target forward LTR frame that has the shortest distance is less than a difference B between the POC of the current frame and a POC of another target forward LTR frame. In this embodiment of this application, the POC represents an order for displaying a video frame.

The information about the inter-frame reference relationships of the N frames preceding to the current frame indicates that each of the preceding N frames references a forward LTR frame that has a shortest temporal distance to each of the preceding N frames. The forward LTR frame is an encoded video frame marked by the transmit end device as an LTR frame, and the forward LTR frame is stored in a DPB. In an example, it should be noted that the "forward LTR frame that has a shortest temporal distance to each of the preceding N frames" in the "the information about the inter-frame reference relationships of the N frames preceding to the current frame indicates that each of the preceding N frames references a forward LTR frame that has a shortest temporal distance to each of the preceding N frames" and the "forward LTR that has the shortest distance" mean that, for example, a difference C between a POC of each of the preceding N frames and a POC of the forward LTR frame that has the shortest distance is less than a difference D between the POC of each of the preceding N frames and a POC of another forward LTR frame.

It should be noted that there may be another frame between the N frames preceding to the current frame and the current frame, or there may be temporal neighbor relationships between the N frames preceding to the current frame and the current frame. For the former case, the another frame may have an inter-frame reference relationship the same as those of the preceding N frames, or have another inter-frame reference relationship.

In other words, all of a plurality of frames between the current frame and the forward LTR frame (for example, A) that has the shortest temporal distance may reference a same LTR frame (for example, A), or some of the plurality of frames may reference a same LTR frame (for example, A).

According to the method for transmitting a video picture, the plurality of video frames are encoded to obtain the encoded bitstream. The bitstream includes at least the information indicating the inter-frame reference relationships. The information indicating the inter-frame reference relationships includes the information about the inter-frame reference relationships of the N frames preceding to the current frame. The information about the inter-frame reference relationships of the N frames preceding to the current frame indicates that each of the N frames preceding to the current frame references the forward LTR frame that has the shortest temporal distance to each of the N frames. The forward LTR frame is the encoded video frame marked by the transmit end device as the LTR frame. In other words, in this embodiment, when marking an LTR frame, the transmit end device does not need to wait for feedback from the receive end device, and therefore can mark a plurality of LTR frames in one RTT. This can greatly shorten an inter-frame reference distance, and improve coding quality of the video picture.

In this embodiment, the information indicating the inter-frame reference relationships further includes information about inter-frame reference relationships of M frames following the current frame, and the information about the inter-frame reference relationships of the M frames following the current frame indicates that each of the following M frames references a previous frame of each of the following M frames, where N and M are positive integers. For example, specific values of N and M may depend on a network.

It should be noted that there may be another frame between the M frames following the current frame and the current frame, or there may be temporal neighbor relationships between the M frames following the current frame and the current frame. For the former case, the another frame may have an inter-frame reference relationship the same as those of the following M frames, or have another inter-frame reference relationship.

In a poor network and high latency scenario, when an interval between LTR frames is excessively long, if each of all frames subsequent to an LTR frame references a forward LTR frame that has a shortest temporal distance to each of all the frames, an inter-frame reference distance is bound to be excessively long, and coding quality is significantly degraded. In this case, the transmit end device determines that the current frame references the target forward LTR frame that has the shortest temporal distance to the current frame, and determines that each of the M frames following the current frame references the previous frame of each of the M frames, so that the inter-frame reference distance can be shortened, and the coding quality in the poor network environment can be improved. This implements adaptive selection of a reference relationship. For example, a full-reference relationship and a frame-by-frame reference relationship are flexibly combined. This avoids, to some extent, referencing a reference frame that has a long temporal distance to the current frame, greatly alleviates a video frame freezing phenomenon and a problem of a blurry picture that are caused by packet loss, and implements a good balance between picture quality and picture smoothness.

In this embodiment, the information indicating the inter-frame reference relationships further includes information about inter-frame reference relationships of M frames following the current frame, and the information about the inter-frame reference relationships of the M frames following the current frame indicates that each of the following M frames references a forward LTR frame that has a shortest temporal distance to each of the following M frames, where N and M are positive integers. For example, specific values of N and M may depend on a network.

It should be noted that there may be another frame between the M frames following the current frame and the current frame, or there may be temporal neighbor relationships between the M frames following the current frame and the current frame. For the former case, the another frame may have an inter-frame reference relationship the same as those of the following M frames, or have another inter-frame reference relationship.

In this embodiment, the transmit end device may determine a value of N based on coding quality of n frames preceding to the current frame, where n<N. In a specific implementation, the transmit end device may determine the value of N based on the coding quality of the n frames preceding to the current frame, a motion scene for the video picture, and network status information fed back by the receive end device. The network status information may include one or more of a network packet loss rate, an available network bandwidth, and a network round-trip time RTT.

In an embodiment, the transmit end device may determine a value of N based on a result of comparing the coding quality of the n frames preceding to the current frame with a coding quality threshold. Specifically, after encoding each frame, the transmit end device may output a peak signal-to-noise ratio (Peak Signal-to-Noise Ratio, PSNR for short) indicating coding quality of the frame. If the transmit end device finds that a PSNR of each of the n frames preceding to the current frame is less than a PSNR of a previous frame, in other words, the PSNRs of the preceding n frames are on a downward trend, and a PSNR of a previous frame of the current frame is less than the coding quality threshold (namely, a PSNR threshold), the transmit end device determines that the current frame needs to reference the target forward LTR frame that has the shortest temporal distance to the current frame, and determines that each of the M frames following the current frame needs to reference a previous frame of each of the M frames. In this case, a quantity of frames between the current frame and the forward LTR frame that has the shortest temporal distance to the current frame is the value of N.

In this embodiment, the transmit end device may determine a value of M based on a quantity of video frames included per unit time. In a specific implementation, the transmit end device may determine the value of M based on the quantity of video frames included per unit time and the motion scene for the video picture. The unit time may be set based on system performance and/or an implementation requirement in a specific implementation. For example, the unit time may be 1 second.

In this embodiment, an LTR frame marking interval D has a function relationship with N and M. For example, the function relationship may be D=N+(M+1). The LTR frame marking interval is an interval of a quantity of frames at which an LTR frame is marked, that is, an interval of a quantity of frames from a previous marked LTR frame to a current marked LTR frame. For example, if the LTR frame marking interval is 4, after the current frame is marked as an LTR frame, there is an interval of four frames, that is, the 5$^{th}$ frame after the current frame is marked as an LTR frame.

In this embodiment, the information indicating the inter-frame reference relationships further includes information about inter-frame reference relationships of L frames, where L=(M1+1)+(M2+1)+ . . . +(Mn+1), the L frames temporally follow the M frames, the information about the inter-frame reference relationships of the L frames indicates that the first frame in the (Mn+1) frames references a target forward LTR frame that has a shortest temporal distance to the first frame, and indicates that each frame after the first frame in the (Mn+1) frames references a previous frame of each frame after the first frame, L is a positive integer, and n is a positive integer greater than or equal to 1.

Values of M1, M2, . . . , and Mn may be the same or different, and specific values may be determined based on an actual application scenario.

In a poor network and high latency scenario, when an interval between LTR frames is excessively long, if each of all frames subsequent to an LTR frame references a forward LTR frame that has a shortest temporal distance to each of all the frames, an inter-frame reference distance is bound to be excessively long, and coding quality is significantly degraded. In this case, when encoding the L frames following the M frames, the transmit end device may determine that the first frame in the (Mn+1) frames references the target forward LTR frame that has the shortest temporal distance to the first frame, and determine that each frame after the first frame in the (Mn+1) frames references the previous frame of each frame after the first frame, so that the inter-frame reference distance can be shortened, and the coding quality in the poor network environment can be improved. This implements adaptive selection of a reference relationship. For example, a full-reference relationship and a frame-by-frame reference relationship are flexibly combined. This avoids, to some extent, referencing a reference frame that has a long temporal distance to the current frame, greatly alleviates a video frame freezing phenomenon and a problem of a blurry picture that are caused by packet loss, and implements a good balance between picture quality and picture smoothness.

In this case, an LTR frame marking interval D has a function relationship with N and L. For example, the function relationship may be D=N+L, where L=(M1+1)+(M2+1)+ . . . +(Mn+1).

Figure 4A:
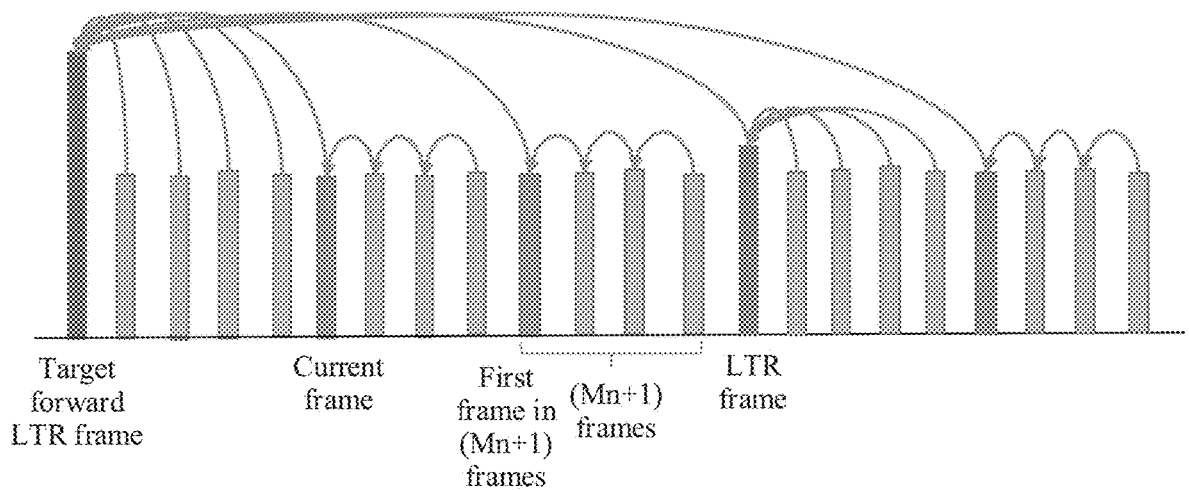
FIG. 4(a) to FIG. 4(c) are schematic diagrams of inter-frame reference relationships of video frames in a method for transmitting a video picture according to an embodiment of this application.
Figure 4B:
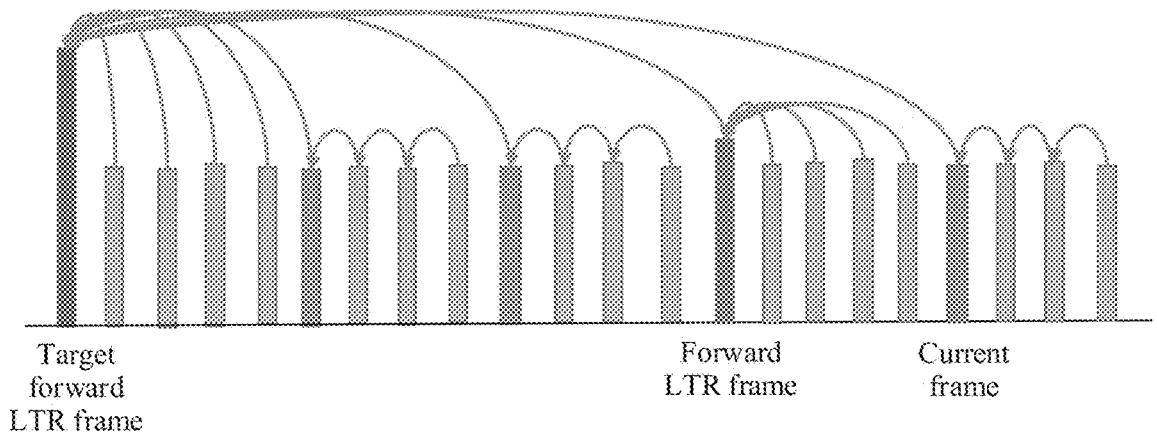
Figure 4C:
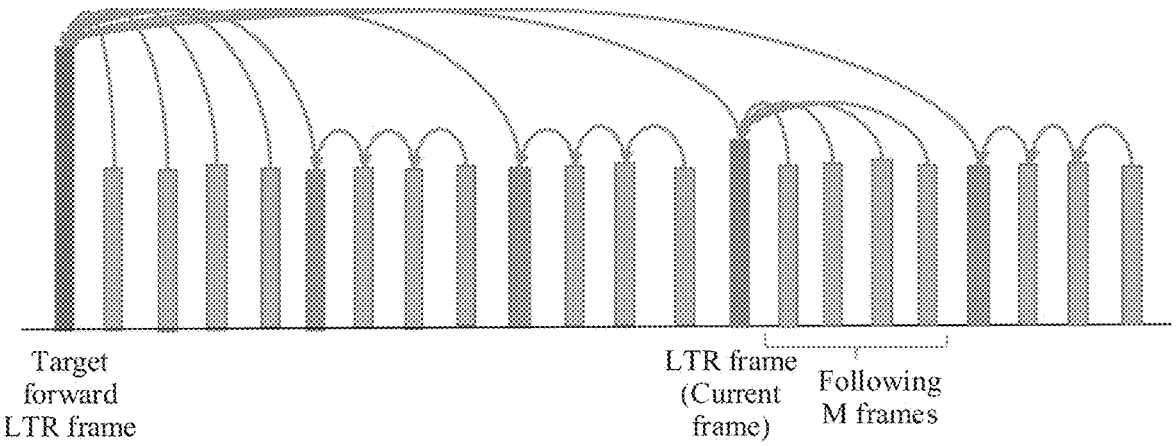

The following describes the method for transmitting a video picture provided in the embodiment shown in FIG. 3 in this application with reference to FIG. 4(a) to FIG. 4(c). FIG. 4(a) to FIG. 4(c) are schematic diagrams of inter-frame reference relationships of video frames in a method for transmitting a video picture according to an embodiment of this application.

As shown in FIG. 4(a), a current frame references a target forward LTR frame that has a shortest temporal distance to the current frame. For the current frame in FIG. 4(a), N=4, and M=3. Each of the four frames preceding to the current frame references a forward LTR frame that has a shortest temporal distance to each of the preceding four frames. In this example, the forward LTR frame that has the shortest temporal distance to each of the four frames preceding to the current frame is the target forward LTR frame. Certainly, the forward LTR frame referenced by each of the four frames preceding to the current frame may alternatively not be the target forward LTR frame. The forward LTR frame is an encoded video frame marked by the transmit end device as an LTR frame. Different from the target forward LTR frame, the forward LTR frame is marked by the transmit end device based on an LTR frame marking interval, and the transmit end device does not receive an acknowledgment message that is sent by the receive end device for the forward LTR frame.

Still as shown in FIG. 4(*a*), each of the three frames following the current frame references a previous frame of each of the following three frames.

In FIG. 4(*a*), after the three frames following the current frame, L frames are further included. In FIG. 4(*a*), L=4, that is, L=M1+1, where M1=3. A first frame in the four frames references a target forward LTR frame that has a shortest temporal distance to the first frame, and each frame after the first frame in the four frames references a previous frame of each frame after the first frame.

As shown in FIG. 4(*b*), for a current frame in FIG. 4(*b*), N=4, and M=3. Each of the four frames preceding to the current frame references a forward LTR frame that has a shortest temporal distance to each of the four frames preceding to the current frame. In this case, the forward LTR frame that has the shortest distance to each of the preceding four frames is not a target forward LTR frame.

Still as shown in FIG. 4(*b*), each of the three frames following the current frame references a previous frame of each of the following three frames.

As shown in FIG. 4(*c*), for a current frame in FIG. 4(*c*), when performing encoding, the transmit end device marks the current frame as an LTR frame. In this case, for the foregoing M frames following the current frame, each of the following M frames references a forward LTR frame that has a shortest temporal distance to each of the following M frames. The forward LTR frame herein is the current frame in FIG. 4(*c*).

In this embodiment, the transmit end device may determine the LTR frame marking interval D based on network status information fed back by the receive end device, where the network status information may include one or more of a network packet loss rate, an available network bandwidth, and a network round-trip time RTT.

Figure 5:
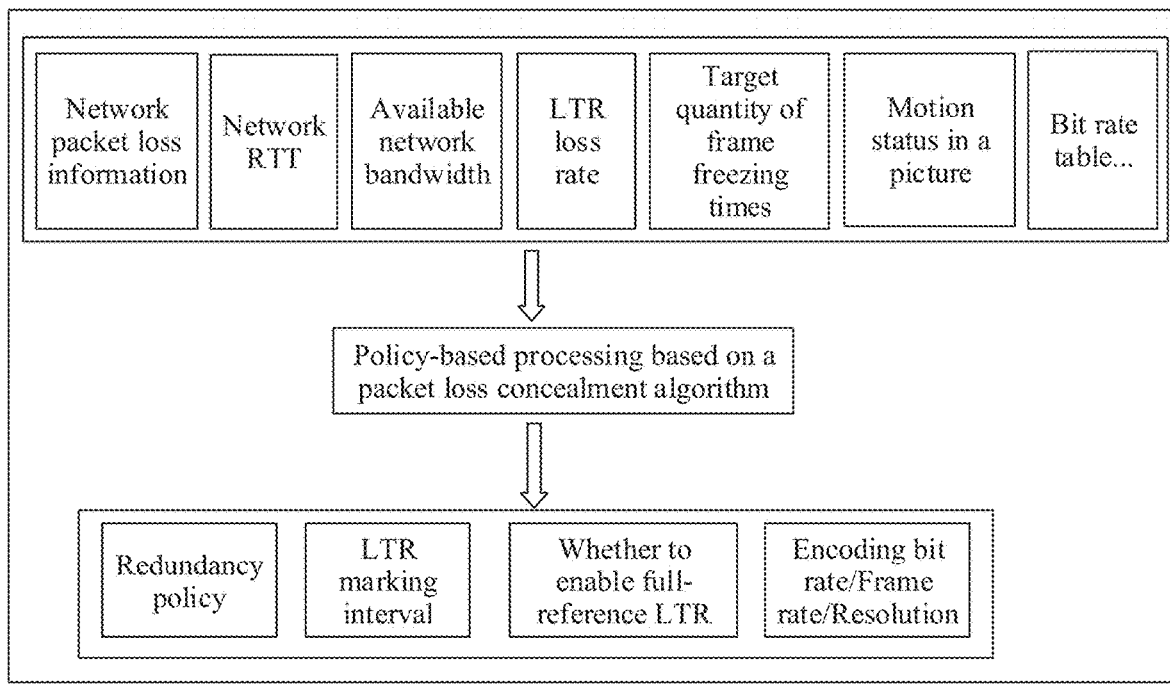
FIG. 5 is a schematic diagram of determining an LTR frame marking interval in a method for transmitting a video picture according to an embodiment of this application.

Specifically, FIG. 5 is a schematic diagram of determining an LTR frame marking interval in a method for transmitting a video picture according to an embodiment of this application. In a specific implementation, the transmit end device may determine a network feature based on network packet loss information and a network RTT. Then, the transmit end device may input, as a policy, one or more of the following information such as the network feature, a packet loss concealment algorithm, an acknowledged LTR frame fed back by a receive end, an LTR loss rate (an increase in a reference distance causes a quality loss to a coded picture based on a same bit rate), a motion scene in a video picture (that is, a motion status in a picture in FIG. 5), a bit rate table, a target quantity of frame freezing times, frame freezing duration that can be perceived by a person, and a quantity of LTR frames that can be buffered in a DPB, to obtain the LTR frame marking interval. The transmit end device may further obtain one or a combination of the following information: whether a forward LTR frame is fully referenced, a redundancy policy, resolution/a bit rate/a frame rate, and the like.

In this embodiment, the LTR frame marking interval D is used by the transmit end device to mark an LTR frame. The transmit end device marks the LTR frame based on the LTR frame marking interval, and therefore can mark a plurality of LTR frames in one RTT. In addition, in this application, the LTR frame marking interval is not set as a fixed value, but dynamically changes. A same interval or different intervals may be used, which is specifically determined based on an actual application scenario. This can greatly shorten an inter-frame reference distance, and improve coding quality of the video picture. In addition, in this embodiment, the transmit end device may dynamically determine the LTR frame marking interval based on information such as a network status. This can handle a poor network scenario such as burst packet loss, a high packet loss rate, or congestion on a live network in a timely manner, implement a balance between smoothness and definition, and achieve optimal video call experience.

Figure 6:
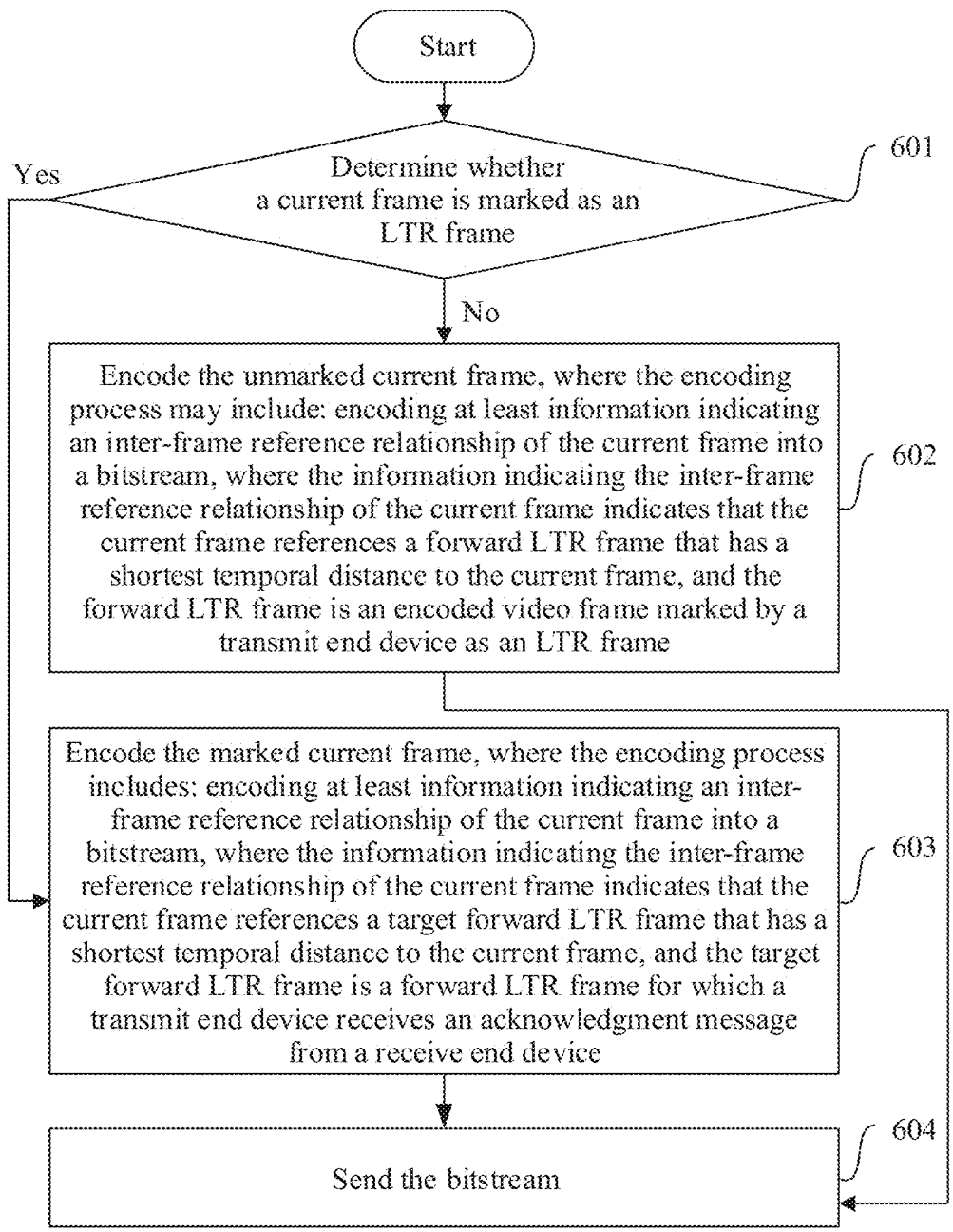
FIG. 6 is a flowchart of a method for transmitting a video picture according to another embodiment of this application.

FIG. 6 is a flowchart of a method for transmitting a video picture according to another embodiment of this application. In this embodiment, the video picture includes a plurality of video frames. As shown in FIG. 6, the method for transmitting a video picture may include the following steps.

Step 601: Determine whether a current frame is marked as an LTR frame.

If the current frame is not marked as the LTR frame, step 602 is performed. If the current frame is marked as the LTR frame, step 603 is performed.

Specifically, the determining whether a current frame is marked as an LTR frame may be: determining, based on an LTR frame marking interval, whether the current frame is marked as the LTR frame.

The determining, based on an LTR frame marking interval, whether the current frame is marked as the LTR frame may be: obtaining an interval of a quantity of frames between the current frame and the forward LTR frame that has the shortest temporal distance to the current frame; and marking the current frame as the LTR frame if the interval of the quantity of frames is equal to the LTR frame marking interval; or skipping marking the current frame as the LTR frame if the interval of the quantity of frames is not equal to the LTR frame marking interval.

Further, in this embodiment, a transmit end device may determine the LTR frame marking interval based on network status information fed back by a receive end device, where the network status information may include one or more of a network packet loss rate, an available network bandwidth, and a network round-trip time RTT.

As shown in FIG. 5, in a specific implementation, the transmit end device may determine a network feature based on network packet loss information and a network RTT. Then, the transmit end device may input, as a policy, one or more of the following information such as the network feature, a packet loss concealment algorithm, an acknowledged LTR frame fed back by a receive end, an LTR loss rate (an increase in a reference distance causes a quality loss to a coded picture based on a same bit rate), a motion scene in a video picture (that is, a motion status in a picture in FIG. 5), a bit rate table, a target quantity of frame freezing times, frame freezing duration that can be perceived by a person, and a quantity of LTR frames that can be buffered in a DPB, to obtain the LTR frame marking interval. The transmit end device may further obtain one or a combination of the following information: whether a forward LTR frame is fully referenced, a redundancy policy, resolution/a bit rate/a frame rate, and the like.

In this embodiment, the LTR frame is marked based on the LTR frame marking interval, and therefore a plurality of LTR frames can be marked in one RTT. This can greatly shorten an inter-frame reference distance, and improve coding quality of the video picture.

Step 602: Encode the unmarked current frame, where the encoding process may include: encoding at least information indicating an inter-frame reference relationship of the current frame into a bitstream, where the information indicating the inter-frame reference relationship of the current frame indicates that the current frame references a forward LTR frame that has a shortest temporal distance to the current frame, and the forward LTR frame is an encoded video frame marked by the transmit end device as an LTR frame. It should be noted that the forward LTR frame that has the shortest temporal distance to the current frame means that a difference between a POC of the current frame and a POC of the forward LTR frame that has the shortest temporal distance is less than a difference between the POC of the current frame and a POC of another forward LTR frame. Then, step 604 is performed.

Step 603: Encode the marked current frame, where the encoding process includes: encoding at least information indicating an inter-frame reference relationship of the current frame into a bitstream, where the information indicating the inter-frame reference relationship of the current frame indicates that the current frame references a target forward LTR frame that has a shortest temporal distance to the current frame; the target forward LTR frame is a forward LTR frame for which the transmit end device receives an acknowledgment message from the receive end device, and specifically, the target forward LTR frame is an encoded video frame that is marked by the transmit end device as an LTR frame and for which the acknowledgment message sent by the receive end device is received; and the acknowledgment message corresponds to the target forward LTR frame. Then, step 604 is performed.

In this application, the transmit end device is a local end, for example, may also be referred to as an encoding-side device, and the receive end device is a peer end or a remote end, for example, may also be referred to as a decoding-side device.

It should be noted that the target forward LTR frame that has the shortest temporal distance to the current frame means that a difference between a POC of the current frame and a POC of the target forward LTR frame is less than a difference between the POC of the current frame and a POC of another target forward LTR frame.

Step 604: Send the bitstream.

According to the method for transmitting a video picture, when the unmarked current frame is encoded, the forward LTR frame that has the shortest temporal distance to the unmarked current frame is referenced, where the forward LTR frame is the encoded video frame marked by the transmit end device as the LTR frame. In other words, in this embodiment, when marking an LTR frame, the transmit end device does not need to wait for feedback from the receive end device, and therefore can mark a plurality of LTR frames in one RTT. This can shorten an inter-frame reference distance, and improve coding quality of the video picture.

The following describes the method for transmitting a video picture provided in the embodiment shown in FIG. 6 in this application with reference to FIG. 7(*a*) and FIG. 7(*b*). FIG. 7(*a*) and FIG. 7(*b*) are schematic diagrams of inter-frame reference relationships of video frames in a method for transmitting a video picture according to another embodiment of this application.

As shown in FIG. 7(*a*), in an initial phase, an encoder side marks the first encoded I frame (that is, a frame 1 in FIG. 7) as an LTR frame, then performs packetization and redundancy processing on the encoded I frame, and sends the encoded I frame to a decoder side through a network. In addition, the encoder side uses all I frames as key frames and performs unequal redundancy protection that is different from protection of a common frame, to ensure that the decoder side can receive the complete key frames in a timely manner. After receiving the I frames and determining that the I frames can be normally decoded, the decoder side feeds back an acknowledgment message to the encoder side in a timely manner. If the transmit end device does not receive, within preset duration, an acknowledgment message fed back by the receive end device, the transmit end device re-encodes the I frames. This prevents an abnormal connection in the initial phase.

Then, when encoding a frame 2 and a frame 3, the transmit end device references the frame 1. When encoding a frame 4, the transmit end device receives network status information fed back by the receive end device. As described above, the transmit end device may determine an LTR frame marking interval based on the network status information fed back by the receive end device. In this case, the LTR frame marking interval determined by the transmit end device is 2. When encoding the frame 4, the transmit end device finds that an interval of a quantity of frames between the frame 4 and the frame 1 is 2, that is, the interval of the quantity of frames is equal to the LTR frame marking interval, and therefore, the transmit end device marks the frame 4 as an LTR frame. In this case, the transmit end device has received an acknowledgment message that is sent by the receive end device for the frame 1. In other words, the frame 1 can be normally decoded by the decoder side, and is a target forward LTR frame, and the frame 1 is a target forward LTR frame that has a shortest temporal distance to the frame 4. Therefore, the transmit end device references the frame 1 to encode the frame 4.

When the transmit end device encodes a frame 5, the transmit end device may also determine an LTR frame marking interval based on network status information fed back by the receive end device. In this case, the LTR frame marking interval determined by the transmit end device is 3. The frame 4 is a forward LTR frame that has a shortest temporal distance to the frame 5, and an interval of a quantity of frames between the frame 5 and the frame 4 is 1. Therefore, the frame 5 is not marked as an LTR frame. In this case, the transmit end device references a forward LTR frame that has a shortest temporal distance to the frame 5 (that is, the frame 4) to encode the frame 5.

An encoding process of a subsequent frame is similar to the foregoing encoding process. Details are not described again.

It should be noted that, when encoding a frame 16, the transmit end device may also determine an LTR frame marking interval based on network status information fed back by the receive end device. In this case, the LTR frame marking interval determined by the transmit end device is 2. A frame 13 is a forward LTR frame that has a shortest temporal distance to the frame 16, and an interval of a quantity of frames between the frame 16 and the frame 13 is 2. Therefore, the frame 16 is marked as an LTR frame. However, in this case, the transmit end device does not receive an acknowledgment message for the frame 13 from the receive end device. Therefore, a target forward LTR frame that has a shortest temporal distance to the frame 16 is a frame 8. In this case, the transmit end device references the frame 8 to encode the frame 16.

According to the method for transmitting a video picture provided in this embodiment, even if video frames are incomplete due to loss of data packets of several frames: the frame 5, a frame 6, a frame 12, the frame 13, a frame 14, and the frame 18, another received complete video frame can be normally decoded. In FIG. 7(*a*), a frame 15 is encoded by referencing the frame 13, and the frame 13 is incomplete. Therefore, the frame 15 cannot be decoded.

In step 602 in this embodiment, the information indicating the inter-frame reference relationship of the current frame indicates that the current frame references the forward LTR frame that has the shortest temporal distance to the current frame, the forward LTR frame is the encoded video frame marked by the transmit end device as the LTR frame, the current frame is not marked as the LTR frame, and coding quality of the current frame is higher than or equal to a coding quality threshold; or the information indicating the inter-frame reference relationship of the current frame indicates that the current frame references the forward LTR frame that has the shortest temporal distance to the current frame, the forward LTR frame is the encoded video frame marked by the transmit end device as the LTR frame, the current frame is not marked as the LTR frame, and coding quality of the current frame is lower than a coding quality threshold.

If the current frame is not marked as the LTR frame, when encoding the current frame, the transmit end device references the forward LTR frame that has the shortest temporal distance to the current frame; and after encoding the current frame, the transmit end device obtains the coding quality of the current frame, and compares the coding quality of the current frame with the coding quality threshold. If the coding quality of the current frame is lower than the coding quality threshold, when encoding a next frame of the current frame, the transmit end device references a target forward LTR frame that has a shortest temporal distance to the next frame, to improve coding quality of the next frame of the current frame.

Further, the transmit end device may further encode (M+1) frames following the current frame, where the encoding process includes: encoding information indicating inter-frame reference relationships of the (M+1) frames following the current frame into the bitstream, where the information indicating the inter-frame reference relationships of the following (M+1) frames indicates that the first frame in the following (M+1) frames references a target forward LTR frame that has a shortest temporal distance to the first frame, and indicate that each frame after the first frame in the following (M+1) frames references a previous frame of each frame after the first frame, where M is a positive integer; and the current frame is not marked as the LTR frame, and the coding quality of the current frame is lower than the coding quality threshold.

Further, the transmit end device may further encode a next frame of the current frame, where the encoding process includes: encoding information indicating an inter-frame reference relationship of the next frame of the current frame into the bitstream, where the information indicating the inter-frame reference relationship of the next frame indicates that the next frame references a target forward LTR frame that has a shortest temporal distance to the next frame, the current frame is not marked as the LTR frame, and the coding quality of the current frame is lower than the coding quality threshold.

Figure 7A:
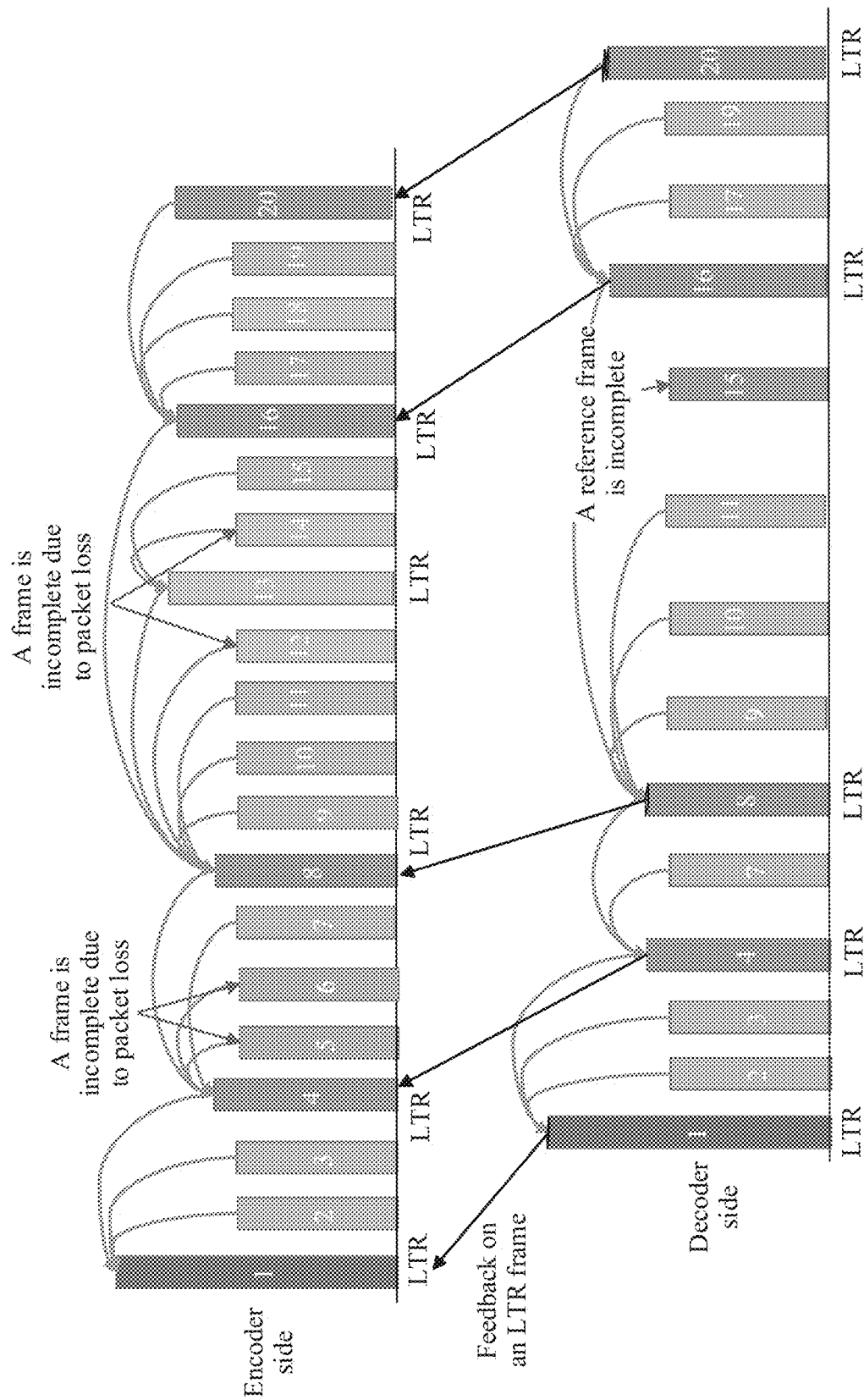
FIG. 7(a) and FIG. 7(b) are schematic diagrams of inter-frame reference relationships of video frames in a method for transmitting a video picture according to another embodiment of this application.
Figure 7B:
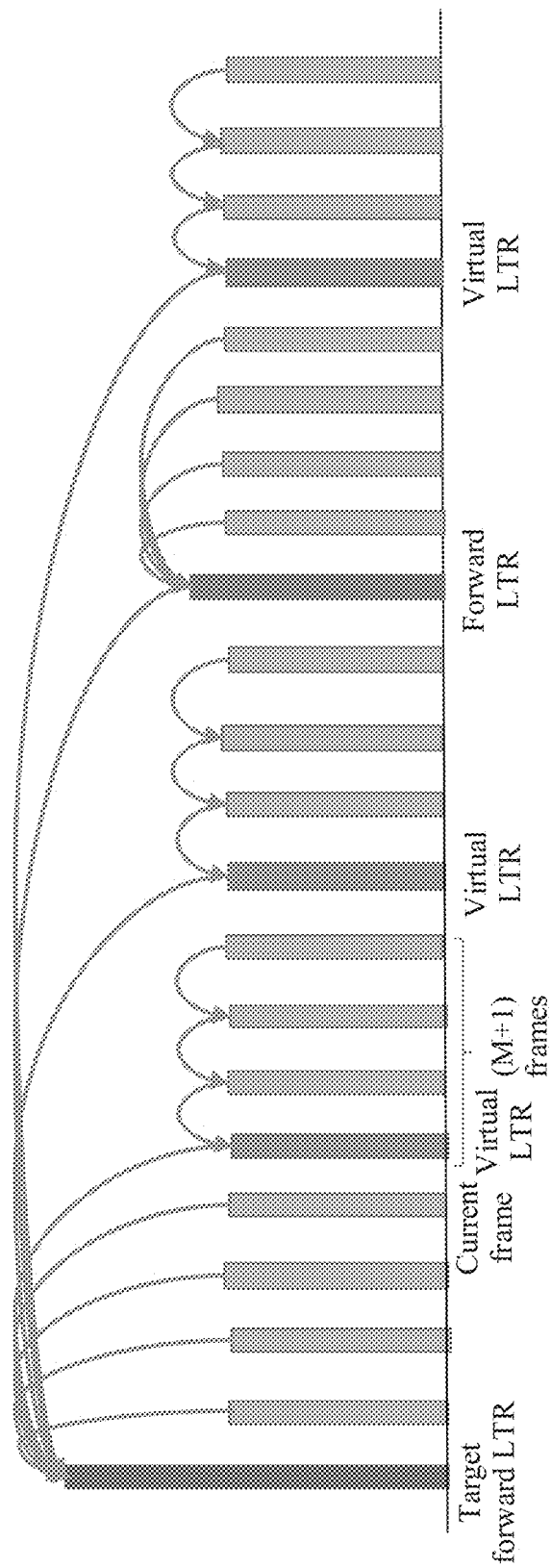

As shown in FIG. 7(b), during encoding the current frame by the transmit end device, if the current frame is not marked as the LTR frame, the transmit end device references the forward LTR frame that has the shortest temporal distance to the current frame to encode the current frame. After the transmit end device encodes the current frame, if the transmit end device finds that the coding quality of the current frame is less than the coding quality threshold (in other words, a PSNR of the current frame is less than a PSNR threshold), when encoding the next frame of the current frame, the transmit end device references the target forward LTR frame that has the shortest temporal distance to the next frame. As shown in FIG. 7(b), the next frame of the current frame is the first frame in the (M+1) frames following the current frame. When encoding each frame after the first frame, the transmit end device references a previous frame of each frame after the first frame.

In FIG. 7(b), the next frame of the current frame may be considered as a virtual LTR frame. The virtual LTR frame is encoded by using the target forward LTR frame as a reference frame, and the virtual LTR frame is not buffered in the DPB. A frame subsequent to the virtual LTR frame is encoded by using the virtual LTR frame as a short-term reference frame.

In a poor network and high latency scenario, when an interval between LTR frames is excessively long, if each of all frames subsequent to an LTR frame references a forward LTR frame that has a shortest temporal distance to each of all the frames, an inter-frame reference distance is bound to be excessively long, and coding quality is significantly degraded. As shown in FIG. 7(a), the frame 8 needs to be referenced to encode the frame 16, and a reference distance reaches 7 frames. Therefore, coding quality of the frame 16 is bound to be significantly degraded. In this case, after the transmit end device encodes the current frame, if the transmit end device finds that the coding quality of the current frame is lower than the coding quality threshold, the transmit end device determines that the first frame in the (M+1) frames following the current frame references the target forward LTR frame that has the shortest temporal distance to the first frame, and determines that each frame after the first frame in the following (M+1) frames references the previous frame of each frame after the first frame, as shown in FIG. 7(b), where M is a positive integer, so that the inter-frame reference distance can be shortened, and the coding quality in the poor network environment can be improved. This implements adaptive selection of a reference relationship. For example, a full-reference relationship and a frame-by-frame reference relationship are flexibly combined. This avoids, to some extent, referencing a reference frame that has a long temporal distance to the current frame, greatly alleviates a video frame freezing phenomenon and a problem of a blurry picture that are caused by packet loss, and implements a good balance between picture quality and picture smoothness.

In this embodiment, the transmit end device determines a value of M based on a quantity of video frames included per unit time. In a specific implementation, the transmit end device may determine the value of M based on the quantity of video frames included per unit time and the motion scene for the video picture. The unit time may be set based on system performance and/or an implementation requirement in a specific implementation. For example, the unit time may be 1 second.

Figure 8:
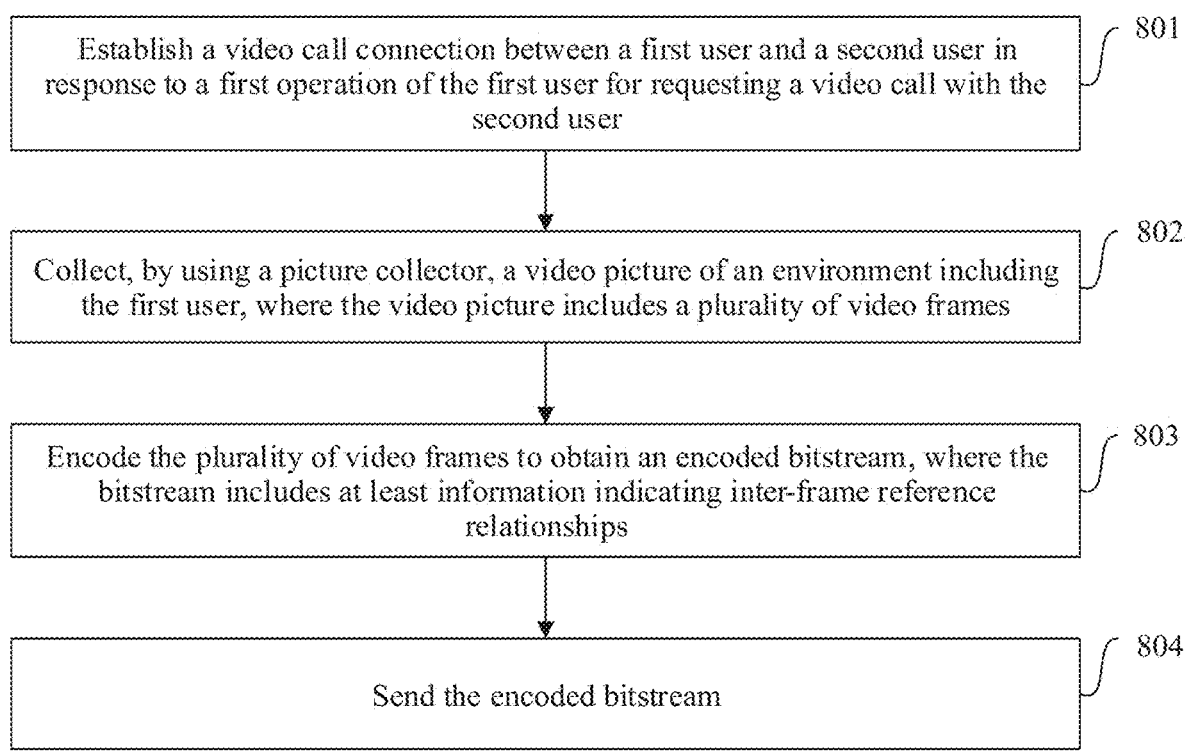
FIG. 8 is a flowchart of a video call method according to an embodiment of this application.

FIG. 8 is a flowchart of a video call method according to an embodiment of this application. The video call method provided in this embodiment may be applied to an electronic device having a display and a picture collector. The display may include a display of an in-vehicle computer (a mobile data center). The picture collector may be a camera, an in-vehicle sensor, or the like. The electronic device may be a device such as a mobile terminal (a mobile phone), a smart screen, a drone, or an intelligent and connected vehicle (ICV for short), a smart/intelligent car, or a vehicle-mounted device.

As shown in FIG. 8, the video call method may include the following steps.

Step 801: Establish a video call connection between a first user and a second user in response to a first operation of the first user for requesting a video call with the second user, where the video call connection herein represents a video call connection between an electronic device used by the first user and an electronic device used by the second user.

Specifically, FIG. 9(*a*) to FIG. 9(*c*) are schematic diagrams of requesting a video call in a video call method according to this application. As shown in FIG. 9(*a*), the first user may tap a phone icon 9*a* displayed on the electronic device used by the first user, to enter an interface shown in FIG. 9(*b*), tap an identifier of the second user in the interface shown in FIG. 9(*b*), to enter an interface shown in FIG. 9(*c*), and then tap a video call icon "MeeTime" 9*b* in the interface shown in FIG. 9(*c*), to complete the first operation for requesting the video call with the second user.

Then, the electronic device used by the first user establishes the video call connection between the first user and the second user in response to the first operation of the first user for requesting the video call with the second user.

During establishment of the video call connection, the electronic device used by the first user displays an interface shown in FIG. 9(*d*). After establishment of the video call connection, the electronic device used by the first user displays an interface shown in FIG. 9(*e*).

FIG. 9(*d*) shows an interface during establishment of a video call connection in a video call method according to this application.

Step 802: Collect, by using the picture collector, a video picture of an environment including the first user, where the video picture includes a plurality of video frames. The environment herein may be an internal environment and/or an external environment in which the first user is located, for example, an environment inside a vehicle and/or an ambient environment that is sensed during driving and in which intelligent detection of an obstacle is performed.

The picture collector may be a camera or an in-vehicle sensor in the electronic device used by the first user.

Step 803: Encode the plurality of video frames to obtain an encoded bitstream, where the bitstream includes at least information indicating inter-frame reference relationships.

Step 804: Send the encoded bitstream.

Specifically, the bitstream may be sent to the electronic device used by the second user.

The information indicating the inter-frame reference relationships includes information about an inter-frame reference relationship of a current frame and information about inter-frame reference relationships of N frames preceding to the current frame.

The information about the inter-frame reference relationship of the current frame indicates that the current frame references a target forward long-term reference LTR frame that has a shortest temporal distance to the current frame. The target forward LTR frame is an encoded video frame that is marked by a transmit end device as an LTR frame and for which an acknowledgment message sent by a receive end device is received, and the acknowledgment message corresponds to the target forward LTR frame. The transmit end device is the electronic device used by the first user, and the receive end device is the electronic device used by the second user.

The information about the inter-frame reference relationships of the N frames preceding to the current frame indicates that each of the preceding N frames references a forward LTR frame that has a shortest temporal distance to each of the preceding N frames, the forward LTR frame is an encoded video frame marked by the transmit end device as an LTR frame.

It should be noted that there may be another frame between the N frames preceding to the current frame and the current frame, or there may be temporal neighbor relationships between the N frames preceding to the current frame and the current frame. For the former case, the another frame may have an inter-frame reference relationship the same as those of the preceding N frames, or have another inter-frame reference relationship.

In other words, all of a plurality of frames between the current frame and the forward LTR frame (for example, A) that has the shortest temporal distance may reference a same LTR frame (for example, A), or some of the plurality of frames may reference a same LTR frame (for example, A).

According to the video call method, after the video call connection between the first user and the second user is established in response to the first operation of the first user for requesting the video call with the second user, the video picture of the environment including the first user is collected by using the picture collector, and then the plurality of video frames included in the video picture are encoded to obtain the encoded bitstream. The bitstream includes at least the information indicating the inter-frame reference relationships. The information indicating the inter-frame reference relationships includes the information about the inter-frame reference relationships of the N frames preceding to the current frame. The information about the inter-frame reference relationships of the N frames preceding to the current frame indicates that each of the N frames preceding to the current frame references the forward LTR frame that has the shortest temporal distance to each of the N frames. The forward LTR frame is the encoded video frame marked by the transmit end device as the LTR frame. In other words, in this embodiment, when marking an LTR frame, the transmit end device does not need to wait for feedback from the receive end device, and therefore can mark a plurality of LTR frames in one RTT. This can greatly shorten an inter-frame reference distance, and improve coding quality of the video picture.

In this embodiment, the information indicating the inter-frame reference relationships further includes information about inter-frame reference relationships of M frames following the current frame, and the information about the inter-frame reference relationships of the M frames following the current frame indicates that each of the following M frames references a previous frame of each of the following M frames, where N and M are positive integers. For example, specific values of N and M may depend on a network.

It should be noted that there may be another frame between the M frames following the current frame and the current frame, or there may be temporal neighbor relationships between the M frames following the current frame and the current frame. For the former case, the another frame may have an inter-frame reference relationship the same as those of the following M frames, or have another inter-frame reference relationship.

In a poor network and high latency scenario, when an interval between LTR frames is excessively long, if each of all frames subsequent to an LTR frame references a forward LTR frame that has a shortest temporal distance to each of all the frames, an inter-frame reference distance is bound to be excessively long, and coding quality is significantly degraded. In this case, the transmit end device determines that the current frame references the target forward LTR frame that has the shortest temporal distance to the current frame, and determines that each of the M frames following the current frame references the previous frame of each of the M frames, so that the inter-frame reference distance can be shortened, and the coding quality in the poor network environment can be improved. This implements adaptive selection of a reference relationship. For example, a full-reference relationship and a frame-by-frame reference relationship are flexibly combined. This avoids, to some extent, referencing a reference frame that has a long temporal distance to the current frame, greatly alleviates a video frame freezing phenomenon and a problem of a blurry picture that are caused by packet loss, and implements a good balance between picture quality and picture smoothness.

In this embodiment, the information indicating the inter-frame reference relationships further includes information about inter-frame reference relationships of M frames following the current frame, and the information about the inter-frame reference relationships of the M frames following the current frame indicates that each of the following M frames references a forward LTR frame that has a shortest temporal distance to each of the following M frames, where N and M are positive integers. For example, specific values of N and M may depend on a network.

It should be noted that there may be another frame between the M frames following the current frame and the current frame, or there may be temporal neighbor relationships between the M frames following the current frame and the current frame. For the former case, the another frame may have an inter-frame reference relationship the same as those of the following M frames, or have another inter-frame reference relationship.

In this embodiment, the transmit end device determines a value of N based on coding quality of n frames preceding to the current frame, where n<N. In a specific implementation, the transmit end device may determine the value of N based on the coding quality of the n frames preceding to the current frame, a motion scene for the video picture, and network status information fed back by the receive end device. The network status information may include one or more of a network packet loss rate, an available network bandwidth, and a network round-trip time RTT.

In a possible implementation, the transmit end device determines a value of N based on a result of comparing the coding quality of the n frames preceding to the current frame with a coding quality threshold. Specifically, after encoding each frame, the transmit end device may output a PSNR indicating coding quality of the frame. If the transmit end device finds that a PSNR of each of the n frames preceding to the current frame is less than a PSNR of a previous frame, in other words, the PSNRs of the preceding n frames are on a downward trend, and a PSNR of a previous frame of the current frame is less than the coding quality threshold (namely, a PSNR threshold), the transmit end device determines that the current frame needs to reference the target forward LTR frame that has the shortest temporal distance to the current frame, and determines that each of the M frames following the current frame needs to reference a previous frame of each of the M frames. In this case, a quantity of frames between the current frame and the forward LTR frame that has the shortest temporal distance to the current frame is the value of N.

In a possible implementation, the transmit end device determines a value of M based on a quantity of video frames included per unit time. In a specific implementation, the transmit end device may determine the value of M based on the quantity of video frames included per unit time and the motion scene for the video picture. The unit time may be set based on system performance and/or an implementation requirement in a specific implementation. For example, the unit time may be 1 second.

In a possible implementation, an LTR frame marking interval D has a function relationship with N and M. For example, the function relationship may be D=N+(M+1). The LTR frame marking interval is an interval of a quantity of frames at which an LTR frame is marked, that is, an interval of a quantity of frames from a previous marked LTR frame to a current marked LTR frame. For example, if the LTR frame marking interval is 4, after the current frame is marked as an LTR frame, there is an interval of four frames, that is, the $5^{th}$ frame after the current frame is marked as an LTR frame.

In a possible implementation, the information indicating the inter-frame reference relationships further includes information about inter-frame reference relationships of L frames, where L=(M1+1)+(M2+1)+ . . . +(Mn+1), the L frames temporally follow the M frames, the information about the inter-frame reference relationships of the L frames indicates that the first frame in the (Mn+1) frames references a target forward LTR frame that has a shortest temporal distance to the first frame, and indicates that each frame after the first frame in the (Mn+1) frames references a previous frame of each frame after the first frame, L is a positive integer, and n is a positive integer greater than or equal to 1.

Values of M1, M2, . . . , and Mn may be the same or different, and specific values may be determined based on an actual application scenario.

In a poor network and high latency scenario, when an interval between LTR frames is excessively long, if each of all frames subsequent to an LTR frame references a forward LTR frame that has a shortest temporal distance to each of all the frames, an inter-frame reference distance is bound to be excessively long, and coding quality is significantly degraded. In this case, when encoding the L frames following the M frames, the transmit end device may determine that the first frame in the (Mn+1) frames references the target forward LTR frame that has the shortest temporal distance to the first frame, and determine that each frame after the first frame in the (Mn+1) frames references the previous frame of each frame after the first frame, so that the inter-frame reference distance can be shortened, and the coding quality in the poor network environment can be improved. This implements adaptive selection of a reference relationship. For example, a full-reference relationship and a frame-by-frame reference relationship are flexibly combined. This avoids, to some extent, referencing a reference frame that has a long temporal distance to the current frame, greatly alleviates a video frame freezing phenomenon and a problem of a blurry picture that are caused by packet loss, and implements a good balance between picture quality and picture smoothness.

In a possible implementation, an LTR frame marking interval D has a function relationship with N and L. For example, the function relationship may be D=N+L, where L=(M1+1)+(M2+1)+ . . . +(Mn+1).

As shown in FIG. 4(a), a current frame references a target forward LTR frame that has a shortest temporal distance to the current frame. For the current frame in FIG. 4(a), N=4, and M=3. Each of the four frames preceding to the current frame references a forward LTR frame that has a shortest temporal distance to each of the preceding four frames. In this example, the forward LTR frame that has the shortest temporal distance to each of the four frames preceding to the current frame is the target forward LTR frame. Certainly, the forward LTR frame referenced by each of the four frames preceding to the current frame may alternatively not be the target forward LTR frame. The forward LTR frame is an encoded video frame marked by the transmit end device as an LTR frame. Different from the target forward LTR frame, the forward LTR frame is marked by the transmit end device based on an LTR frame marking interval, and the transmit end device does not receive an acknowledgment message that is sent by the receive end device for the forward LTR frame.

Still as shown in FIG. 4(a), each of the three frames following the current frame references a previous frame of each of the following three frames.

In FIG. 4(a), after the three frames following the current frame, L frames are further included. In FIG. 4(a), L=4, that is, L=M1+1, where M1=3. A first frame in the four frames references a target forward LTR frame that has a shortest temporal distance to the first frame, and each frame after the first frame in the four frames references a previous frame of each frame after the first frame.

As shown in FIG. 4(b), for a current frame in FIG. 4(b), N=4, and M=3. Each of the four frames preceding to the current frame references a forward LTR frame that has a shortest temporal distance to each of the four frames preceding to the current frame. In this case, the forward LTR frame that has the shortest distance to each of the preceding four frames is not a target forward LTR frame.

Still as shown in FIG. 4(b), each of the three frames following the current frame references a previous frame of each of the following three frames.

As shown in FIG. 4(c), for a current frame in FIG. 4(c), when performing encoding, the transmit end device marks the current frame as an LTR frame. In this case, for the foregoing M frames following the current frame, each of the following M frames references a forward LTR frame that has a shortest temporal distance to each of the following M frames. The forward LTR frame herein is the current frame in FIG. 4(c).

In this embodiment, the transmit end device may determine the LTR frame marking interval D based on network status information fed back by the receive end device, where the network status information may include one or more of a network packet loss rate, an available network bandwidth, and a network round-trip time RTT.

Specifically, as shown in FIG. 5, the transmit end device may determine a network feature based on network packet loss information and a network RTT. Then, the transmit end device may input, as a policy, one or more of the following information such as the network feature, a packet loss concealment algorithm, an acknowledged LTR frame fed back by a receive end, an LTR loss rate (an increase in a reference distance causes a quality loss to a coded picture based on a same bit rate), a motion scene in a video picture (that is, a motion status in a picture in FIG. 5), a bit rate table, a target quantity of frame freezing times, frame freezing duration that can be perceived by a person, and a quantity of LTR frames that can be buffered in a DPB, to obtain the LTR frame marking interval. The transmit end device may further obtain one or a combination of the following information: whether a forward LTR frame is fully referenced, a redundancy policy, resolution/a bit rate/a frame rate, and the like.

In a possible implementation, the LTR frame marking interval D is used by the transmit end device to mark an LTR frame.

The transmit end device marks the LTR frame based on the LTR frame marking interval, and therefore can mark a plurality of LTR frames in one RTT. This can greatly shorten an inter-frame reference distance, and improve coding quality of the video picture. In addition, in this embodiment, the transmit end device may dynamically determine the LTR frame marking interval based on information such as a network status. This can handle a poor network scenario such as burst packet loss, a high packet loss rate, or congestion on a live network in a timely manner, implement a balance between smoothness and definition, and achieve optimal video call experience.

Figure 9A:
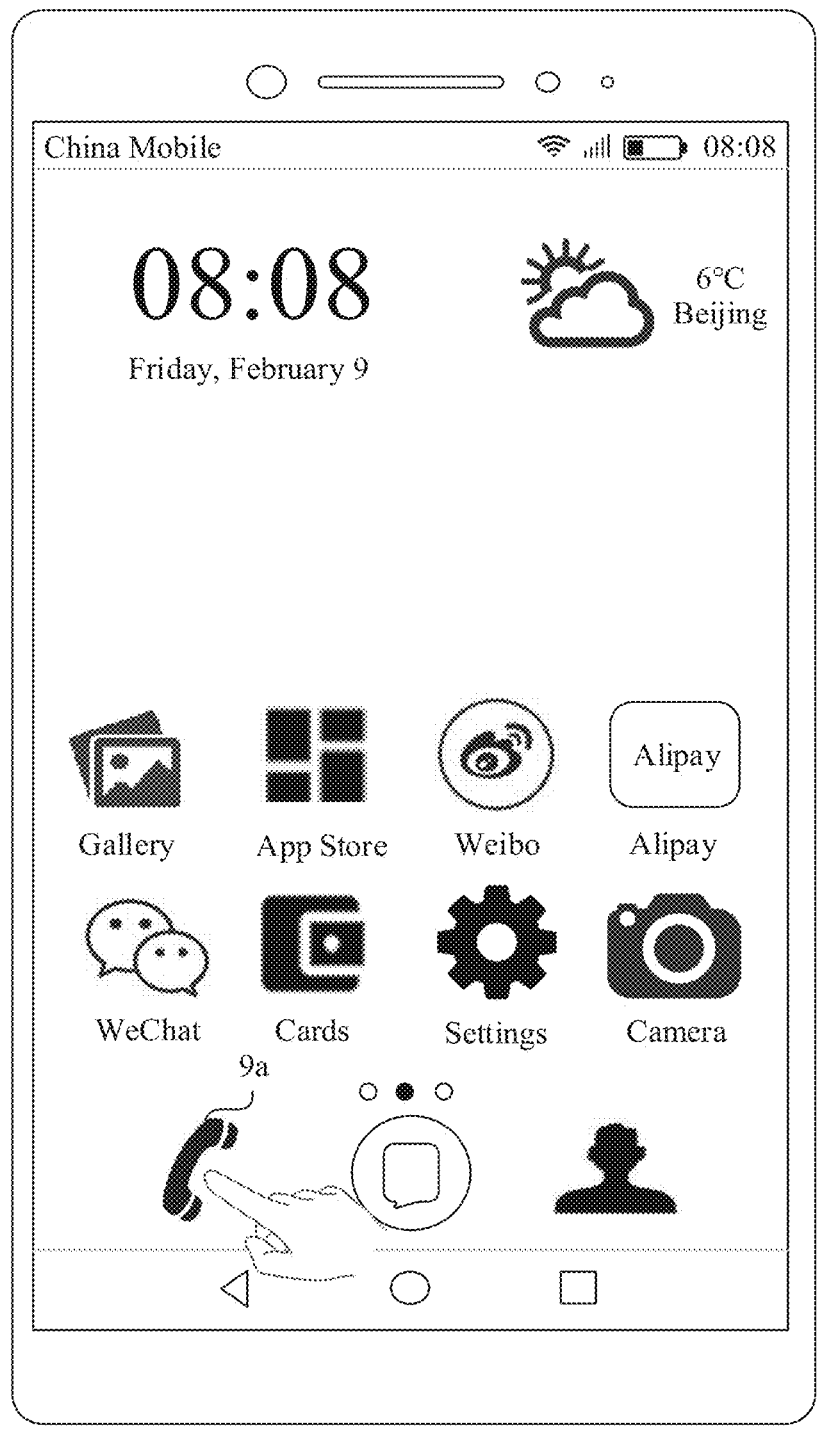
FIG. 9(a) to FIG. 9(c) are schematic diagrams of requesting a video call in a video call method according to this application.
Figure 9B:
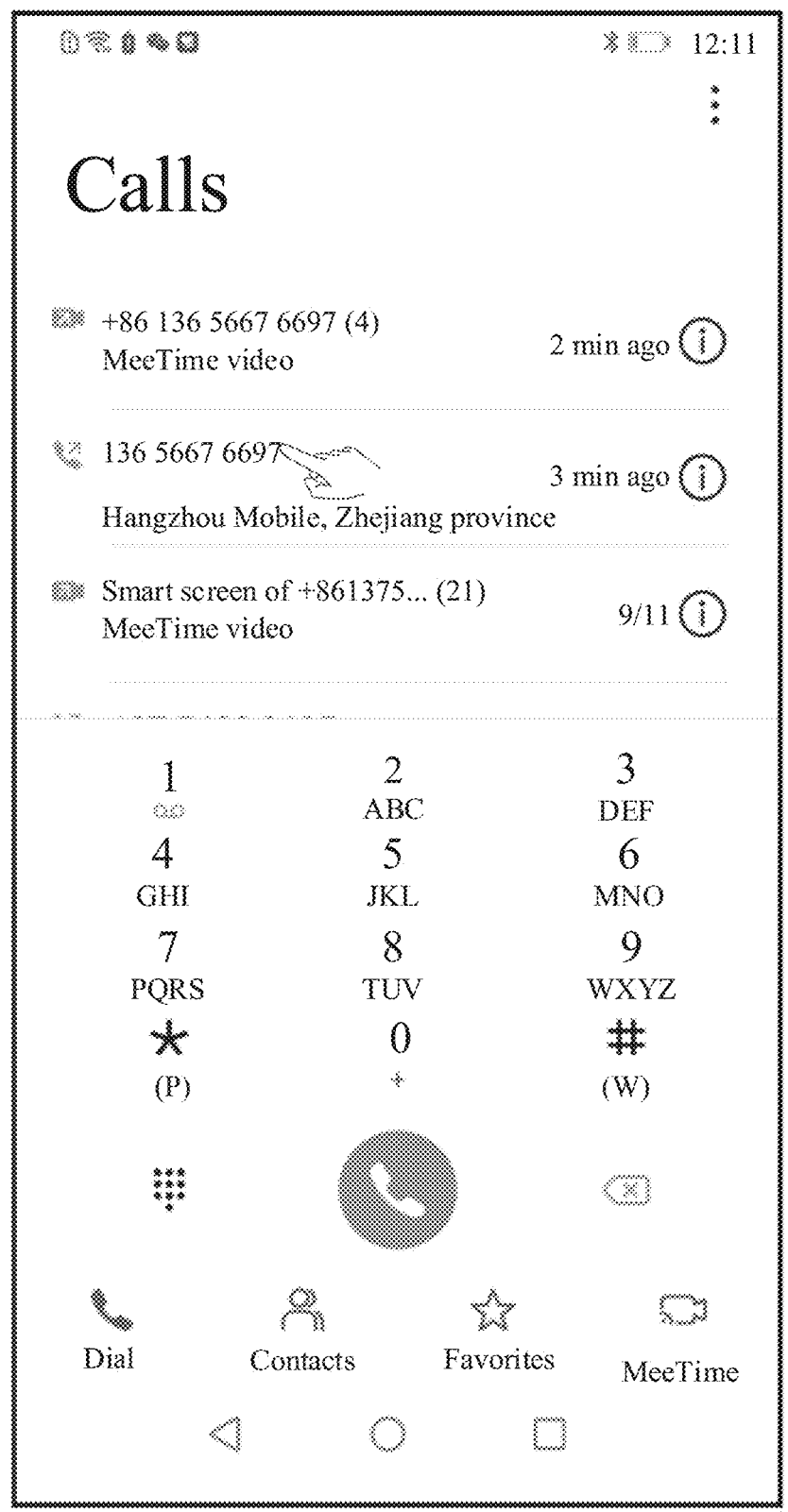
Figure 9C:
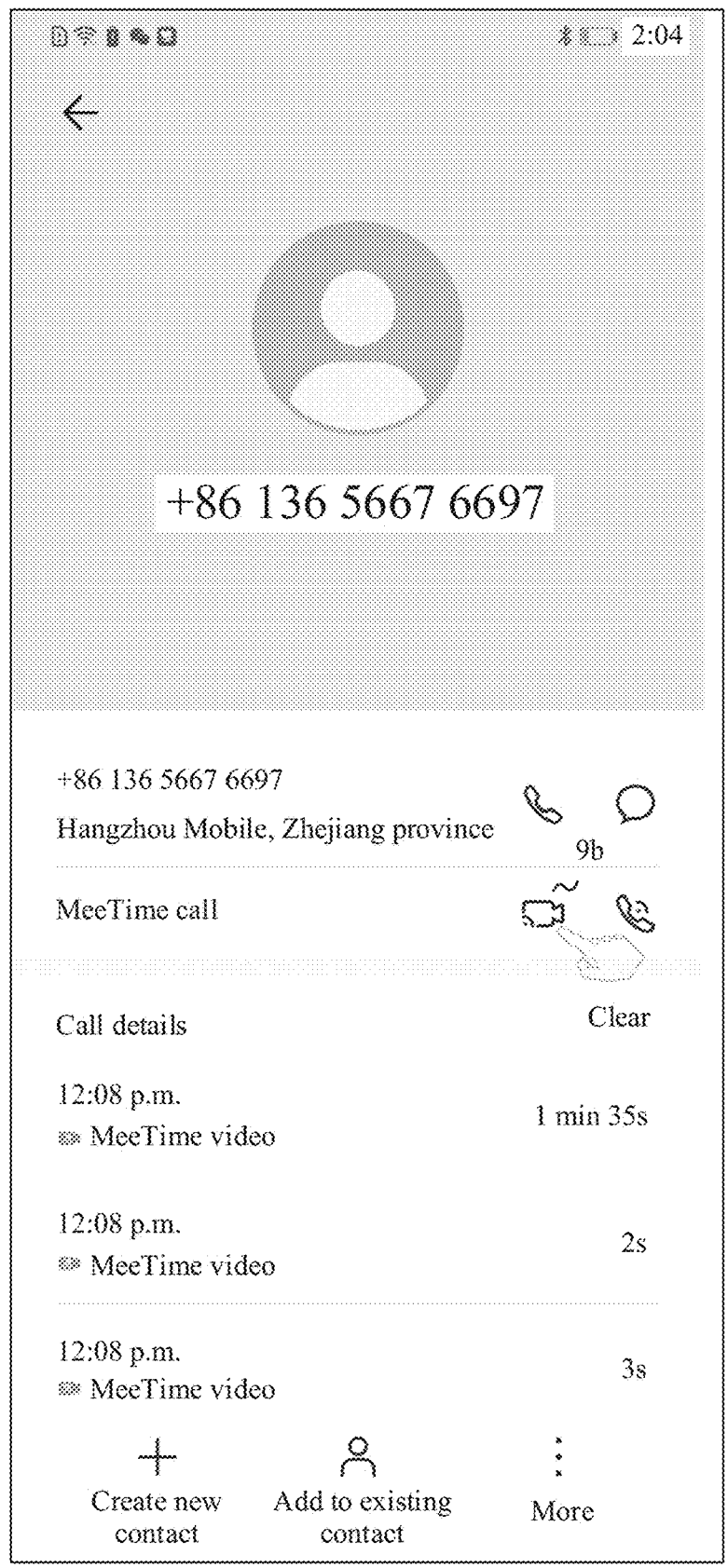
Figure 9D:
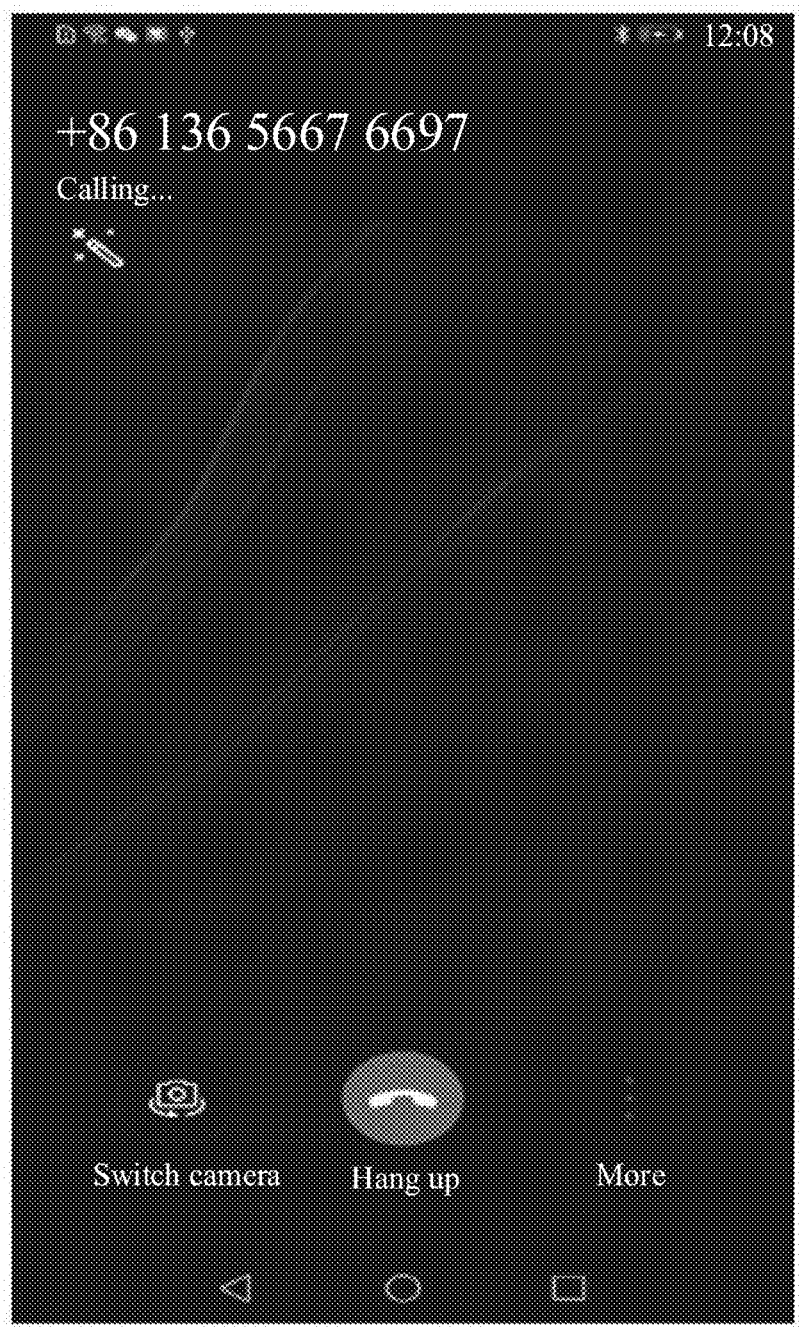
FIG. 9(d) shows an interface during establishment of a video call connection in a video call method according to this application.
Figure 9E:
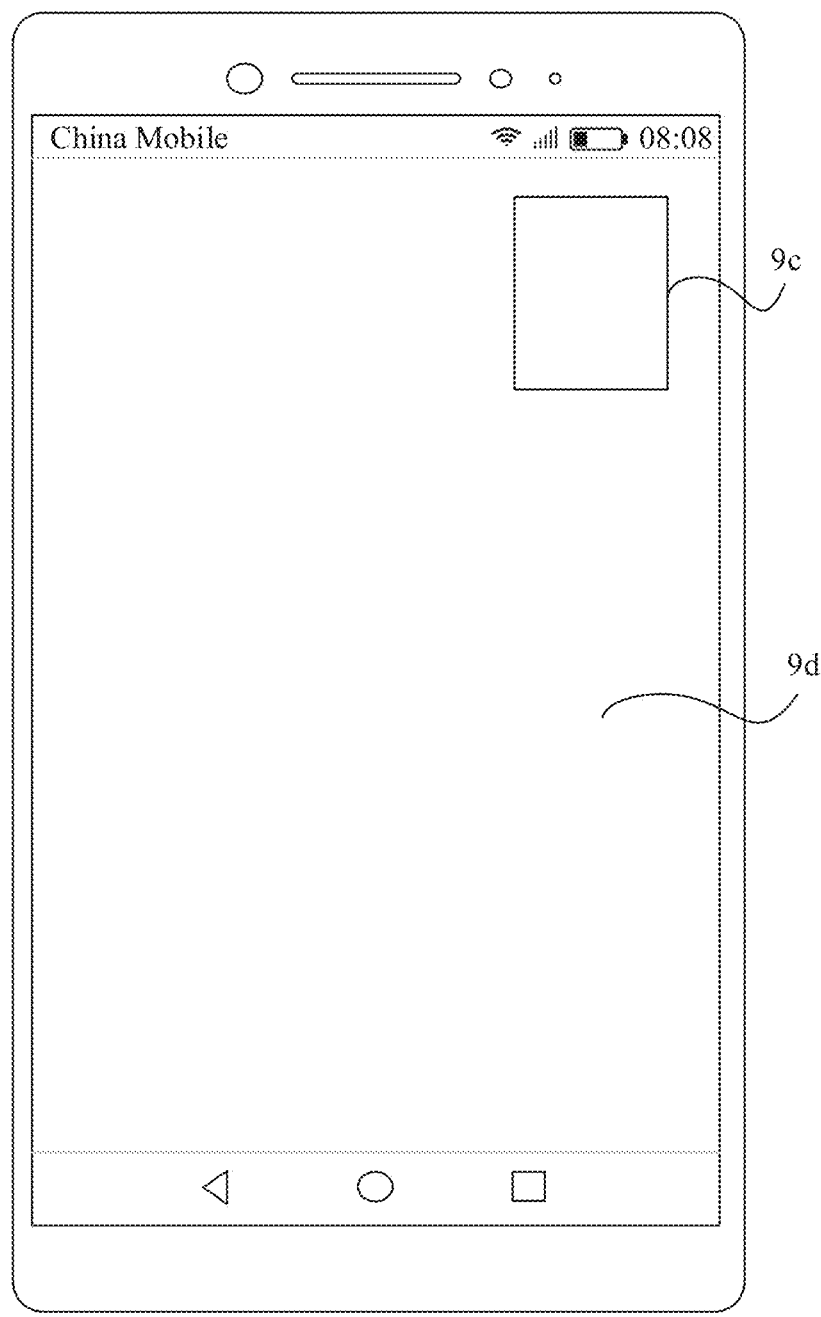
FIG. 9(e) shows an interface after establishment of a video call connection in a video call method according to this application.

FIG. 9(e) shows an interface after establishment of a video call connection in a video call method according to this application. In FIG. 9(e), the video picture of the environment including the first user is displayed in a small window indicated by 9c, and a video picture of an environment including the second user is displayed in a large window indicated by 9d. The video picture displayed in the large window indicated by 9d is obtained after the electronic device used by the first user decodes a bitstream sent by the electronic device used by the second user. The bitstream is obtained by the electronic device used by the second user by encoding the video picture of the environment including the second user by using the method provided in the embodiment shown in FIG. 8 in this application.

Figure 10A:
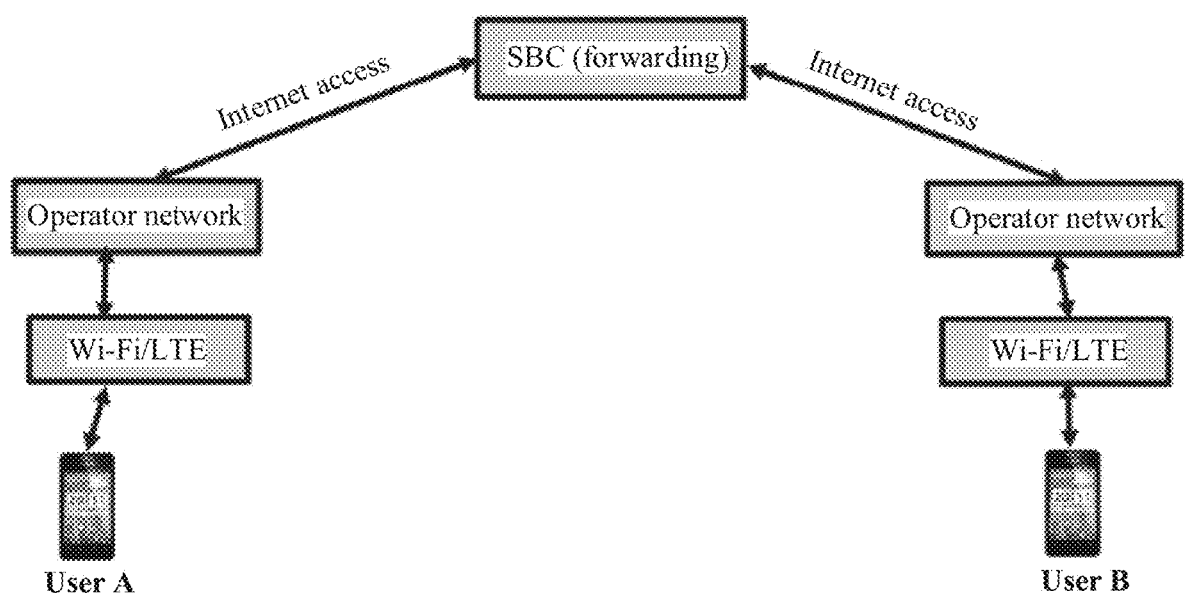
FIG. 10(a) and FIG. 10(b) are schematic diagrams of an application scenario of a video call method according to an embodiment of this application.
Figure 10B:
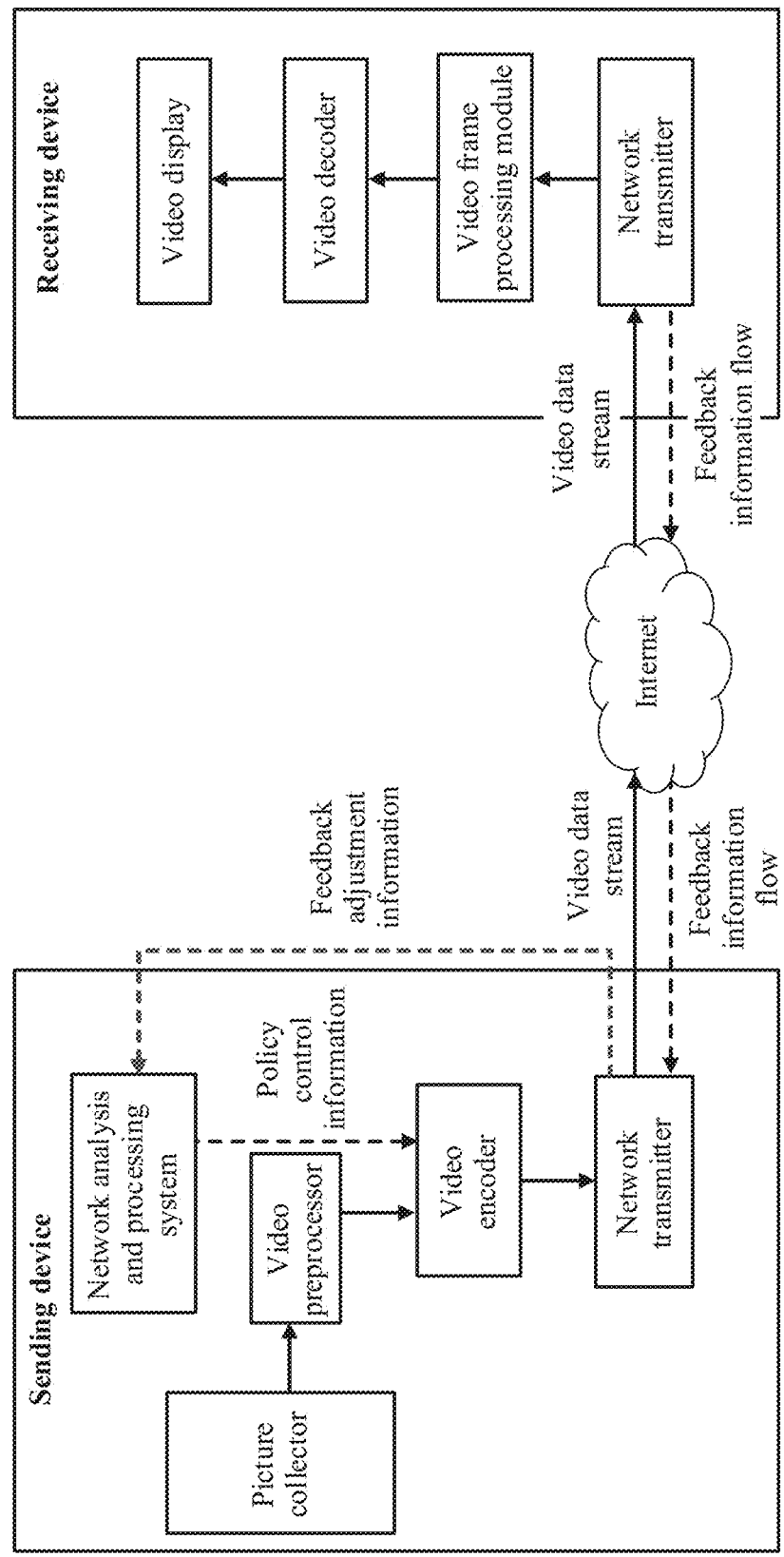

The video call method provided in the embodiment shown in FIG. 8 in this application may be applied to various real-time audio and video interaction scenarios such as a video call or a video conference. FIG. 10(a) and FIG. 10(b) are schematic diagrams of an application scenario of a video call method according to an embodiment of this application. FIG. 10(a) and FIG. 10(b) show a scenario in which two users make a video call.

In FIG. 10(b), a picture collector is configured to obtain real-time YUV data.

A video preprocessor converts the YUV data obtained from a camera into data with a format and resolution that are required by an encoder. A mobile phone device performs switching between landscape mode and portrait mode for a picture.

A network analysis and processing system controls information such as resolution, a frame rate, a redundancy rate, and a reference relationship of a data frame based on feedback information. For a specific analysis manner, refer to the related descriptions shown in FIG. 5. Details are not described herein again.

A video encoder performs encoding based on a reference frame determined by the network analysis and processing system, and marks and buffers an LTR in a DPB.

A network transmitter sends or receives a video stream/a control information flow through a network.

A video frame processing module frames the data frame, restores redundant data, and checks integrity of the data frame.

A video decoder decodes the data frame framed by the foregoing module based on the reference relationship.

A video display submits a decoded data frame to a display module to render and display the data frame.

Figure 11A:
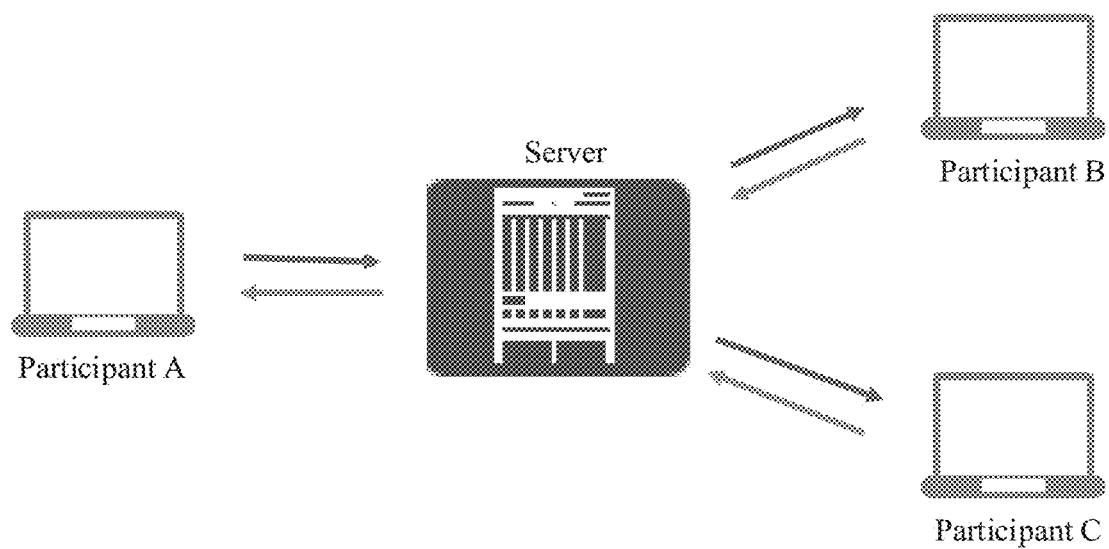
FIG. 11(a) and FIG. 11(b) are schematic diagrams of an application scenario of a video call method according to another embodiment of this application.
Figure 11B:
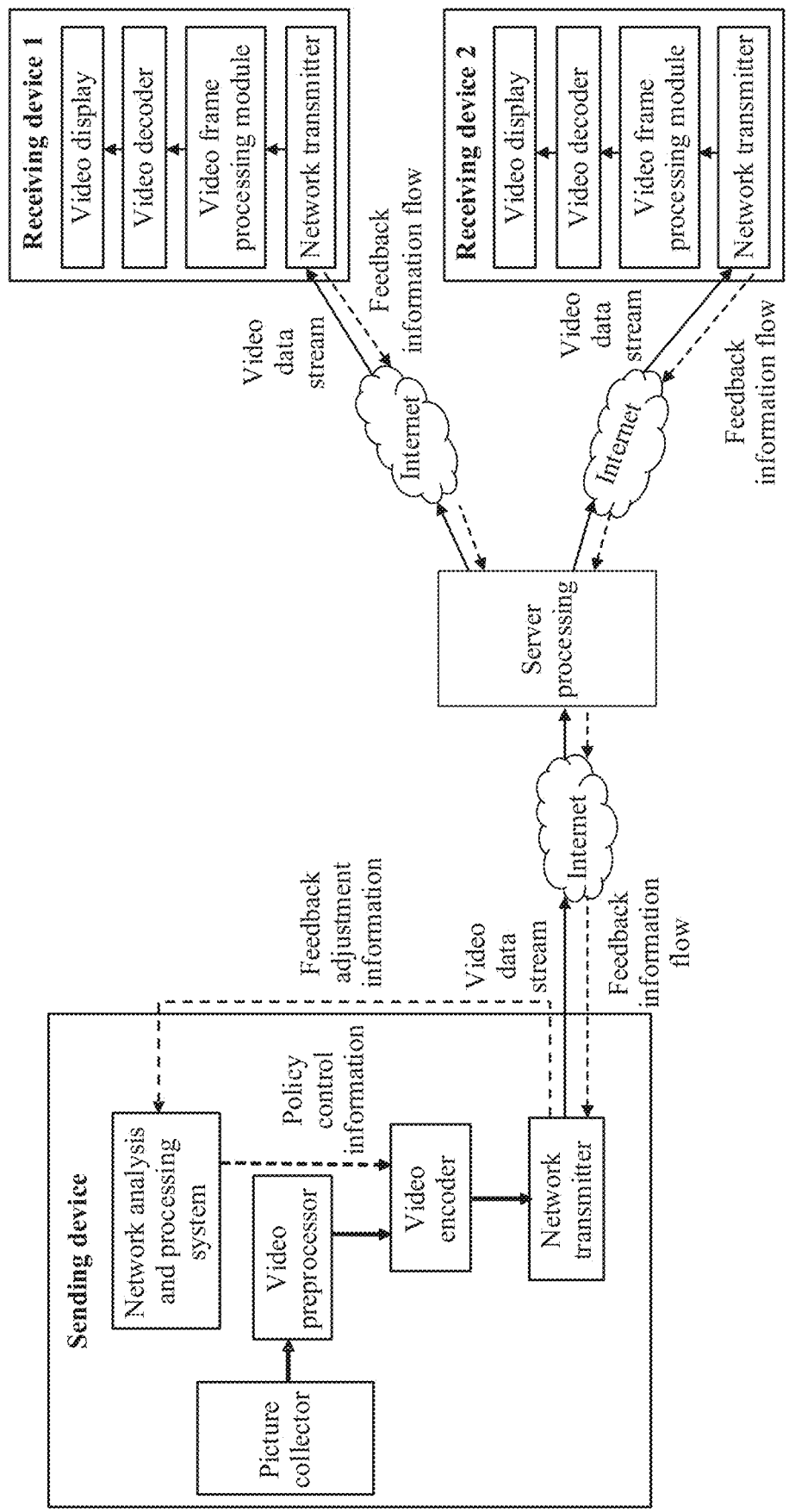

FIG. 11(a) and FIG. 11(b) are schematic diagrams of an application scenario of a video call method according to another embodiment of this application. FIG. 11(a) and FIG. 11(b) show a scenario in which a plurality of users participate in a video conference. Functions of modules in FIG. 11(b) are the same as the functions of the corresponding modules in FIG. 10(b). Therefore, details are not described herein again.

Figure 12:
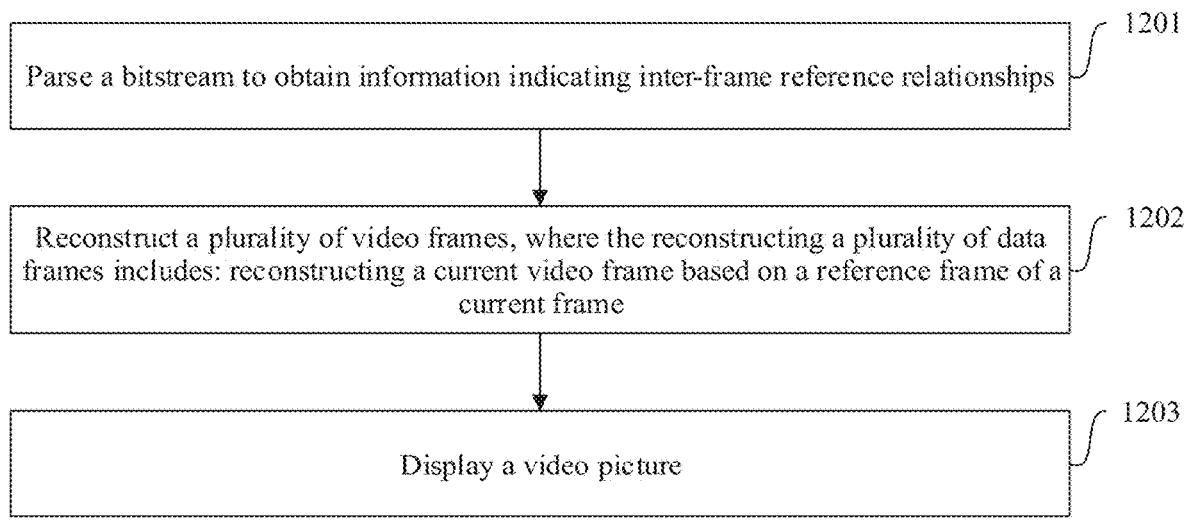
FIG. 12 is a flowchart of a method for displaying a video picture according to an embodiment of this application.

FIG. 12 is a flowchart of a method for displaying a video picture according to an embodiment of this application. In this embodiment, the video picture includes a plurality of video frames. As shown in FIG. 12, the method for displaying a video picture may include the following steps.

Step 1201: Parse a bitstream to obtain information indicating inter-frame reference relationships.

The information indicating the inter-frame reference relationships includes information about an inter-frame reference relationship of a current frame and information about inter-frame reference relationships of N frames preceding to the current frame.

The information about the inter-frame reference relationship of the current frame indicates that the current frame references a target forward long-term reference LTR frame that has a shortest temporal distance to the current frame. The target forward LTR frame is an encoded video frame that is marked by a transmit end device as an LTR frame and for which an acknowledgment message sent by a receive end device is received, and the acknowledgment message corresponds to the target forward LTR frame.

The information about the inter-frame reference relationships of the N frames preceding to the current frame indicates that each of the preceding N frames references a forward LTR frame that has a shortest temporal distance to each of the preceding N frames, the forward LTR frame is an encoded video frame marked by the transmit end device as an LTR frame.

It should be noted that there may be another frame between the N frames preceding to the current frame and the current frame, or there may be temporal neighbor relationships between the N frames preceding to the current frame and the current frame. For the former case, the another frame may have an inter-frame reference relationship the same as those of the preceding N frames, or have another inter-frame reference relationship.

In other words, all of a plurality of frames between the current frame and the forward LTR frame (for example, A) that has the shortest temporal distance may reference a same LTR frame (for example, A), or some of the plurality of frames may reference a same LTR frame (for example, A).

In a possible implementation, the information indicating the inter-frame reference relationships further includes information about inter-frame reference relationships of M frames following the current frame, and the information about the inter-frame reference relationships of the M frames following the current frame indicates that each of the following M frames references a previous frame of each of the following M frames, where N and M are positive integers.

For example, specific values of N and M may depend on a network.

It should be noted that there may be another frame between the M frames following the current frame and the current frame, or there may be temporal neighbor relationships between the M frames following the current frame and the current frame. For the former case, the another frame may have an inter-frame reference relationship the same as those of the following M frames, or have another inter-frame reference relationship.

In a poor network and high latency scenario, when an interval between LTR frames is excessively long, if each of all frames subsequent to an LTR frame references a forward LTR frame that has a shortest temporal distance to each of all the frames, an inter-frame reference distance is bound to be excessively long, and coding quality is significantly degraded. In this case, the transmit end device determines that the current frame references the target forward LTR frame that has the shortest temporal distance to the current frame, and determines that each of the M frames following the current frame references the previous frame of each of the M frames, so that the inter-frame reference distance can be shortened, and the coding quality in the poor network environment can be improved. This implements adaptive selection of a reference relationship. For example, a full-reference relationship and a frame-by-frame reference relationship are flexibly combined. This avoids, to some extent, referencing a reference frame that has a long temporal distance to the current frame, greatly alleviates a video frame freezing phenomenon and a problem of a blurry picture that are caused by packet loss, and implements a good balance between picture quality and picture smoothness.

In a possible implementation, the information indicating the inter-frame reference relationships further includes information about inter-frame reference relationships of M frames following the current frame, and the information about the inter-frame reference relationships of the M frames following the current frame indicates that each of the following M frames references a forward LTR frame that has a shortest temporal distance to each of the following M frames, where N and M are positive integers. For example, specific values of N and M may depend on a network.

It should be noted that there may be another frame between the M frames following the current frame and the current frame, or there may be temporal neighbor relationships between the M frames following the current frame and the current frame. For the former case, the another frame may have an inter-frame reference relationship the same as those of the following M frames, or have another inter-frame reference relationship.

Step 1202: Reconstruct the plurality of video frames, where the reconstructing the plurality of video frames includes: reconstructing a current video frame based on a reference frame of the current frame.

Step 1203: Display the video picture.

According to the method for displaying a video picture, after the bitstream is parsed, the information indicating the inter-frame reference relationships may be obtained. The information indicating the inter-frame reference relationships includes the information about the inter-frame reference relationships of the N frames preceding to the current frame. The information about the inter-frame reference relationships of the N frames preceding to the current frame indicates that each of the preceding N frames references the forward LTR frame that has the shortest temporal distance to each of the preceding N frames. The forward LTR frame is the encoded video frame marked by the transmit end device as the LTR frame. In other words, in this embodiment, when marking an LTR frame, the transmit end device does not need to wait for feedback from the receive end device, and therefore can mark a plurality of LTR frames in one RTT. This can greatly shorten an inter-frame reference distance, and improve coding quality of the video picture.

It may be understood that some or all of the steps or operations in the foregoing embodiments are merely examples. In this embodiment of this application, other operations or variations of the operations may be further performed. In addition, the steps may be performed in sequences different from the sequences presented in the foregoing embodiments, and not all operations in the foregoing embodiments are necessarily to be performed.

Figure 13:
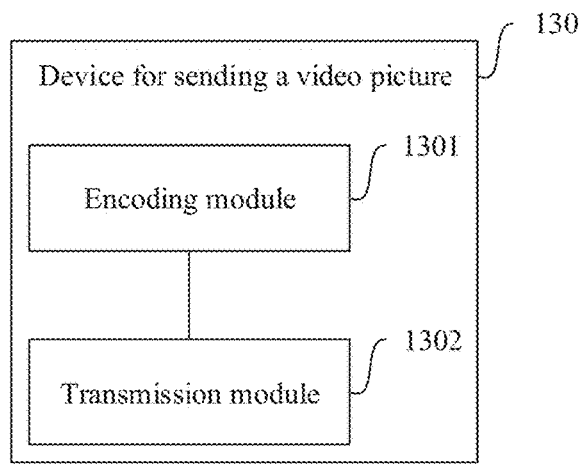
FIG. 13 is a schematic diagram of a structure of a device for sending a video picture according to an embodiment of this application.

FIG. 13 is a schematic diagram of a structure of a device for sending a video picture according to an embodiment of this application. The video picture includes a plurality of video frames. As shown in FIG. 13, the device 130 for sending a video picture may include an encoding module 1301 and a transmission module 1302. It should be understood that the device 130 for sending a video picture may correspond to the transmit end A in FIG. 1, may correspond to the sending device in FIG. 10(b) or FIG. 11(b), may correspond to an apparatus 900 in FIG. 16(a), may correspond to an apparatus 40 in FIG. 16(b), or may correspond to an apparatus 400 in FIG. 16(c). The encoding module 1301 may specifically correspond to the video encoder in the sending device in FIG. 10(b) or FIG. 11(b), or may specifically correspond to an encoder 20 in the apparatus 40 shown in FIG. 16(b).

The encoding module 1301 is configured to encode the plurality of video frames to obtain an encoded bitstream, where the bitstream includes at least information indicating inter-frame reference relationships; the bitstream may further include encoded data, for example, residual data between a current frame and a reference frame; and the information indicating the inter-frame reference relationships may be placed in a slice header (slice header).

The transmission module 1302 is configured to send the encoded bitstream. The information indicating the inter-frame reference relationships includes information about an inter-frame reference relationship of the current frame and information about inter-frame reference relationships of N frames preceding to the current frame.

The information about the inter-frame reference relationship of the current frame indicates that the current frame references a target forward long-term reference LTR frame that has a shortest temporal distance to the current frame. The target forward LTR frame is a forward LTR frame for which a transmit end device receives an acknowledgment message from a receive end device. Specifically, the target forward LTR frame is an encoded video frame that is marked by the encoding module 1301 as an LTR frame and for which the acknowledgment message sent by the receive end device is received, and the acknowledgment message corresponds to the target forward LTR frame. In this application, the device for sending a video picture is a local end, for example, may also be referred to as the transmit end device, and the receive end device is a peer end or a remote end, for example, may also be referred to as a decoding-side device.

The information about the inter-frame reference relationships of the N frames preceding to the current frame indicates that each of the preceding N frames references a forward LTR frame that has a shortest temporal distance to each of the preceding N frames. The forward LTR frame is an encoded video frame marked by the encoding module 1301 as an LTR frame, and the forward LTR frame is stored in a DPB.

It should be noted that there may be another frame between the N frames preceding to the current frame and the current frame, or there may be temporal neighbor relationships between the N frames preceding to the current frame and the current frame. For the former case, the another frame may have an inter-frame reference relationship the same as those of the preceding N frames, or have another inter-frame reference relationship.

In other words, all of a plurality of frames between the current frame and the forward LTR frame (for example, A) that has the shortest temporal distance may reference a same LTR frame (for example, A), or some of the plurality of frames may reference a same LTR frame (for example, A).

According to the device for sending a video picture, the encoding module 1301 encodes the plurality of video frames to obtain the encoded bitstream. The information indicating the inter-frame reference relationships includes the information about the inter-frame reference relationships of the N frames preceding to the current frame. The information about the inter-frame reference relationships of the N frames preceding to the current frame indicates that each of the N frames preceding to the current frame references the forward LTR frame that has the shortest temporal distance to each of the N frames. The forward LTR frame is the encoded video frame marked by the encoding module 1301 as the LTR frame. In other words, in this embodiment, when marking an LTR frame, the encoding module 1301 does not need to wait for feedback from the receive end device, and therefore can mark a plurality of LTR frames in one RTT. This can shorten an inter-frame reference distance, and improve coding quality of the video picture.

In a possible implementation, the information indicating the inter-frame reference relationships further includes information about inter-frame reference relationships of M frames following the current frame, and the information about the inter-frame reference relationships of the M frames following the current frame indicates that each of the following M frames references a previous frame of each of the following M frames, where N and M are positive integers. For example, specific values of N and M may depend on a network.

It should be noted that there may be another frame between the M frames following the current frame and the current frame, or there may be temporal neighbor relationships between the M frames following the current frame and the current frame. For the former case, the another frame may have an inter-frame reference relationship the same as those of the following M frames, or have another inter-frame reference relationship.

In a poor network and high latency scenario, when an interval between LTR frames is excessively long, if each of all frames subsequent to an LTR frame references a forward LTR frame that has a shortest temporal distance to each of all the frames, an inter-frame reference distance is bound to be excessively long, and coding quality is significantly degraded. In this case, the encoding module determines that the current frame references the target forward LTR frame that has the shortest temporal distance to the current frame, and determines that each of the M frames following the current frame references the previous frame of each of the M frames, so that the inter-frame reference distance can be shortened, and the coding quality in the poor network environment can be improved. This implements adaptive selection of a reference relationship. For example, a full-reference relationship and a frame-by-frame reference relationship are flexibly combined. This avoids, to some extent, referencing a reference frame that has a long temporal distance to the current frame, greatly alleviates a video frame freezing phenomenon and a problem of a blurry picture that are caused by packet loss, and implements a good balance between picture quality and picture smoothness.

In a possible implementation, the information indicating the inter-frame reference relationships further includes information about inter-frame reference relationships of M frames following the current frame, and the information about the inter-frame reference relationships of the M frames following the current frame indicates that each of the following M frames references a forward LTR frame that has a shortest temporal distance to each of the following M frames, where N and M are positive integers. For example, specific values of N and M may depend on a network.

It should be noted that there may be another frame between the M frames following the current frame and the current frame, or there may be temporal neighbor relationships between the M frames following the current frame and the current frame. For the former case, the another frame may have an inter-frame reference relationship the same as those of the following M frames, or have another inter-frame reference relationship.

In a possible implementation, the encoding module 1301 determines a value of N based on coding quality of n frames preceding to the current frame, where n<N. In a specific implementation, the encoding module 1301 may determine the value of N based on the coding quality of the n frames preceding to the current frame, a motion scene for the video picture, and network status information fed back by the receive end device. The network status information may include one or more of a network packet loss rate, an available network bandwidth, and a network round-trip time RTT.

In a possible implementation, the encoding module 1301 determines a value of N based on a result of comparing the coding quality of the n frames preceding to the current frame with a coding quality threshold.

In a possible implementation, the encoding module 1301 determines a value of M based on a quantity of video frames included per unit time. In a specific implementation, the encoding module 1301 may determine the value of M based on the quantity of video frames included per unit time and the motion scene for the video picture. The unit time may be set based on system performance and/or an implementation requirement in a specific implementation. For example, the unit time may be 1 second.

In a possible implementation, an LTR frame marking interval D has a function relationship with N and M. For example, the function relationship may be D=N+(M+1).

In a possible implementation, the information indicating the inter-frame reference relationships further includes information about inter-frame reference relationships of L frames, where L=(M1+1)+(M2+1)+ . . . +(Mn+1), the L frames temporally follow the M frames, the information about the inter-frame reference relationships of the L frames indicates that the first frame in the (Mn+1) frames references a target forward LTR frame that has a shortest temporal distance to the first frame, and indicates that each frame after the first frame in the (Mn+1) frames references a previous frame of each frame after the first frame, L is a positive integer, and n is a positive integer greater than or equal to 1.

Values of M1, M2, . . . , and Mn may be the same or different, and specific values may be determined based on an actual application scenario.

In a poor network and high latency scenario, when an interval between LTR frames is excessively long, if each of all frames subsequent to an LTR frame references a forward LTR frame that has a shortest temporal distance to each of all the frames, an inter-frame reference distance is bound to be excessively long, and coding quality is significantly degraded. In this case, when encoding the L frames following the M frames, the encoding module 1301 may determine that the first frame in the (Mn+1) frames references the target forward LTR frame that has the shortest temporal distance to the first frame, and determine that each frame after the first frame in the (Mn+1) frames references the previous frame of each frame after the first frame, so that the inter-frame reference distance can be shortened, and the coding quality in the poor network environment can be improved. This implements adaptive selection of a reference relationship. For example, a full-reference relationship and a frame-by-frame reference relationship are flexibly combined. This avoids, to some extent, referencing a reference frame that has a long temporal distance to the current frame, greatly alleviates a video frame freezing phenomenon and a problem of a blurry picture that are caused by packet loss, and implements a good balance between picture quality and picture smoothness.

In a possible implementation, an LTR frame marking interval D has a function relationship with N and L. For example, the function relationship may be D=N+L, where L=(M1+1)+(M2+1)+ . . . +(Mn+1).

In a possible implementation, the encoding module 1301 determines the LTR frame marking interval D based on network status information fed back by the receive end device, where the network status information includes one or more of a network packet loss rate, an available network bandwidth, and a network round-trip time RTT.

In a possible implementation, the LTR frame marking interval D is used by the encoding module 1301 to mark an LTR frame.

The encoding module 1301 marks the LTR frame based on the LTR frame marking interval, and therefore can mark a plurality of LTR frames in one RTT. In addition, in this application, the LTR frame marking interval is not set as a fixed value, but dynamically changes. A same interval or different intervals may be used, which is specifically determined based on an actual application scenario. This can greatly shorten an inter-frame reference distance, and improve coding quality of the video picture. In addition, in this embodiment, the encoding module 1301 may dynamically determine the LTR frame marking interval based on information such as a network status. This can handle a poor network scenario such as burst packet loss, a high packet loss rate, or congestion on a live network in a timely manner, implement a balance between smoothness and definition, and achieve optimal video call experience.

The device for sending a video picture provided in this embodiment shown in FIG. 13 may be configured to perform the technical solution in the method embodiment shown in FIG. 3 in this application. For an implementation principle and a technical effect of the device for sending a video picture, further refer to the related descriptions in the method embodiment.

Figure 14:
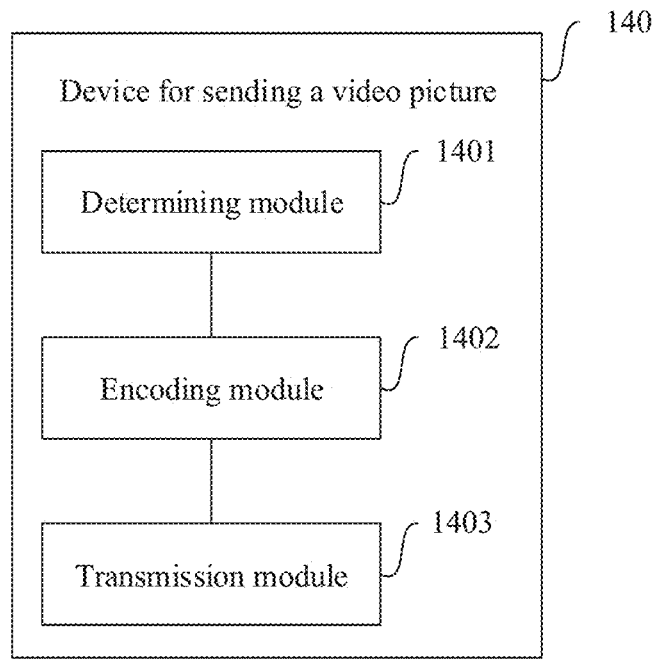
FIG. 14 is a schematic diagram of a structure of a device for sending a video picture according to another embodiment of this application.

FIG. 14 is a schematic diagram of a structure of a device for sending a video picture according to another embodiment of this application. It should be understood that the device 140 for sending a video picture shown in FIG. 14 may correspond to the transmit end A in FIG. 1, may correspond to the sending device in FIG. 10(*b*) or FIG. 11(*b*), may correspond to an apparatus 900 in FIG. 16(*a*), may correspond to an apparatus 40 in FIG. 16(*b*), or may correspond to an apparatus 400 of FIG. 16(*c*). The encoding module 1402 may specifically correspond to the video encoder in the sending device in FIG. 10(*b*) or FIG. 11(*b*), or may specifically correspond to an encoder 20 in the apparatus 40 shown in FIG. 16(*b*).

In this embodiment, the video picture includes a plurality of video frames. As shown in FIG. 14, the device 140 for sending a video picture may include a determining module 1401, an encoding module 1402, and a transmission module 1403.

The determining module 1401 is configured to determine whether a current frame is marked as an LTR frame. Specifically, the determining module 1401 may correspond to the network analysis and processing system in FIG. 10(*b*).

The encoding module 1402 is configured to: when the current frame is not marked as the LTR frame, encode the unmarked current frame, where the encoding process includes: encoding at least information indicating an inter-frame reference relationship of the current frame into a bitstream, where the information indicating the inter-frame reference relationship of the current frame indicates that the current frame references a forward LTR frame that has a shortest temporal distance to the current frame, and the forward LTR frame is an encoded video frame marked by the encoding module 1402 as an LTR frame; or when the current frame is marked as the LTR frame, encode the marked current frame, where the encoding process includes: encoding at least information indicating an inter-frame reference relationship of the current frame into a bitstream, where the information indicating the inter-frame reference relationship of the current frame indicates that the current frame references a target forward LTR frame that has a shortest temporal distance to the current frame; the target forward LTR frame is a forward LTR frame for which the encoding module 1402 receives an acknowledgment message from a receive end device, and specifically, the target forward LTR frame is an encoded video frame that is marked by the encoding module 1402 as an LTR frame and for which the acknowledgment message sent by the receive end device is received; and the acknowledgment message corresponds to the target forward LTR frame. Specifically, the encoding module 1402 may correspond to the video encoder in FIG. 10(*b*).

The transmission module 1403 is configured to send an encoded bitstream. Specifically, the transmission module 1403 may correspond to the network transmitter in FIG. 10(*b*).

According to the device for sending a video picture, when encoding the unmarked current frame, the encoding module 1402 references the forward LTR frame that has the shortest temporal distance to the unmarked current frame, where the forward LTR frame is the encoded video frame marked by the encoding module as the LTR frame. In other words, in this embodiment, when marking an LTR frame, the encoding module does not need to wait for feedback from the receive end device, and therefore can mark a plurality of LTR frames in one RTT. This can greatly shorten an inter-frame reference distance, and improve coding quality of the video picture.

In a possible implementation, the determining module 1401 is specifically configured to determine, based on an LTR frame marking interval, whether the current frame is marked as the LTR frame.

Figure 15:
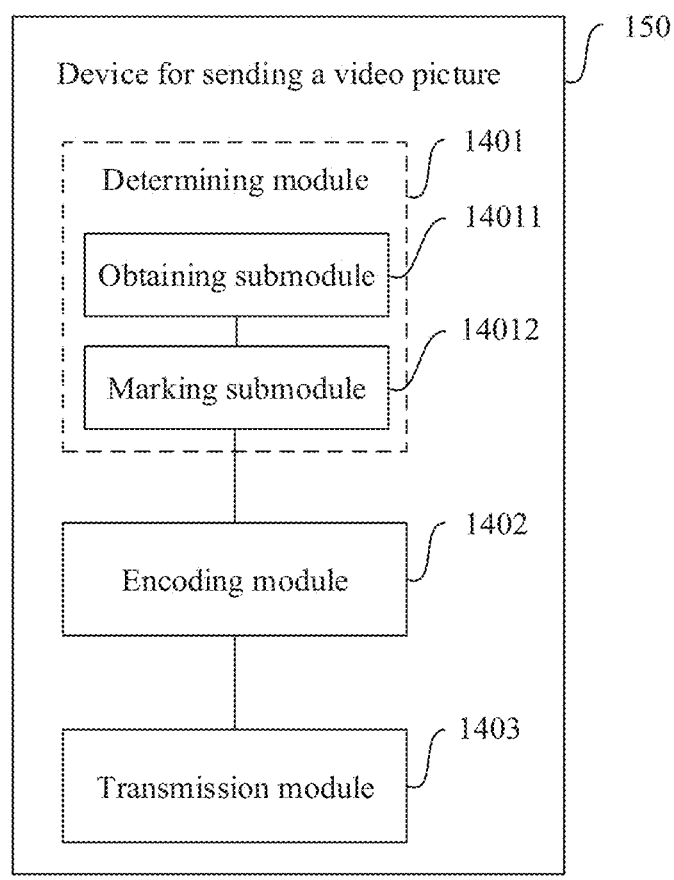
FIG. 15 is a schematic diagram of a structure of a device for sending a video picture according to still another embodiment of this application.

FIG. 15 is a schematic diagram of a structure of a device for sending a video picture according to still another embodiment of this application. It should be understood that the device 150 for sending a video picture shown in FIG. 15 may correspond to the transmit end A in FIG. 1, may correspond to the sending device in FIG. 10(*b*) or FIG. 11(*b*), may correspond to an apparatus 900 in FIG. 16(*a*), may correspond to an apparatus 40 in FIG. 16(*b*), or may correspond to an apparatus 400 of FIG. 16(*c*). The encoding module 1402 may specifically correspond to the video encoder in the sending device in FIG. 10(*b*) or FIG. 11(*b*), or may specifically correspond to an encoder 20 in the apparatus 40 shown in FIG. 16(*b*).

In a possible implementation, the determining module 1401 may include an obtaining submodule 14011 and a marking submodule 14012.

The obtaining submodule 14011 is configured to obtain an interval of a quantity of frames between the current frame and the forward LTR frame that has the shortest temporal distance to the current frame.

The marking submodule 14012 is configured to: mark the current frame as the LTR frame when the interval of the quantity of frames is equal to the LTR frame marking interval; or skip marking the current frame as the LTR frame when the interval of the quantity of frames is not equal to the LTR frame marking interval.

Further, the determining module 1401 is further configured to determine the LTR frame marking interval based on network status information fed back by the receive end device, where the network status information includes one or more of a network packet loss rate, an available network bandwidth, and a network round-trip time RTT.

In a possible implementation, the information indicating the inter-frame reference relationship of the current frame indicates that the current frame references the forward LTR frame that has the shortest temporal distance to the current frame, the forward LTR frame is the encoded video frame marked by a transmit end device as the LTR frame, the current frame is not marked as the LTR frame, and coding quality of the current frame is higher than or equal to a coding quality threshold; or the information indicating the inter-frame reference relationship of the current frame indicates that the current frame references the forward LTR frame that has the shortest temporal distance to the current frame, the forward LTR frame is the encoded video frame marked by the transmit end device as the LTR frame, the current frame is not marked as the LTR frame, and coding quality of the current frame is lower than a coding quality threshold.

If the current frame is not marked as the LTR frame, when encoding the current frame, the transmit end device references the forward LTR frame that has the shortest temporal distance to the current frame; and after encoding the current frame, the encoding module 1402 obtains the coding quality of the current frame, and compares the coding quality of the current frame with the coding quality threshold. If the coding quality of the current frame is lower than the coding quality threshold, when encoding a next frame of the current frame, the encoding module 1402 references a target forward LTR frame that has a shortest temporal distance to the next frame, to improve coding quality of the next frame of the current frame.

In a possible implementation, the encoding module 1402 is further configured to encode (M+1) frames following the current frame, where the encoding process includes: encoding information indicating inter-frame reference relationships of the (M+1) frames following the current frame into the bitstream, where the information indicating the inter-frame reference relationships of the following (M+1) frames indicates that the first frame in the following (M+1) frames references a target forward LTR frame that has a shortest temporal distance to the first frame, and indicate that each frame after the first frame in the following (M+1) frames references a previous frame of each frame after the first frame, where M is a positive integer, and the current frame is not marked as the LTR frame, and the coding quality of the current frame is lower than the coding quality threshold.

In a poor network and high latency scenario, when an interval between LTR frames is excessively long, if each of all frames subsequent to an LTR frame references a forward LTR frame that has a shortest temporal distance to each of all the frames, an inter-frame reference distance is bound to be excessively long, and coding quality is significantly degraded. In this case, when encoding the (M+1) frames following the current frame, the encoding module 1402 may determine that the first frame in the following (M+1) frames references the target forward LTR frame that has the shortest temporal distance to the first frame, and determine that each frame after the first frame in the following (M+1) frames references the previous frame of each frame after the first frame, so that the inter-frame reference distance can be shortened, and the coding quality in the poor network environment can be improved. This implements adaptive selection of a reference relationship. For example, a full-reference relationship and a frame-by-frame reference relationship are flexibly combined. This avoids, to some extent, referencing a reference frame that has a long temporal distance to the current frame, greatly alleviates a video frame freezing phenomenon and a problem of a blurry picture that are caused by packet loss, and implements a good balance between picture quality and picture smoothness.

In a possible implementation, the encoding module 1402 is further configured to encode a next frame of the current frame, where the encoding process includes: encoding information indicating an inter-frame reference relationship of the next frame of the current frame into the bitstream, where the information indicating the inter-frame reference relationship of the next frame indicates that the next frame references a target forward LTR frame that has a shortest temporal distance to the next frame, the current frame is not marked as the LTR frame, and the coding quality of the current frame is lower than the coding quality threshold.

In a possible implementation, the encoding module 1402 is configured to determine a value of M based on a quantity of video frames included per unit time. In a specific implementation, the encoding module may determine the value of M based on the quantity of video frames included per unit time and the motion scene for the video picture. The unit time may be set based on system performance and/or an implementation requirement in a specific implementation. For example, the unit time may be 1 second.

The device for sending a video picture provided in the embodiment shown in FIG. 14 or FIG. 15 may be configured to perform the technical solution in the method embodiment shown in FIG. 6 in this application. For an implementation principle and a technical effect of the device for sending a video picture, further refer to the related descriptions in the method embodiment.

It should be understood that division into the modules of the device for sending a video picture shown in each of FIG. 13 to FIG. 15 is merely logical function division, and may be all or some integrated into one physical entity in an actual implementation, or may be physically separated. In addition, all of the modules may be implemented in a form of software invoked by a processing element or in a form of hardware. Alternatively, some of the modules may be implemented in a form of software invoked by a processing element, and some of the modules may be implemented in a form of hardware. For example, the encoding module may be implemented as an independently disposed processing element, or may be integrated into the device for sending a video picture, for example, a chip of an electronic device. Implementations of other modules are similar. In addition, all or some of the modules may be integrated, or may be implemented independently. In an implementation process, steps in the foregoing methods or the foregoing modules may be implemented by using a hardware integrated logical circuit in a processor element, or by using instructions in a form of software.

For example, the foregoing modules may be configured as one or more integrated circuits for implementing the foregoing method, for example, one or more application-specific integrated circuits (ASIC for short), one or more digital signal processors (DSP for short), or one or more field programmable gate arrays (FPGA for short). For another example, the modules may be integrated together, and implemented in a form of a system-on-a-chip (SOC for short).

Figure 16A:
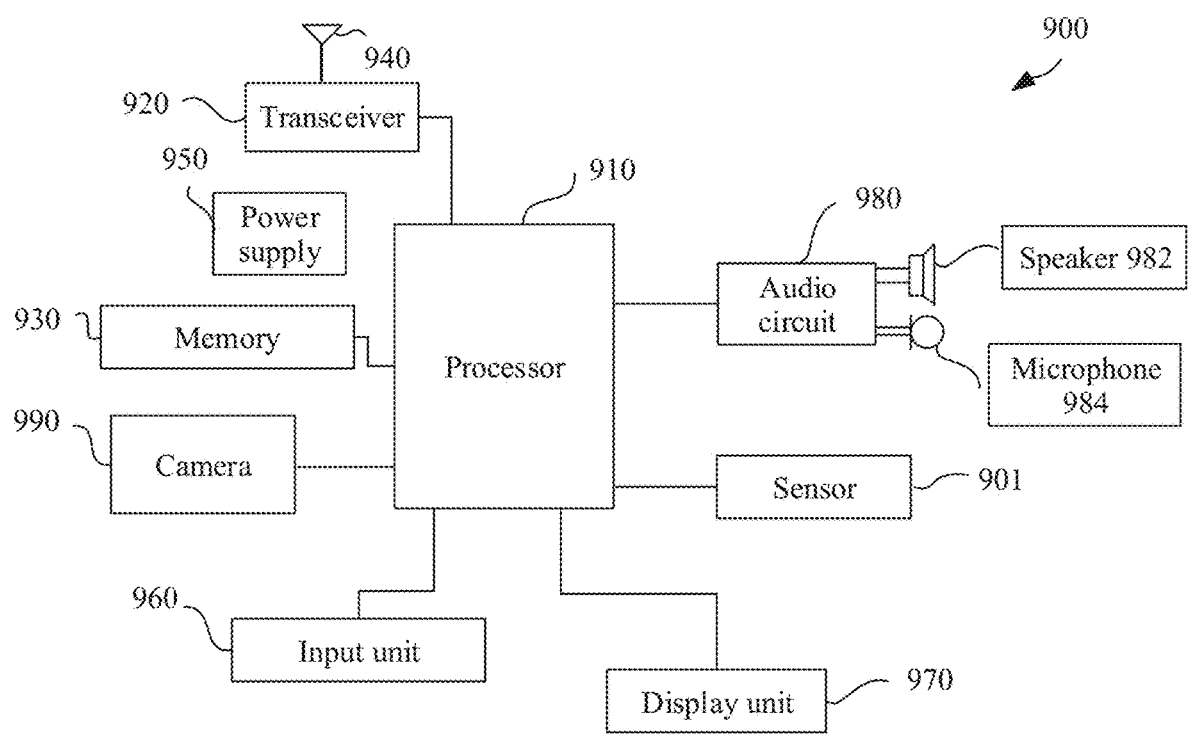
FIG. 16(a) is a schematic diagram of a structure of a video call device according to an embodiment of this application.

FIG. 16(a) is a schematic diagram of a structure of a video call device according to an embodiment of this application. The video call device may be a video call device used by a first user. As shown in FIG. 16(a), the video call device may include a display, a picture collector, one or more processors, a memory, a plurality of applications, and one or more computer programs.

The display may include a display of an in-vehicle computer (a mobile data center). The picture collector may be a camera, an in-vehicle sensor, or the like. The video call device may be a device such as a mobile terminal (a mobile phone), a smart screen, a drone, or an intelligent and connected vehicle (ICV for short), a smart/intelligent car, or a vehicle-mounted device.

The one or more computer programs are stored in the memory, and the one or more computer programs include instructions. When the instructions are executed by the device, the device is enabled to perform the steps: establishing a video call connection between the first user and a second user in response to a first operation of the first user for requesting a video call with the second user, where the video call connection herein represents a video call connection between an electronic device used by the first user and an electronic device used by the second user;

collecting, by using the picture collector, a video picture of an environment including the first user, where the video picture includes a plurality of video frames, and the environment herein may be an internal environment and/or an external environment in which the first user is located, for example, an environment inside a vehicle and/or an ambient environment that is sensed during driving and in which intelligent detection of an obstacle is performed;

encoding the plurality of video frames to obtain an encoded bitstream, where the bitstream includes at least information indicating inter-frame reference relationships; and sending the encoded bitstream, where the information indicating the inter-frame reference relationships includes information about an inter-frame reference relationship of the current frame and information about inter-frame reference relationships of N frames preceding to the current frame.

The information about the inter-frame reference relationship of the current frame indicates that the current frame references a target forward long-term reference LTR frame that has a shortest temporal distance to the current frame. The target forward LTR frame is an encoded video frame that is marked by a transmit end device as an LTR frame and for which an acknowledgment message sent by a receive end device is received, and the acknowledgment message corresponds to the target forward LTR frame. The transmit end device is the video call device used by the first user, and the receive end device is a video call device used by the second user.

The information about the inter-frame reference relationships of the N frames preceding to the current frame indicates that each of the preceding N frames references a forward LTR frame that has a shortest temporal distance to each of the preceding N frames, the forward LTR frame is an encoded video frame marked by the transmit end device as an LTR frame.

It should be noted that there may be another frame between the N frames preceding to the current frame and the current frame, or there may be temporal neighbor relationships between the N frames preceding to the current frame and the current frame. For the former case, the another frame may have an inter-frame reference relationship the same as those of the preceding N frames, or have another inter-frame reference relationship.

In other words, all of a plurality of frames between the current frame and the forward LTR frame (for example, A) that has the shortest temporal distance may reference a same LTR frame (for example, A), or some of the plurality of frames may reference a same LTR frame (for example, A).

According to the video call device, after the video call connection between the first user and the second user is established in response to the first operation of the first user for requesting the video call with the second user, the video picture of the environment including the first user is collected by using the picture collector, and then the plurality of video frames included in the video picture are encoded to obtain the encoded bitstream. The bitstream includes at least the information indicating the inter-frame reference relationships. The information indicating the inter-frame reference relationships includes the information about the inter-frame reference relationships of the N frames preceding to the current frame. The information about the inter-frame reference relationships of the N frames preceding to the current frame indicates that each of the N frames preceding to the current frame references the forward LTR frame that has the shortest temporal distance to each of the N frames. The forward LTR frame is the encoded video frame marked by the transmit end device as the LTR frame. In other words, in this embodiment, when marking an LTR frame, the transmit end device does not need to wait for feedback from the receive end device, and therefore can mark a plurality of LTR frames in one RTT. This can greatly shorten an inter-frame reference distance, and improve coding quality of the video picture.

In a possible implementation, the information indicating the inter-frame reference relationships further includes information about inter-frame reference relationships of M frames following the current frame, and the information about the inter-frame reference relationships of the M frames following the current frame indicates that each of the following M frames references a previous frame of each of the following M frames, where N and M are positive integers. For example, specific values of N and M may depend on a network.

It should be noted that there may be another frame between the M frames following the current frame and the current frame, or there may be temporal neighbor relationships between the M frames following the current frame and the current frame. For the former case, the another frame may have an inter-frame reference relationship the same as those of the following M frames, or have another inter-frame reference relationship.

In a poor network and high latency scenario, when an interval between LTR frames is excessively long, if each of all frames subsequent to an LTR frame references a forward LTR frame that has a shortest temporal distance to each of all the frames, an inter-frame reference distance is bound to be excessively long, and coding quality is significantly degraded. In this case, the transmit end device determines that the current frame references the target forward LTR frame that has the shortest temporal distance to the current frame, and determines that each of the M frames following the current frame references the previous frame of each of the M frames, so that the inter-frame reference distance can be shortened, and the coding quality in the poor network environment can be improved. This implements adaptive selection of a reference relationship. For example, a full-reference relationship and a frame-by-frame reference relationship are flexibly combined. This avoids, to some extent, referencing a reference frame that has a long temporal distance to the current frame, greatly alleviates a video frame freezing phenomenon and a problem of a blurry picture that are caused by packet loss, and implements a good balance between picture quality and picture smoothness.

In a possible implementation, the information indicating the inter-frame reference relationships further includes information about inter-frame reference relationships of M frames following the current frame, and the information about the inter-frame reference relationships of the M frames following the current frame indicates that each of the following M frames references a forward LTR frame that has a shortest temporal distance to each of the following M frames, where N and M are positive integers. For example, specific values of N and M may depend on a network.

It should be noted that there may be another frame between the M frames following the current frame and the current frame, or there may be temporal neighbor relationships between the M frames following the current frame and the current frame. For the former case, the another frame may have an inter-frame reference relationship the same as those of the following M frames, or have another inter-frame reference relationship.

In a possible implementation, when the instructions are executed by the device, the device is enabled to specifically perform the following steps:

determining a value of N based on coding quality of n frames preceding to the current frame, where n<N.

In a specific implementation, the transmit end device may determine the value of N based on the coding quality of the n frames preceding to the current frame, a motion scene for the video picture, and network status information fed back by the receive end device. The network status information may include one or more of a network packet loss rate, an available network bandwidth, and a network round-trip time RTT.

In a possible implementation, when the instructions are executed by the device, the device is enabled to specifically perform the following steps:

determining a value of M based on a quantity of video frames included per unit time.

In a specific implementation, the transmit end device may determine the value of M based on the quantity of video frames included per unit time and the motion scene for the video picture. The unit time may be set based on system performance and/or an implementation requirement in a specific implementation. For example, the unit time may be 1 second.

In a possible implementation, an LTR frame marking interval D has a function relationship with N and M. For example, the function relationship may be D=N+(M+1).

In a possible implementation, the information indicating the inter-frame reference relationships further includes information about inter-frame reference relationships of L frames, where L=(M1+1)+(M2+1)+ . . . +(Mn+1), the L frames temporally follow the M frames, the information about the inter-frame reference relationships of the L frames indicates that the first frame in the (Mn+1) frames references a target forward LTR frame that has a shortest temporal distance to the first frame, and indicates that each frame after the first frame in the (Mn+1) frames references a previous frame of each frame after the first frame, L is a positive integer, and n is a positive integer greater than or equal to 1.

Values of M1, M2, ..., and Mn may be the same or different, and specific values may be determined based on an actual application scenario.

In a poor network and high latency scenario, when an interval between LTR frames is excessively long, if each of all frames subsequent to an LTR frame references a forward LTR frame that has a shortest temporal distance to each of all the frames, an inter-frame reference distance is bound to be excessively long, and coding quality is significantly degraded. In this case, when encoding the L frames following the M frames, the transmit end device may determine that the first frame in the (Mn+1) frames references the target forward LTR frame that has the shortest temporal distance to the first frame, and determine that each frame after the first frame in the (Mn+1) frames references the previous frame of each frame after the first frame, so that the inter-frame reference distance can be shortened, and the coding quality in the poor network environment can be improved. This implements adaptive selection of a reference relationship. For example, a full-reference relationship and a frame-by-frame reference relationship are flexibly combined. This avoids, to some extent, referencing a reference frame that has a long temporal distance to the current frame, greatly alleviates a video frame freezing phenomenon and a problem of a blurry picture that are caused by packet loss, and implements a good balance between picture quality and picture smoothness.

In a possible implementation, an LTR frame marking interval D has a function relationship with N and L. For example, the function relationship may be D=N+L, where L=(M1+1)+(M2+1)+ ... +(Mn+1).

In a possible implementation, the LTR frame marking interval D is used by the transmit end device to mark an LTR frame.

The transmit end device marks the LTR frame based on the LTR frame marking interval, and therefore can mark a plurality of LTR frames in one RTT. This can greatly shorten an inter-frame reference distance, and improve coding quality of the video picture. In addition, in this application, the LTR frame marking interval is not set as a fixed value, but dynamically changes. A same interval or different intervals may be used, which is specifically determined based on an actual application scenario. This can greatly shorten an inter-frame reference distance, and improve coding quality of the video picture. In addition, in this embodiment, the transmit end device may dynamically determine the LTR frame marking interval based on information such as a network status. This can handle a poor network scenario such as burst packet loss, a high packet loss rate, or congestion on a live network in a timely manner, implement a balance between smoothness and definition, and achieve optimal video call experience.

The electronic device shown in FIG. 16(a) may be a terminal device or a circuit device disposed inside the terminal device. The device may be configured to perform the functions/steps in the methods provided in the embodiments shown in FIG. 8 in this application.

As shown in FIG. 16(a), the electronic device 900 includes a processor 910 and a transceiver 920. Optionally, the electronic device 900 may further include a memory 930. The processor 910, the transceiver 920, and the memory 930 may communicate with each other through an internal connection path to transfer a control signal and/or a data signal. The memory 930 is configured to store a computer program. The processor 910 is configured to: invoke and run the computer program in the memory 930.

Optionally, the electronic device 900 may further include an antenna 940, configured to send a wireless signal output by the transceiver 920.

The processor 910 and the memory 930 may be integrated into one processing apparatus, or more commonly be components independent of each other. The processor 910 is configured to execute program code stored in the memory 930 to implement the foregoing functions. In a specific implementation, the memory 930 may also be integrated into the processor 910, or may be independent of the processor 910.

In addition, the electronic device 900 may further include one or more of an input unit 960, a display unit 970, an audio circuit 980, a camera 990, a sensor 901, and the like, to improve the functions of the electronic device 900. The audio circuit may further include a speaker 982, a microphone 984, and the like. The display unit 970 may include a display. The camera 990 is a specific example of a picture collector. The picture collector may be a device with a picture collection function. A specific form of the picture collector is not limited in this embodiment.

Optionally, the electronic device 900 may further include a power supply 950, configured to supply power to various components or circuits in the terminal device.

It should be understood that the electronic device 900 shown in FIG. 16(a) can implement the processes in the method provided in the embodiment shown in FIG. 8. Operations and/or functions of the modules of the electronic device 900 are separately intended to implement a corresponding process in the foregoing method embodiments. For details, refer to the descriptions in the method embodiment shown in FIG. 8. To avoid repetition, detailed descriptions are properly omitted herein.

It should be understood that the processor 910 in the electronic device 900 shown in FIG. 16(a) may be a system-on-a-chip SOC, and the processor 910 may include a central processing unit (CPU for short), and may further include another type of processor, for example, a graphics processing unit (GPU for short).

In conclusion, some processors or processing units in the processor 910 may operate together to implement the procedure of the foregoing method, and software programs corresponding to the processors or processing units may be stored in the memory 930.

An embodiment of this application further provides a device for decoding video data. The device includes:
  a memory, configured to store video data in a form of a bitstream; and
  a video decoder, configured to: decode, from the bitstream, information indicating inter-frame reference relationships, where the information indicating the inter-frame reference relationships includes information about an inter-frame reference relationship of a current frame and information about inter-frame reference relationships of N frames preceding to the current frame;
  the information about the inter-frame reference relationship of the current frame indicates that the current frame references a target forward long-term reference LTR frame that has a shortest temporal distance to the current frame; and the information about the inter-frame reference relationships of the N frames preceding to the current frame indicates that each of the preceding N frames references a forward LTR frame that has a shortest temporal distance to each of the preceding N frames; and reconstruct a plurality of video frames, where the reconstructing the plurality of video frames includes: reconstructing a current video frame based on a reference frame of the current frame.

An embodiment of this application further provides a device for encoding video data. The device includes:

a memory, configured to store video data, where the video data includes one or more video frames; and a video encoder, configured to: encode the plurality of video frames to obtain an encoded bitstream, where the bitstream includes at least information indicating inter-frame reference relationships; the bitstream may further include encoded data, for example, residual data between a current frame and a reference frame; and the information indicating the inter-frame reference relationships may be placed in a slice header; and send the encoded bitstream, where the information indicating the inter-frame reference relationships includes information about an inter-frame reference relationship of the current frame and information about inter-frame reference relationships of N frames preceding to the current frame.

The information about the inter-frame reference relationship of the current frame indicates that the current frame references a target forward long-term reference LTR frame that has a shortest temporal distance to the current frame. The target forward LTR frame is a forward LTR frame for which the device for encoding video data receives an acknowledgment message from a device for decoding video data. Specifically, the target forward LTR frame may be an encoded video frame that is marked by the device for encoding video data as an LTR frame and for which the acknowledgment message sent by the device for decoding video data is received, and the acknowledgment message corresponds to the target forward LTR frame.

The information about the inter-frame reference relationships of the N frames preceding to the current frame indicates that each of the preceding N frames references a forward LTR frame that has a shortest temporal distance to each of the preceding N frames, and the forward LTR frame is an encoded video frame marked by the device for encoding video data as an LTR frame. In this application, the forward LTR frame is stored in a DPB.

Figure 16B:
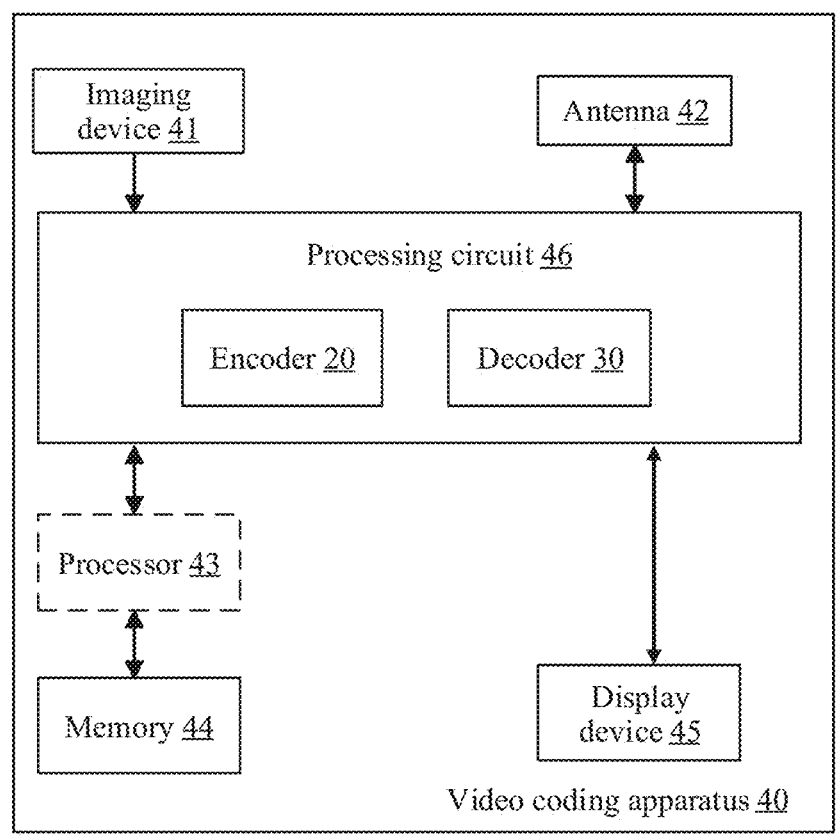
FIG. 16(b) is an illustrative diagram of an instance of a video coding apparatus 40 including an encoder 20 and/or a decoder 30 according to an example embodiment.

FIG. 16(b) is an illustrative diagram of an instance of a video coding apparatus 40 including an encoder 20 and/or a decoder 30 according to an example embodiment. The video coding apparatus 40 may implement a combination of various technologies in the embodiments of this application. In the illustrated implementation, the video coding apparatus 40 may include an imaging device 41, the encoder 20, the decoder 30 (and/or a video encoder/decoder implemented by a logic circuit of a processing circuit 46), an antenna 42, one or more processors 43, one or more memories 44, and/or a display device 45.

As shown in FIG. 16(b), the imaging device 41, the antenna 42, the processing circuit 46, the logic circuit, the encoder 20, the decoder 30, the processor 43, the memory 44, and/or the display device 45 can communicate with each other. As described above, although the video coding apparatus 40 is illustrated with both the encoder 20 and the decoder 30, in different instances, the video coding apparatus 40 may include only the encoder 20 or only the decoder 30.

In some instances, the antenna 42 may be configured to transmit or receive an encoded bitstream of video data. In addition, in some instances, the display device 45 may be configured to present the video data. In some instances, the logic circuit may be implemented by the processing circuit 46. The processing circuit 46 may include application-specific integrated circuit (ASIC) logic, a graphics processing unit, a general-purpose processor, and the like. The video coding apparatus 40 may also include the optional processor 43. The optional processor 43 may similarly include application-specific integrated circuit (ASIC) logic, a graphics processing unit, a general-purpose processor, and the like. In some instances, the logic circuit may be implemented by hardware, for example, video coding dedicated hardware, and the processor 43 may be implemented by using general-purpose software, an operating system, or the like. In addition, the memory 44 may be any type of memory, for example, a volatile memory (for example, a static random access memory (SRAM), a dynamic random access memory (DRAM)), or a nonvolatile memory (for example, a flash memory). In a non-limitative instance, the memory 44 may be implemented by a cache memory. In some instances, the logic circuit may access the memory 44 (for example, for implementing a picture buffer). In other instances, the logic circuit and/or the processing circuit 46 may include a memory (for example, a cache) for implementing a picture buffer or the like.

In some instances, the encoder 20 implemented by the logic circuit may include a picture buffer (for example, implemented by the processing circuit 46 or the memory 44) and a graphics processing unit (for example, implemented by the processing circuit 46). The graphics processing unit may be communicatively coupled to the picture buffer. The graphics processing unit may include the encoder 20 implemented by the logic circuit, to implement various modules that are described with reference to FIG. 16(b) and/or any other encoder system or subsystem described in this specification. The logic circuit may be configured to perform various operations described in this specification.

In some instances, the decoder 30 may be implemented by the logic circuit in a similar manner, to implement various modules that are described with reference to the decoder 30 in FIG. 16(b) and/or any other decoder system or subsystem described in this specification. In some instances, the decoder 30 implemented by the logic circuit may include a picture buffer (implemented by the processing circuit 46 or the memory 44) and a graphics processing unit (for example, implemented by the processing circuit 46). The graphics processing unit may be communicatively coupled to the picture buffer. The graphics processing unit may include the decoder 30 implemented by the logic circuit, to implement various modules that are described with reference to FIG. 16(b) and/or any other decoder system or subsystem described in this specification.

In some instances, the antenna 42 may be configured to receive an encoded bitstream of video data. As described above, the encoded bitstream may include reference relationship information related to an encoded video frame described in this specification and the like. The video coding apparatus 40 may further include the decoder 30 coupled to the antenna 42 and configured to decode the encoded bitstream. The display device 45 is configured to present a video frame.

It should be understood that, with regard to signaling a syntax element, the decoder 30 may be configured to receive and parse such a syntax element and correspondingly decode related video data. In some examples, the encoder 20 may entropy encode the syntax element into an encoded video bitstream. In such instances, the decoder 30 may parse the syntax element and correspondingly decode related video data.

It should be noted that a video picture encoding method described in the embodiments of this application is performed by the encoder 20 and a video picture decoding method described in the embodiments of this application is performed by the decoder 30. The encoder 20 and the decoder 30 in the embodiments of this application may be, for example, an encoder and a decoder corresponding to a video standard protocol such as H.263, H.264, HEVC, MPEG-2, MPEG-4, VP8, or VP9, or a next-generation video standard protocol (such as H.266).

Figure 16C:
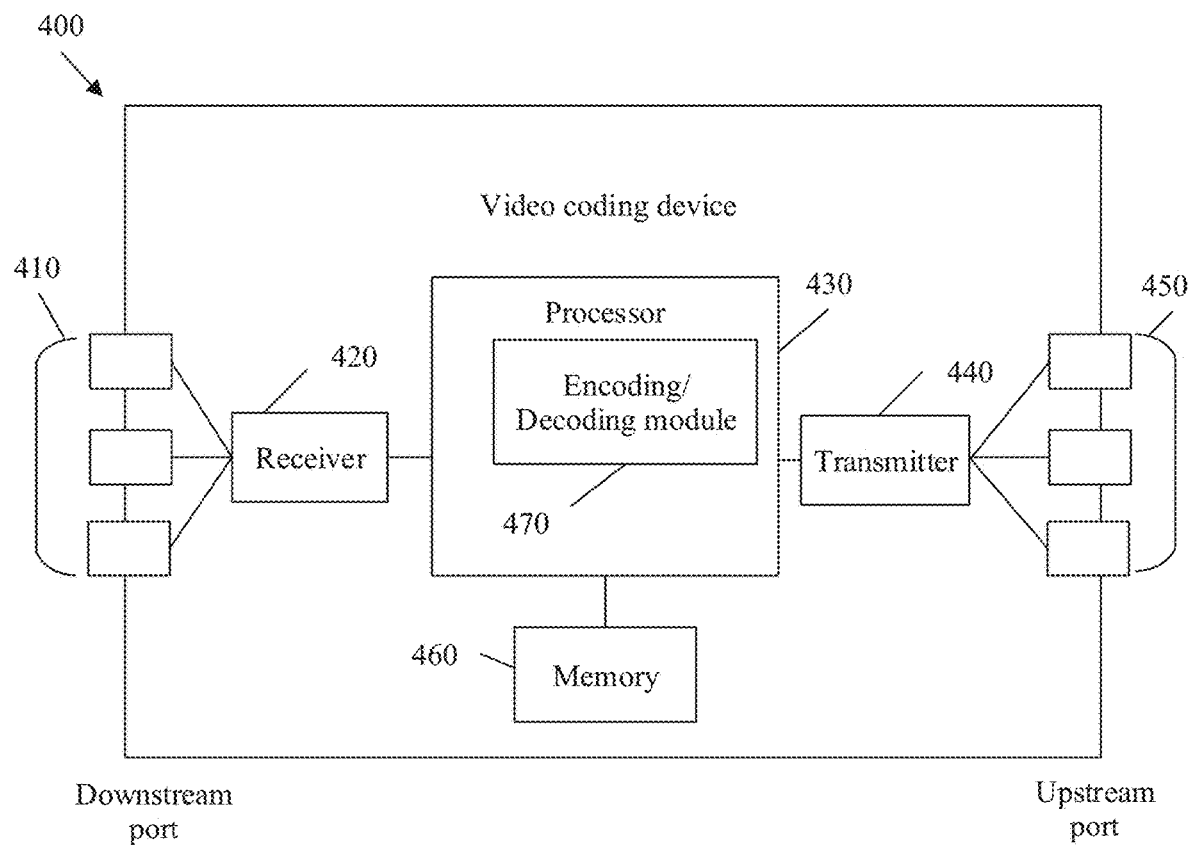
FIG. 16(c) is a schematic diagram of a structure of a video coding device 400 (for example, a video encoding device 400 or a video decoding device 400) according to an embodiment of this application.

FIG. 16(c) is a schematic diagram of a structure of a video coding device 400 (for example, a video encoding device 400 or a video decoding device 400) according to an embodiment of this application. The video coding device 400 is suitable for implementing the embodiments described in this specification. In an embodiment, the video coding device 400 may be a video decoder (for example, the decoder 30 in FIG. 16(b)) or a video encoder (for example, the encoder 20 in FIG. 16(b)). In another embodiment, the video coding device 400 may be one or more components of the decoder 30 in FIG. 16(b) or of the encoder 20 in FIG. 16(b).

The video coding device 400 includes: an ingress port 410 and a receiving unit (Rx) 420 for receiving data; a processor, a logic unit, or a central processing unit (CPU) 430 for processing data; a transmitter unit (Tx) 440 (or briefly referred to as a transmitter 440) and an egress port 450 for transmitting data; and a memory 460 (for example, memory 460) configured to store data. The video coding device 400 may further include an optical-to-electrical conversion component and an electrical-to-optical (EO) component that are coupled to the ingress port 410, the receiver unit 420 (or briefly referred to as a receiver 420), the transmitter unit 440, and the egress port 450 for egress or ingress of optical or electrical signals.

The processor 430 is implemented by using hardware and software. The processor 430 may be implemented as one or more CPU chips, cores (for example, a multi-core processor), FPGAs, ASICs, and DSPs. The processor 430 communicates with the ingress port 410, the receiver unit 420, the transmitter unit 440, the egress port 450, and the memory 460. The processor 430 includes a coding module 470 (for example, an encoding module 470 or a decoding module 470). The encoding/decoding module 470 implements the embodiments disclosed in this specification, to implement a chroma block prediction method provided in the embodiments of this application. For example, the encoding/decoding module 470 implements, processes, or provides various coding operations. Therefore, the encoding/decoding module 470 substantially improves functions of the video coding device 400, and affects a transform of the video coding device 400 to a different state. Alternatively, the encoding/decoding module 470 is implemented as instructions stored in the memory 460 and executed by the processor 430.

The memory 460 includes one or more disks, tape drives, and solid-state drives, and may be used as an overflow data storage device, to store programs when such programs are selected for execution, and to store instructions and data that are read during program execution. The memory 460 may be volatile and/or nonvolatile, and may be a read-only memory (ROM), a random access memory (RAM), a ternary content-addressable memory (TCAM for short), and/or a static random access memory (SRAM).

Figure 17:
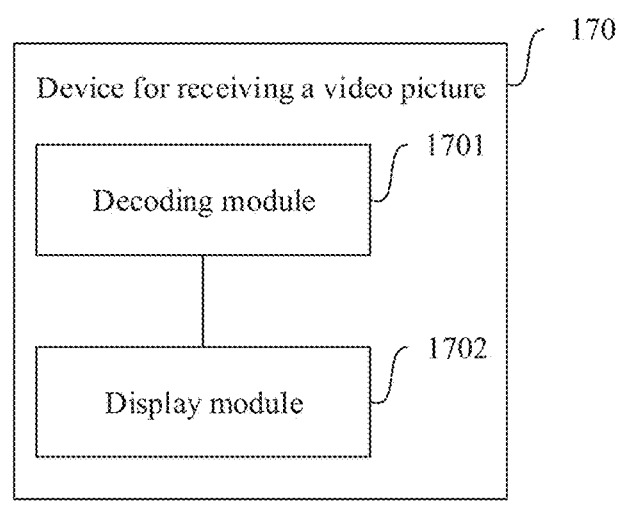
FIG. 17 is a schematic diagram of a structure of a device for receiving a video picture according to an embodiment of this application.

FIG. 17 is a schematic diagram of a structure of a device for receiving a video picture according to an embodiment of this application. The video picture includes a plurality of video frames. As shown in FIG. 17, the device 170 for receiving a video picture may include a decoding module 1701, and a display module 1702. It should be understood that the device 170 for receiving a video picture shown in FIG. 17 may correspond to the receive end B in FIG. 1, may correspond to the receiving device in FIG. 10(b) or FIG. 11(b), may correspond to the apparatus 900 in FIG. 16(a), may correspond to the apparatus 40 in FIG. 16(b), or may correspond to the apparatus 400 in FIG. 16(c).

The decoding module 1701 may correspond to the video decoder in the receiving device in FIG. 10(b) or FIG. 11(b), or may specifically correspond to the decoder 30 in the apparatus 40 shown in FIG. 16(b).

The decoding module 1701 is configured to parse a bitstream to obtain information indicating inter-frame reference relationships, where the information indicating the inter-frame reference relationships includes information about an inter-frame reference relationship of a current frame and information about inter-frame reference relationships of N frames preceding to the current frame.

The information about the inter-frame reference relationship of the current frame indicates that the current frame references a target forward long-term reference LTR frame that has a shortest temporal distance to the current frame. The target forward LTR frame is an encoded video frame that is marked by a transmit end device as an LTR frame and for which an acknowledgment message sent by a receive end device is received, and the acknowledgment message corresponds to the target forward LTR frame.

The information about the inter-frame reference relationships of the N frames preceding to the current frame indicates that each of the preceding N frames references a forward LTR frame that has a shortest temporal distance to each of the preceding N frames. The forward LTR frame is an encoded video frame marked by the transmit end device as an LTR frame.

The decoding module 1701 is further configured to reconstruct the plurality of video frames, where the reconstructing the plurality of video frames includes: reconstructing a current video frame based on a reference frame of the current frame.

The display module 1702 is configured to display the video picture.

It should be noted that there may be another frame between the N frames preceding to the current frame and the current frame, or there may be temporal neighbor relationships between the N frames preceding to the current frame and the current frame. For the former case, the another frame may have an inter-frame reference relationship the same as those of the preceding N frames, or have another inter-frame reference relationship.

In other words, all of a plurality of frames between the current frame and the forward LTR frame (for example, A) that has the shortest temporal distance may reference a same LTR frame (for example, A), or some of the plurality of frames may reference a same LTR frame (for example, A).

According to the device for receiving a video picture, after parsing the bitstream, the decoding module 1701 may obtain the information indicating the inter-frame reference relationships. The information indicating the inter-frame reference relationships includes the information about the inter-frame reference relationships of the N frames preceding to the current frame. The information about the inter-frame reference relationships of the N frames preceding to the current frame indicates that each of the preceding N frames references the forward LTR frame that has the shortest temporal distance to each of the preceding N frames. The forward LTR frame is the encoded video frame marked by the transmit end device as the LTR frame. In other words, in this embodiment, when marking an LTR frame, the transmit end device does not need to wait for feedback from the receive end device, and therefore can mark a plurality of LTR frames in one RTT. This can greatly shorten an inter-frame reference distance, and improve coding quality of the video picture.

In a possible implementation, the information indicating the inter-frame reference relationships further includes information about inter-frame reference relationships of M frames following the current frame, and the information about the inter-frame reference relationships of the M frames following the current frame indicates that each of the following M frames references a previous frame of each of the following M frames, where N and M are positive integers. For example, specific values of N and M may depend on a network.

It should be noted that there may be another frame between the M frames following the current frame and the current frame, or there may be temporal neighbor relationships between the M frames following the current frame and the current frame. For the former case, the another frame may have an inter-frame reference relationship the same as those of the following M frames, or have another inter-frame reference relationship.

In a poor network and high latency scenario, when an interval between LTR frames is excessively long, if each of all frames subsequent to an LTR frame references a forward LTR frame that has a shortest temporal distance to each of all the frames, an inter-frame reference distance is bound to be excessively long, and coding quality is significantly degraded. In this case, the transmit end device determines that the current frame references the target forward LTR frame that has the shortest temporal distance to the current frame, and determines that each of the M frames following the current frame references the previous frame of each of the M frames, so that the inter-frame reference distance can be shortened, and the coding quality in the poor network environment can be improved. This implements adaptive selection of a reference relationship. For example, a full-reference relationship and a frame-by-frame reference relationship are flexibly combined. This avoids, to some extent, referencing a reference frame that has a long temporal distance to the current frame, greatly alleviates a video frame freezing phenomenon and a problem of a blurry picture that are caused by packet loss, and implements a good balance between picture quality and picture smoothness.

In a possible implementation, the information indicating the inter-frame reference relationships further includes information about inter-frame reference relationships of M frames following the current frame, and the information about the inter-frame reference relationships of the M frames following the current frame indicates that each of the following M frames references a forward LTR frame that has a shortest temporal distance to each of the following M frames, where N and M are positive integers. For example, specific values of N and M may depend on a network.

It should be noted that there may be another frame between the M frames following the current frame and the current frame, or there may be temporal neighbor relationships between the M frames following the current frame and the current frame. For the former case, the another frame may have an inter-frame reference relationship the same as those of the following M frames, or have another inter-frame reference relationship.

The device for receiving a video picture provided in this embodiment shown in FIG. 17 may be configured to perform the technical solution in the method embodiment shown in FIG. 12 in this application. For an implementation principle and a technical effect of the device for receiving a video picture, further refer to the related descriptions in the method embodiment.

It should be understood that division into the modules of the device for receiving a video picture shown in FIG. 17 is merely logical function division, and may be all or some integrated into one physical entity in an actual implementation, or may be physically separated. In addition, all of the modules may be implemented in a form of software invoked by a processing element or in a form of hardware. Alternatively, some of the modules may be implemented in a form of software invoked by a processing element, and some of the modules may be implemented in a form of hardware. For example, a decoding module may be implemented as an independently disposed processing element, or may be integrated into the device for receiving a video picture, for example, a chip of an electronic device. Implementations of other modules are similar. In addition, all or some of the modules may be integrated, or may be implemented independently. In an implementation process, steps in the foregoing methods or the foregoing modules may be implemented by using a hardware integrated logical circuit in a processor element, or by using instructions in a form of software.

For example, the foregoing modules may be one or more integrated circuits, for example, one or more ASICs, one or more DSPs, or one or more FPGAs, configured to implement the foregoing methods. For another example, these modules may be integrated together, and implemented in a form of a system-on-a-chip SOC.

This application further provides a device for encoding a video picture. The device includes a storage medium and a central processing unit. The storage medium may be a non-volatile storage medium, and the storage medium stores a computer-executable program. The central processing unit is connected to the non-volatile storage medium, and executes the computer-executable program to implement the method provided in the embodiment shown in FIG. 3 in this application.

This application further provides a device for encoding a video picture. The device includes a storage medium and a central processing unit. The storage medium may be a non-volatile storage medium, and the storage medium stores a computer-executable program. The central processing unit is connected to the non-volatile storage medium, and executes the computer-executable program to implement the method provided in the embodiment shown in FIG. 6 in this application.

This application further provides a device for decoding a video picture. The device includes a storage medium and a central processing unit. The storage medium may be a non-volatile storage medium, and the storage medium stores a computer-executable program. The central processing unit is connected to the non-volatile storage medium, and executes the computer-executable program to implement the method provided in the embodiment shown in FIG. 12 in this application.

The memory may be a read-only memory (ROM), another type of static storage device that can store static information and instructions, or a random access memory (RAM) or another type of dynamic storage device that can store information and instructions, an electrically erasable programmable read-only memory (EEPROM), a compact disc read-only memory (CD-ROM) or another compact disc storage, an optical disc storage (including a compact optical disc, a laser disc, an optical disc, a digital versatile optical disc, a Blu-ray disc, or the like), a magnetic disk storage medium or another magnetic storage device, any other medium that can be used to carry or store expected program code in an instruction form or a data structure form and that can be accessed by a computer, or the like.

In the foregoing embodiments, the processor may include, for example, a CPU, a DSP, a microcontroller, or a digital signal processor, and may further include a GPU, an embedded neural-network processing unit (NPU for short), and an image signal processor (ISP for short). The processor may further include a necessary hardware accelerator or logic processing hardware circuit, for example, an ASIC, or one or more integrated circuits configured to control program execution of the technical solutions in this application. In addition, the processor may have functions of operating one or more software programs. The software programs may be stored in a storage medium.

An embodiment of this application further provides a computer-readable storage medium. The computer-readable storage medium stores a computer program. When the computer program is run on a computer, the computer is enabled to perform the method provided in the embodiment shown in FIG. 3, FIG. 6, FIG. 8, or FIG. 12 in this application.

An embodiment of this application further provides a computer program product. The computer program product includes a computer program. When the computer program is run on a computer, the computer is enabled to perform the method provided in the embodiment shown in FIG. 3, FIG. 6, FIG. 8, or FIG. 12 in this application.

In the embodiments of this application, "at least one" means one or more, and "a plurality of" means two or more. The term "and/or" describes an association relationship for describing associated objects and represents that three relationships may exist. For example, A and/or B may represent. Only A exists, both A and B exist, and only B exists. A and B may be in a singular form or a plural form. The character "/" usually indicates an "or" relationship between the associated objects. "At least one of the following" or a similar expression thereof means any combination of these items, including a singular item or any combination of a plurality of items. For example, at least one of a, b, and c may indicate a, b, c, a and b, a and c, b and c, or a, b, and c, where a, b, and c may be singular or plural.

A person of ordinary skill in the art may be aware that the units and algorithm steps described in the embodiments disclosed in this specification may be implemented by electronic hardware or a combination of computer software and electronic hardware. Whether these functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatuses, and units, reference may be made to corresponding processes in the foregoing method embodiments. Details are not described herein again.

In the embodiments of this application, when any of the functions is implemented in a form of a software functional unit and sold or used as an independent product, the function may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM for short), a random access memory (RAM for short), a magnetic disk, or an optical disc.

The foregoing descriptions are merely specific implementations of this application. Any variation or replacement readily figured out by a person skilled in the art within the technical scope disclosed in this application shall fall within the protection scope of this application. The protection scope of this application shall be subject to the protection scope of the claims.

What is claimed is:

1. A method for transmitting a video picture, wherein the video picture comprises a plurality of video frames, and the method comprises:
   encoding the plurality of video frames to obtain an encoded bitstream, wherein the encoded bitstream comprises information indicating inter-frame reference relationships; and
   sending the encoded bitstream, wherein the information indicating the inter-frame reference relationships comprises:
      information about an inter-frame reference relationship of a current frame, wherein the information about the inter-frame reference relationship of the current frame indicates that the current frame references a target forward long-term reference (LTR) frame that has a shortest temporal distance to the current frame, the target forward LTR frame is a forward LTR frame for which a transmit end device receives an acknowledgment message from a receive end device, and the acknowledgment message corresponds to the target forward LTR frame; and
      information about inter-frame reference relationships of N frames preceding to the current frame, wherein the information about the inter-frame reference relationships of the N frames preceding to the current frame indicates that each of the preceding N frames references a forward LTR frame that has a shortest temporal distance to each of the preceding N frames.

2. The method according to claim 1, wherein the information indicating the inter-frame reference relationships further comprises information about inter-frame reference relationships of M frames following the current frame, and the information about the inter-frame reference relationships of the M frames following the current frame indicates that each of the following M frames references a previous frame of each of the following M frames, wherein N and M are positive integers.

3. The method according to claim 2, further comprises: determining, by the transmit end device, a value of M based on a quantity of video frames comprised per unit time.

4. The method according to claim 3, further comprises: determining, by the transmit end device, a LTR frame marking interval D based on network status information fed back by the receive end device, wherein the network status information comprises one or more of a network packet loss rate, an available network bandwidth, and a network round-trip time (RTT).

5. The method according to claim 3, wherein a LTR frame marking interval D is used by the transmit end device to mark an LTR frame.

6. The method according to claim 1, wherein the information indicating the inter-frame reference relationships further comprises information about inter-frame reference relationships of M frames following the current frame, and the information about the inter-frame reference relationships of the M frames following the current frame indicates that each of the following M frames references a forward LTR frame that has a shortest temporal distance to each of the following M frames, wherein N and M are positive integers.

7. The method according to claim 1, further comprises: determining, by the transmit end device, a value of N based on coding quality of n frames preceding to the current frame, wherein n<N.

8. The method according to claim 1, wherein the method is applied to an electronic device having a display and a picture collector, wherein the method further comprises:
in response to determining that a first operation of a first user for requesting a video call with a second user, establishing a video call connection between the first user and the second user; and
collecting, by using the picture collector, a video picture of an environment comprising the first user, wherein the video picture comprises a plurality of video frames.

9. A device for sending a video picture, wherein the video picture comprises a plurality of video frames, and the device comprises:
an encoder, configured to encode the plurality of video frames to obtain an encoded bitstream, wherein the encoded bitstream comprises information indicating inter-frame reference relationships; and
a transmitter, configured to send the encoded bitstream, wherein the information indicating the inter-frame reference relationships comprises:
information about an inter-frame reference relationship of a current frame, wherein the information about the inter-frame reference relationship of the current frame indicates that the current frame references a target forward long-term reference (LTR) frame that has a shortest temporal distance to the current frame, the target forward LTR frame is a forward LTR frame for which a transmit end device receives an acknowledgment message from a receive end device, and the acknowledgment message corresponds to the target forward LTR frame; and
information about inter-frame reference relationships of N frames preceding to the current frame, wherein the information about the inter-frame reference relationships of the N frames preceding to the current frame indicates that each of the preceding N frames references a forward LTR frame that has a shortest temporal distance to each of the preceding N frames.

10. The device according to claim 9, wherein the information indicating the inter-frame reference relationships further comprises information about inter-frame reference relationships of M frames following the current frame, and the information about the inter-frame reference relationships of the M frames following the current frame indicates that each of the following M frames references a previous frame of each of the following M frames, wherein N and M are positive integers.

11. The device according to claim 10, wherein the encoder determines a value of M based on a quantity of video frames comprised per unit time.

12. The device according to claim 11, wherein an LTR frame marking interval D has a function relationship with N and M.

13. The device according to claim 10, wherein the information indicating the inter-frame reference relationships further comprises information about inter-frame reference relationships of L frames, wherein L=(M1+1)+(M2+1)+ . . . +(Mn+1), the L frames temporally follow the M frames, the information about the inter-frame reference relationships of the L frames indicates that a first frame in (Mn+1) frames references a target forward LTR frame that has a shortest temporal distance to the first frame, and indicates that each frame after the first frame in the (Mn+1) frames references a previous frame of each frame after the first frame, L is a positive integer, and n is a positive integer greater than or equal to 1.

14. The device according to claim 13, wherein an LTR frame marking interval D has a function relationship with N and L.

15. The device according to claim 9, wherein the information indicating the inter-frame reference relationships further comprises information about inter-frame reference relationships of M frames following the current frame, and the information about the inter-frame reference relationships of the M frames following the current frame indicates that each of the following M frames references a forward LTR frame that has a shortest temporal distance to each of the following M frames, wherein N and M are positive integers.

16. The device according to claim 9, wherein the encoder determines a value of N based on coding quality of n frames preceding to the current frame, wherein n<N.

17. The device according to claim 9, wherein the encoder determines an LTR frame marking interval D based on network status information fed back by the receive end device, wherein the network status information comprises one or more of a network packet loss rate, an available network bandwidth, and a network round-trip time (RTT).

18. A device for receiving a video picture, wherein the video picture comprises a plurality of video frames, and the device comprises:
a decoder, configured to parse a bitstream to obtain information indicating inter-frame reference relationships, wherein the information indicating the inter-frame reference relationships comprises:
information about an inter-frame reference relationship of a current frame, the information about the inter-frame reference relationship of the current frame indicates that the current frame references a target forward long-term reference (LTR) frame that has a shortest temporal distance to the current frame; and
information about inter-frame reference relationships of N frames preceding to the current frame, wherein the information about the inter-frame reference relationships of the N frames preceding to the current frame indicates that each of the preceding N frames references a forward LTR frame that has a shortest temporal distance to each of the preceding N frames;

the decoder is further configured to reconstruct the plurality of video frames, wherein the reconstructing the plurality of video frames comprises reconstructing a current video frame based on a reference frame of the current frame; and a display device, configured to display the video picture.

19. The device according to claim 18, wherein the information indicating the inter-frame reference relationships further comprises information about inter-frame reference relationships of M frames following the current frame, and the information about the inter-frame reference relationships of the M frames following the current frame indicates that each of the following M frames references a previous frame of each of the following M frames, wherein N and M are positive integers.

20. The device according to claim 18, wherein the information indicating the inter-frame reference relationships further comprises information about inter-frame reference relationships of M frames following the current frame, and the information about the inter-frame reference relationships of the M frames following the current frame indicates that each of the following M frames references a forward LTR frame that has a shortest temporal distance to each of the following M frames, wherein N and M are positive integers.

* * * * *